(12) United States Patent
Kinkead et al.

(10) Patent No.: US 10,943,242 B2
(45) Date of Patent: *Mar. 9, 2021

(54) INTERACTIVE MARKETING SYSTEM

(71) Applicant: Micronotes, Inc., Boston, MA (US)

(72) Inventors: Devon Kinkead, Holliston, MA (US); Venkat Rangamani, Shrewsbury, MA (US)

(73) Assignee: Micronotes, Inc., Boston, MA (US)

( * ) Notice: Subject to any disclaimer, the term of this patent is extended or adjusted under 35 U.S.C. 154(b) by 153 days.

This patent is subject to a terminal disclaimer.

(21) Appl. No.: 16/269,247

(22) Filed: Feb. 6, 2019

(65) Prior Publication Data

US 2019/0340624 A1    Nov. 7, 2019

Related U.S. Application Data

(63) Continuation of application No. 13/404,166, filed on Feb. 24, 2012, now Pat. No. 10,255,609, which is a
(Continued)

(51) Int. Cl.
  *G06Q 30/02*    (2012.01)
(52) U.S. Cl.
  CPC .................................. *G06Q 30/02* (2013.01)
(58) Field of Classification Search
  CPC ...................................................... G06Q 30/02
(Continued)

(56) References Cited

U.S. PATENT DOCUMENTS 4,974,878 A    12/1990  Josephson
5,794,210 A     8/1998  Goldhaber et al.
(Continued)

FOREIGN PATENT DOCUMENTS

CN    101079026 A    11/2007
EP     1081589 A2     3/2001
(Continued)

OTHER PUBLICATIONS

International Marketing and Brand Management—Traditional Market Segmentation (Year: 2007).*
(Continued)

*Primary Examiner* — Bruce I Ebersman
(74) *Attorney, Agent, or Firm* — McCarter & English, LLP

(57) ABSTRACT

The present invention is a system which enables a marketing team to initiate and sustain directed and interactive communication with thousands or millions of existing or prospective customers. In the preferred embodiment, a marketer accesses a database and selects a group of qualified prospects, using lifestyle dimensions and or demographic information, from a stable group of prospective or existing customers conducting financial transactions online. Once a prospect list is selected, the marketer designs a series of questions, typically using branch and skip logic, and the system deploys the question sequence to the target list in the form of a response-redeemable savings coupon. When prospects are next performing their financial transactions online, they are presented with a lifestyle-relevant coupon which is immediately redeemable by responding to the question/communication.

20 Claims, 52 Drawing Sheets

Related U.S. Application Data continuation-in-part of application No. 12/390,972, filed on Feb. 23, 2009.

(60) Provisional application No. 61/448,896, filed on Mar. 3, 2011, provisional application No. 61/066,573, filed on Feb. 21, 2008.

(58) Field of Classification Search
USPC .......................................................... 705/14
See application file for complete search history.

(56) References Cited

U.S. PATENT DOCUMENTS

| | | | |
|---|---|---|---|
| 5,855,008 A | 12/1998 | Goldhaber et al. | |
| 5,875,428 A | 2/1999 | Kurzweil et al. | |
| 5,915,022 A | 6/1999 | Robinson et al. | |
| 5,970,476 A | 10/1999 | Fahey | |
| 5,978,780 A | 11/1999 | Watson | |
| 6,029,150 A | 2/2000 | Kravitz | |
| 6,181,735 B1 | 1/2001 | Sarat | |
| 6,196,458 B1 | 3/2001 | Walker et al. | |
| 6,289,322 B1 | 9/2001 | Kitchen et al. | |
| 6,332,126 B1 | 12/2001 | Peirce et al. | |
| 6,374,231 B1 | 4/2002 | Bent et al. | |
| 6,493,685 B1 | 12/2002 | Ensel et al. | |
| 6,535,855 B1 | 3/2003 | Cahill et al. | |
| 6,616,458 B1 | 9/2003 | Walker et al. | |
| 6,694,300 B1 | 2/2004 | Walker et al. | |
| 6,708,152 B2 | 3/2004 | Kivimaki | |
| 6,999,943 B1 | 2/2006 | Johnson et al. | |
| 7,089,208 B1 | 8/2006 | Levchin et al. | |
| 7,174,295 B1 | 2/2007 | Kivimaki | |
| 7,216,104 B2 | 5/2007 | Mason | |
| 7,240,022 B1 | 7/2007 | Bistriceanu et al. | |
| 7,283,974 B2 | 10/2007 | Katz et al. | |
| 7,313,543 B1 | 12/2007 | Crane et al. | |
| 7,386,485 B1 | 6/2008 | Mussman et al. | |
| 7,386,511 B2 * | 6/2008 | Buchanan | G06Q 20/042 |
| | | | 235/379 |
| 7,437,313 B1 | 10/2008 | Mussman | |
| 7,467,141 B1 | 12/2008 | Steele et al. | |
| 7,467,745 B2 | 12/2008 | Tedesco et al. | |
| 7,487,435 B2 | 2/2009 | Aviv | |
| 7,519,529 B1 | 4/2009 | Horvitz | |
| 7,580,856 B1 | 8/2009 | Pliha | |
| 7,606,726 B2 | 10/2009 | Nelson | |
| 7,610,245 B2 * | 10/2009 | Dent | G06Q 20/04 |
| | | | 705/40 |
| 7,613,656 B2 | 11/2009 | Stanley et al. | |
| 7,620,602 B2 * | 11/2009 | Jakstadt | G06Q 20/10 |
| | | | 705/35 |
| 7,636,672 B2 | 12/2009 | Angles et al. | |
| 7,636,688 B2 | 12/2009 | Kitchen et al. | |
| 7,698,161 B2 | 4/2010 | Keil et al. | |
| 7,702,579 B2 | 4/2010 | Neely et al. | |
| 7,702,585 B2 | 4/2010 | Lyda et al. | |
| 7,711,641 B1 | 5/2010 | Seale, III et al. | |
| 7,788,172 B2 | 8/2010 | Kight et al. | |
| 7,848,972 B1 | 12/2010 | Sharma | |
| 7,878,390 B1 | 2/2011 | Batten et al. | |
| 7,881,962 B2 | 2/2011 | Mason | |
| 7,930,216 B2 | 4/2011 | Neofytides et al. | |
| 7,945,491 B2 | 5/2011 | Sharma | |
| 8,112,269 B2 | 2/2012 | Cao et al. | |
| 8,121,894 B2 | 2/2012 | Mason | |
| 8,121,945 B2 | 2/2012 | Rackley, III et al. | |
| 8,160,959 B2 | 4/2012 | Rackley, III et al. | |
| 8,271,339 B2 | 9/2012 | Arunachalam | |
| 8,346,894 B2 | 1/2013 | Arunachalam | |
| 8,359,266 B2 | 1/2013 | Seale, III et al. | |
| 8,401,966 B2 | 3/2013 | Stewart et al. | |
| 8,447,641 B1 | 5/2013 | Kaza et al. | |
| 8,504,473 B2 | 8/2013 | Paintin et al. | |
| 8,510,220 B2 | 8/2013 | Rackley, III et al. | |
| 8,538,870 B2 | 9/2013 | Allen-Rouman et al. | |
| 8,589,288 B1 | 11/2013 | Meyer et al. | |
| 8,606,641 B2 | 12/2013 | Khalil | |
| 8,650,108 B1 | 2/2014 | Schram et al. | |
| 8,849,659 B2 | 9/2014 | Tran | |
| 9,984,391 B2 | 5/2018 | Kendall et al. | |
| 10,255,609 B2 | 4/2019 | Kinkead et al. | |
| 2001/0018673 A1 | 8/2001 | Goldband et al. | |
| 2001/0021915 A1 | 9/2001 | Cohen et al. | |
| 2001/0032125 A1 | 10/2001 | Bhan et al. | |
| 2001/0032134 A1 | 10/2001 | Hardesty | |
| 2001/0037297 A1 | 11/2001 | McNair | |
| 2001/0051919 A1 | 12/2001 | Mason | |
| 2001/0056398 A1 | 12/2001 | Scheirer | |
| 2002/0026410 A1 | 2/2002 | Woloshin et al. | |
| 2002/0091637 A1 | 7/2002 | Bent et al. | |
| 2002/0107717 A1 | 8/2002 | Liu et al. | |
| 2002/0120491 A1 | 8/2002 | Nelson | |
| 2002/0131561 A1 | 9/2002 | Gifford et al. | |
| 2002/0152123 A1 | 10/2002 | Giordano et al. | |
| 2003/0135442 A1 | 7/2003 | Kumar | |
| 2003/0154129 A1 | 8/2003 | Goff | |
| 2004/0098307 A1 | 5/2004 | Uehara et al. | |
| 2004/0128235 A1 | 7/2004 | Kemper | |
| 2004/0143502 A1 | 7/2004 | McClung | |
| 2004/0195315 A1 | 10/2004 | Workens | |
| 2004/0230523 A1 | 11/2004 | Johnson | |
| 2004/0249766 A1 | 12/2004 | Ganesan et al. | |
| 2005/0108149 A1 | 5/2005 | Bent et al. | |
| 2005/0165634 A1 | 7/2005 | Rimsky | |
| 2005/0203970 A1 | 9/2005 | McKeown et al. | |
| 2005/0228733 A1 | 10/2005 | Bent et al. | |
| 2006/0059434 A1 | 3/2006 | Boss et al. | |
| 2006/0136282 A1 | 6/2006 | Furin et al. | |
| 2006/0168509 A1 | 7/2006 | Boss et al. | |
| 2006/0173754 A1 | 8/2006 | Burton et al. | |
| 2006/0212385 A2 | 9/2006 | Bent et al. | |
| 2006/0212389 A2 | 9/2006 | Bent et al. | |
| 2006/0253340 A1 | 11/2006 | Levchin et al. | |
| 2007/0027759 A1 | 2/2007 | Collins et al. | |
| 2007/0027799 A1 | 2/2007 | Manelis et al. | |
| 2007/0067236 A1 | 3/2007 | Deinhardt et al. | |
| 2007/0100679 A1 | 5/2007 | Wollan et al. | |
| 2007/0143182 A1 | 6/2007 | Faber et al. | |
| 2007/0179836 A1 | 8/2007 | Juang et al. | |
| 2007/0185810 A1 | 8/2007 | Kalra et al. | |
| 2007/0192168 A1 | 8/2007 | Van Luchene | |
| 2007/0226350 A1 | 9/2007 | Sanda et al. | |
| 2007/0271174 A2 | 11/2007 | Bent et al. | |
| 2008/0065471 A1 * | 3/2008 | Reynolds | G06Q 30/0203 |
| | | | 705/7.32 |
| 2008/0065476 A1 | 3/2008 | Klein et al. | |
| 2008/0065484 A1 | 3/2008 | Miller et al. | |
| 2008/0077499 A1 | 3/2008 | Ariff et al. | |
| 2008/0140530 A1 | 6/2008 | Van Luchene et al. | |
| 2008/0172344 A1 * | 7/2008 | Eager | G06Q 30/02 |
| | | | 705/80 |
| 2008/0201231 A1 | 8/2008 | Bistriceanu et al. | |
| 2008/0243762 A1 | 10/2008 | Allerton et al. | |
| 2008/0294513 A1 | 11/2008 | Buse, Jr. | |
| 2008/0301093 A1 | 12/2008 | Haugen | |
| 2009/0012826 A1 | 1/2009 | Eilam et al. | |
| 2009/0043788 A1 | 2/2009 | Averbuch et al. | |
| 2009/0049372 A1 | 2/2009 | Goldberg | |
| 2009/0070197 A1 | 3/2009 | Ermolli | |
| 2009/0076863 A1 | 3/2009 | Kraft et al. | |
| 2009/0198557 A1 | 8/2009 | Wang et al. | |
| 2009/0198602 A1 | 8/2009 | Wang et al. | |
| 2009/0240567 A1 | 9/2009 | Kinkead et al. | |
| 2009/0254412 A1 | 10/2009 | Braswell et al. | |
| 2009/0265226 A1 | 10/2009 | Martiros | |
| 2009/0307072 A1 | 12/2009 | Morales-Lema | |
| 2010/0076836 A1 | 3/2010 | Giordano et al. | |
| 2010/0106568 A1 | 4/2010 | Grimes | |
| 2010/0106569 A1 | 4/2010 | Grimes | |
| 2010/0106577 A1 | 4/2010 | Grimes | |

(56) References Cited

U.S. PATENT DOCUMENTS

2010/0106596 A1    4/2010  Grimes
2010/0106598 A1    4/2010  Grimes
2011/0035268 A1*   2/2011  Rossi .................... G06Q 20/20
                                                      705/14.17

FOREIGN PATENT DOCUMENTS

WO    2000/079426 A1    12/2000
WO    2001/69501 A1     9/2001
WO    2010/047854 A2    4/2010

OTHER PUBLICATIONS

U.S. Appl. No. 12/390,972, filed Feb. 23, 2009, 2009-0240567, Published.
U.S. Appl. No. 13/404,166, filed Feb. 24, 2012, U.S. Pat. No. 10,255,609, Issued
Ahlm et al., Traditional market segmentation—an evaluating approach. School of Econimics and Management, Lund University. 71 pages, May 29, 2007.

* cited by examiner

60

| Bill Pay Help | close window |

| Contents | Getting Started | FAQs |

Getting Started with Bill Pay

- Getting Started with Bill Pay
- What can I do with Bill Pay?
- How do I move around?
- How do I use Help?

Welcome to Bill Pay!

Pay anyone online that you pay today by check-quickly and conveniently, You can:

- Pay anyone. Add any person or company in the United States as a payee, and then make payments to those payees at your convenience.
- Schedule recurring payments. Let Bill Pay automatically make your repeating payments, such as a mortgage payment or a rent payment, at the frequency, duration, and amount you choose.
- Receive and pay e-Bills online. Many payees can send you electronic versions of your bills (e-Bills) through Bill Pay. You can pay your e-Bills as they arrive by setting up e-Bill initiated payments.
- Feel confident that your online payments are secure. Bill Pay uses Secure Socket Layer (SSL), which ensures that your connections and information are secure from outside inspection. Bill Pay also uses 128-bit encryption to make your information unreadable as it passes through the Internet.

62

Done — Internet — 100%

Demographics

Gender
Ethicity
Race
Age
Income
Lifestyle
Interests

[ Submit ]

Marketer Sign Up

| | |
|---|---|
| First Name | John |
| Last Name | Smith |
| Title | Marketing Coordinator |
| Company Name | Company |
| Telephone | 508-254-8446 |
| Cell Phone | 774-217-8125 |
| Email | johnsmith@company.com |
| Address 1 | 23 Company Dr. |
| Address 2 | Suite 399 |
| City | Framingham |
| State | MA |
| Zip | 02887 |
| Credit Card | 1398 2339 4912 4900 |
| Expiration Date | 12/10 |
| Code | 299 |

500

Submit

FIG. 9

MICRONOTES

Consumer Demographics

2009 First Quarter

| Id | Gender | Age | Race | Income | Education | Occupation | ZipCode |
|---|---|---|---|---|---|---|---|
| 401 | M | 39 | B | 62751 | H | education | 02882 |
| 402 | F | 64 | H | 105807 | H | legal_paralegal | 02863 |
| 403 | F | 77 | B | 129229 | M | software_qa_dba | 02905 |
| 404 | F | 66 | H | 109595 | B | accounting_finance | 02802 |
| 405 | M | 21 | W | 75708 | H | government | 02853 |
| 406 | F | 35 | B | 56074 | G | business_mgmnt | 02827 |
| 407 | F | 60 | H | 99130 | B | transport | 02916 |
| 408 | M | 85 | A | 122552 | M | security | 02898 |
| 409 | M | 29 | W | 43609 | G | art_media_design | 02918 |
| 410 | M | 87 | A | 145975 | H | general_labor | 02838 |
| 411 | M | 67 | B | 112088 | B | sales_biz_dev | 02888 |
| 412 | F | 56 | H | 92453 | M | technical_support | 02910 |
| 413 | M | 81 | A | 58567 | G | customer_service | 02829 |
| 414 | M | 25 | W | 38932 | G | internet_engineers | 02839 |

| | What motivates people to shop here? | What percent of people do you think will answer the same way you did? | Average Prediction | Tag | Describe the lifestyle of people shopping here? | % answering the same? | Average Prediction | Tag | Describe the Ethnicity or cultural identity of people who shop here | % answering the same? |
|---|---|---|---|---|---|---|---|---|---|---|
| CHECKCARD 1231 | Convenience | 80 | 75 | Convenience | Active | 80 | 65 | Active | Asian | 40 |
| CHECKCARD 12025 | Convenience | 50 | 65 | UNRELIABLE | Sedentary | 40 | 70 | UNRELIABLE | White American | 60 |
| 1040 COAST VIL 11/23 | Convenience | 20 | 50 | UNRELIABLE | Sedentary | 40 | 50 | UNRELIABLE | White American | 70 |

| Category=Groceries | Quarterly Spending | | | | |
|---|---|---|---|---|---|
| Customer ID | Seller 1 | Seller 2 | Seller 3 | Seller 4 | Seller 5 |
| 10000001 | $ 2,286 | $ 44 | $ 22 | $ 111 | $ 9 |
| 10000002 | $ 40 | $ 25 | $ 3,000 | $ 125 | $ - |
| 10000003 | $ 225 | $ 2,200 | $ 5 | $ 10 | $ - |

822

| Attributes | | | | | |
|---|---|---|---|---|---|
| Low Price | 1 | 0 | 0 | 0 | 0 |
| Quality | 0 | 0 | 1 | 0 | 0 |
| Wide Selection | 0 | 1 | 0 | 0 | 1 |
| Exclusivity | 0 | 0 | 1 | 1 | 0 |
| Convenience | 0 | 0 | 0 | 1 | 0 |
| Ethnic foods | 1 | 0 | 1 | 0 | 0 |
| Great Service | 0 | 0 | 0 | 0 | 0 |

825

| | Great Service | Ethnic foods | Convenience | Exclusivity | Wide Selection | Quality | Low Price |
|---|---|---|---|---|---|---|---|
| | 0 | 0 | -2175 | 0 | -2259.5 | -2264 | 0 |
| | 0 | 0 | 85 | 0 | -27 | 2960 | 0 |
| | 0 | 0 | -215 | 0 | 875 | -220 | 0 |

Utilities 820  824

| | |
|---|---|
| Customer ID | 10000001 |
| Age | 35 |
| Gender | M |
| Education | B.S. |
| Zip Code | 02142 |
| Income | 50-75K |
| Occupation | Accountant |
| Family size | 3 |
| Dwelling | Homeowner |
| Stage in lifecycle | Working |
| Groceries-Great Service | 0 |
| Groceries-Ethnic foods | 0 |
| Groceries-Convenience | -2175 |
| Groceries-Exclusivity | 0 |
| Groceries-Wide Selection | -2259 |
| Groceries-Quality | -2264 |
| Groceries-Low Price | 0 |

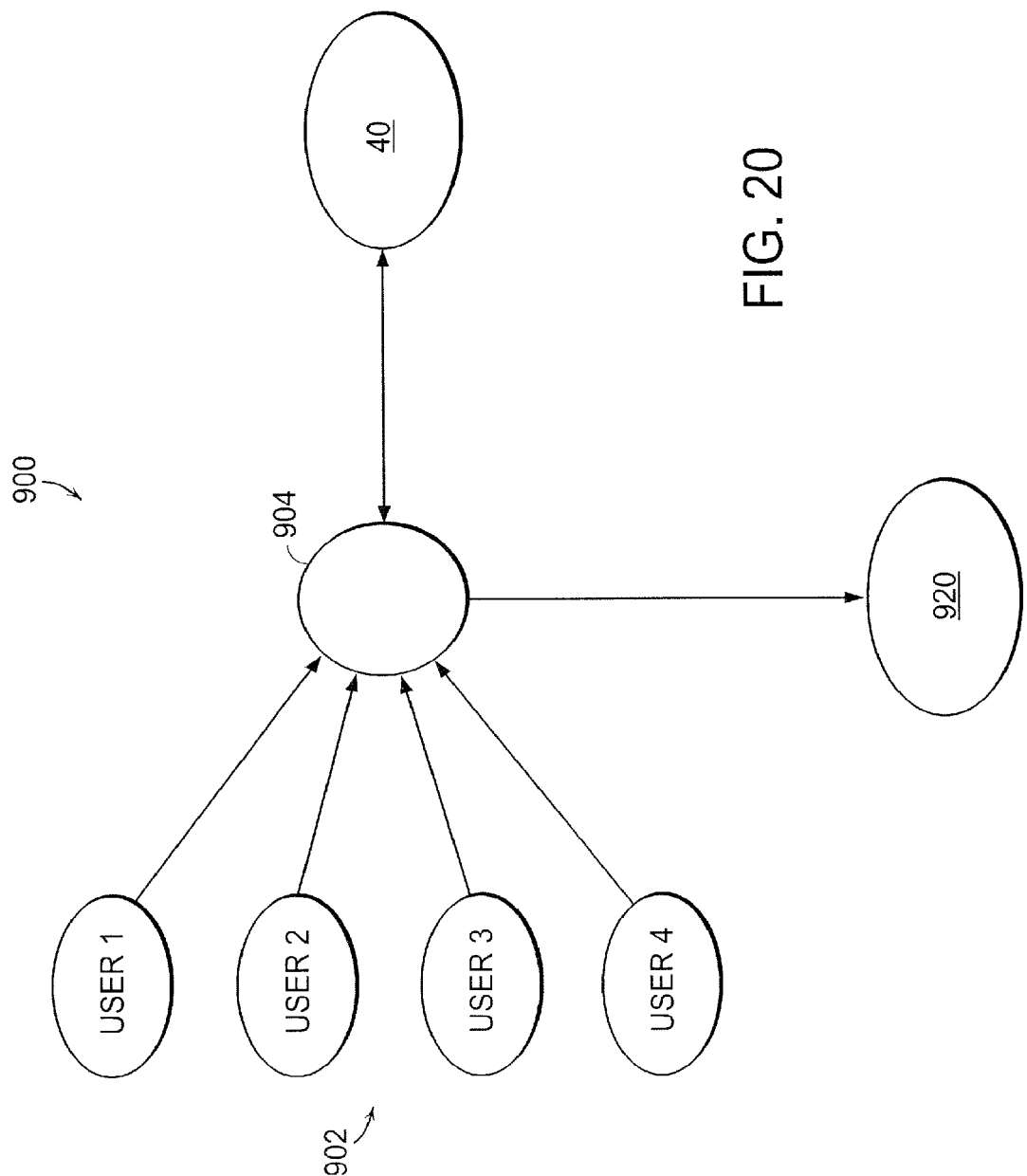

KulaQ Audience Definition

Home Dashboard

Wednesday, September 08, 2010 01:43 PM EST

Message Center

The System will be offline for 15 minutes this Sunday August 28th for routine updates and maintenance. Please make a note of this activity. If you have questions please call the 1-800 help Desk or email us at:

What's New

Alert:
You currently have 3 campaigns that are scheduled to expire on Monday, August 22, 2012

Tuesday, August 10 2010
You have been invited to review Martin new campaign: The _____ Association campaign. Click here to accept the reviewer's invitation and learn more.

Monday, August 30, 2010
You have been invited to review Tom new campaign: _____ Nation campaign. Click here to accept the reviewer's invitation and learn more.

Create New
- Audience — NEW
- Communications — NEW
- Campaign — NEW

- Audience — View/Edit
- Communications — View/Edit
- Campaign — View/Edit

Home | New/Edit | Administration | Support | Log Off

| moneycenter by [BETA] | | | | | My Profile ▾ Support ▾ Log Out | | |
|---|---|---|---|---|---|---|---|
| Dashboard | My Accounts | Budgeting | Payments | Support | Store | Calendar | |

My FinApps

Account Summary

View: [All Accounts] [Show]  Update All Accounts

| Banking (5) | $10,049.98 |
|---|---|
| DagBank - No Savings xxxx2017 | $320.17 |
| DagBank - Test Account Again xxxx2014 | $320.14 |
| DagBank - TESTDATA xxxx3xxx | $44.78 |
| DagBank - TESTDATA1 xxxx3xxx | $9,044.78 |
| TestDAGAccount xxxx2011 | $320.11 |

Help

About Account Summary
Use Account Summary to view accounts and balances quickly. Click on account name to view the latest activity.

Quick Links
- Link an Account
- Group Accounts
- Share Accounts
- View Full Transaction History
- View Net Worth Statement
- Chart Income vs. Expenses
- Go to Alerts Inbox
- Add Estimated Market Value of Your Home
- Add Manual Account

KulaMula 8-29 (6)  [_][x]

| Dashboard | My Waiting Room | My Deals | Cash out | FAQ | Support | Feedback |

My Deals

Herb Chambers
$500 off of a ne...        Expires: December 3, 2010        Deal Taken September 8, 2010

.com
» offer you $500 off of the best price for any new
... lease print this email and bring it with you to any
Find the most convenient location for you online or see the list of dealers below. Thank you for participating in our trial and enjoy your savings! Sincerely, The Micronotes Team *Limit 1 per customer. Offer valid for new customers and cannot be combined with any other advertised price, promotion, Internet Special, Current

| % of Income Spent | Dining Expenses | Cash to Spend |

FIG. 24J

INTERACTIVE MARKETING SYSTEM

CROSS REFERENCE TO RELATED APPLICATIONS

This application is a continuation of U.S. application Ser. No. 13/404,166 filed Feb. 24, 2012, which claims priority of U.S. Provisional Application No. 61/448,896 filed Mar. 3, 2011, and is also a continuation-in-part of U.S. application Ser. No. 12/390,972 filed Feb. 23, 2009 which claims priority of U.S. Provisional Application No. 61/066,573 filed Feb. 21, 2008. The entire contents of the above applications are incorporated by reference herein.

BACKGROUND OF THE INVENTION

Systems for electronic marketing of goods and services via public access networks have utilized paid search advertising using a vendors' website. However, these methods do not provide for an interactive marketing capability, usually because the user is not motivated to participate in surveys and is unlikely to return to a website on a periodic basis.

Techniques commonly referred to as business intelligence (BI) relate to tools used to report and analyze information relating to financial marketing sales. These tools utilize multidimensional database search and analyzes methods. Systems that involve periodic networked communications include electronic bill paying systems and other types of financial transactions that are recorded in electronic databases.

There is consequently a need for further improvement in systems and methods for conducting marketing operations in combination with electronic transactions and records.

SUMMARY OF THE INVENTION

Preferred embodiments of the present invention relate to marketing of goods and/or services using a public access networks, and more particularly to interactive direct marketing with periodic users of network sites. Periodic users of a website system engage in financial transactions occurring on a regular basis typically in connection with the monthly payment of debts. Alternatively, periodic use of a network site can involve subscription services of various kinds in which a user participates in periodic communication enabling periodic interactive marketing.

The purpose of all marketing and sales activities is to locate a qualified prospect and sell that prospect a product or service. Effective sales conversations with consumers have historically been confined to the shop floor where a sales person and prospect interact in a directed conversation insofar as, a good sales person's next question depends upon the prospect's answer to the previous question. For example, if a shoe salesperson asks, "May I help you find some shoes?"—if the prospect's answer is, "No, thanks—I am just waiting for my mother"—the next question ought not be, "we'll, what kind of shoes are you looking for?"—that question would be a waste of sales effort and an annoyance to the prospect.

In effect, however, much of advertising works like our bad salesperson example. "Would you like to buy a cell phone?" "No, thanks . . . . I just bought one yesterday (silently)" "Which model would you like to buy?" Advertising response rates ranging between 0.001% and 2.5% are ample evidence of this lack of relevance and feedback, setting aside, for the moment, another objective of advertising being to build brand awareness.

The best solution to date to this problem has been paid search advertising wherein a self-selected group of interested parties find relevant merchants based on the search system's review of the merchant's website content and the price paid by the merchant to the search company for the search term.

To facilitate more effective access to consumer of goods and services, preferred embodiments of the present invention utilize systems involving periodic networked communications and an interactive communication sequence, along with an incentivized participation process to provide a more reliable networked marketing system.

The system provides access to marketers of companies to engage in a series of communications with users based on access to one or more databases providing three or more dimensional of searchable data. Companies can then be organized to query periodic users of a system regarding their use of goods and services and compensating the users for each response.

A preferred embodiment utilizes the periodic nature of many financial transactions that occur using public access networks along with an interactive communication process that a user is motivated to use due to incentive of obtaining further discounts for existing debits and/or in connection with future purchases of goods and services. A preferred embodiment of the invention provides systems and methods that incentivize debtors to pay early, as well as participate in one or more marketing compaigns, thereby leading to lowered debt costs and improved credit scores. This system provides a method of acquiring and aggregating debt payments at a discount, and then investing those debt payments into financial instruments which increase in value with time before the due date, while at the same time assuming and paying that same debt obligation. This system incentivizes early payment by the debtor, which lowers debt payment costs and improves debtor credit scores. The same system also rewards creditors with more timely cash inflows and lower customer conflict and service costs.

A preferred embodiment of the invention utilizes one or more communication networks to execute various functions of the debt payment and marketing system. A user can access the system using a personal computer such as a desktop, laptop or handheld computer, or by standard telephone (POTS) service, wireless cellular telephone, or Web enabled telephone device. A public access communication network such as the Internet can be used with a computer program operating on the computer, telephone or other device to enter information, obtain information via the communications network and execute the transfer of funds necessary to acquire financial instruments and/or pay debts in accordance with the invention.

A preferred embodiment of the invention utilizes an automated system to obtain money market and bond rates via a public access network, or through a dedicated server that periodically updates rate information.

Different vendors such as banks or other financial vendors can provide a system in which the user can provide for payment in advance of a due date at a lower amount. For example, a bank or other vendor, can have a server system that is accessed by a debtor to effectuate payment of debts to the bank and/or other parties. The debt obligation can also comprise a debt to be incurred in the future such as the purchase of products or gifts at a future date, the payment of no interest or low interest loans, or the payment of a tax obligation.

BRIEF DESCRIPTION OF THE DRAWINGS

FIG. 2A illustrates a screenshot and associated demographics entry form used to initiate participants in a debt payment and marketing system.

FIG. 9 illustrates a marketer entry form that enables access to marketer participation.

FIGS. 10A-10B illustrate data accessed from system memory by marketers.

FIG. 18A illustrates an example of the Bayesian Truth Serum method.

FIG. 18B illustrates the use of regression coefficients as utilities.

FIG. 19A illustrates the assignment of utilities to each user.

FIG. 20 illustrates a rotating savings and credit organization (ROSCA) system in accordance with a preferred embodiment of the invention.

FIGS. 24A-24L illustrate screenshots of preferred embodiments of the invention.

DETAILED DESCRIPTION OF THE INVENTION

The present application is a continuation-in-part of U.S. application Ser. No. 12/390,972, filed Feb. 29, 2009, which claims priority to U.S. Provisional Patent Application No. 61/066,573 filed Feb. 21, 2008. The entire contents of the above applications are incorporated herein by reference.

Figure 1A:
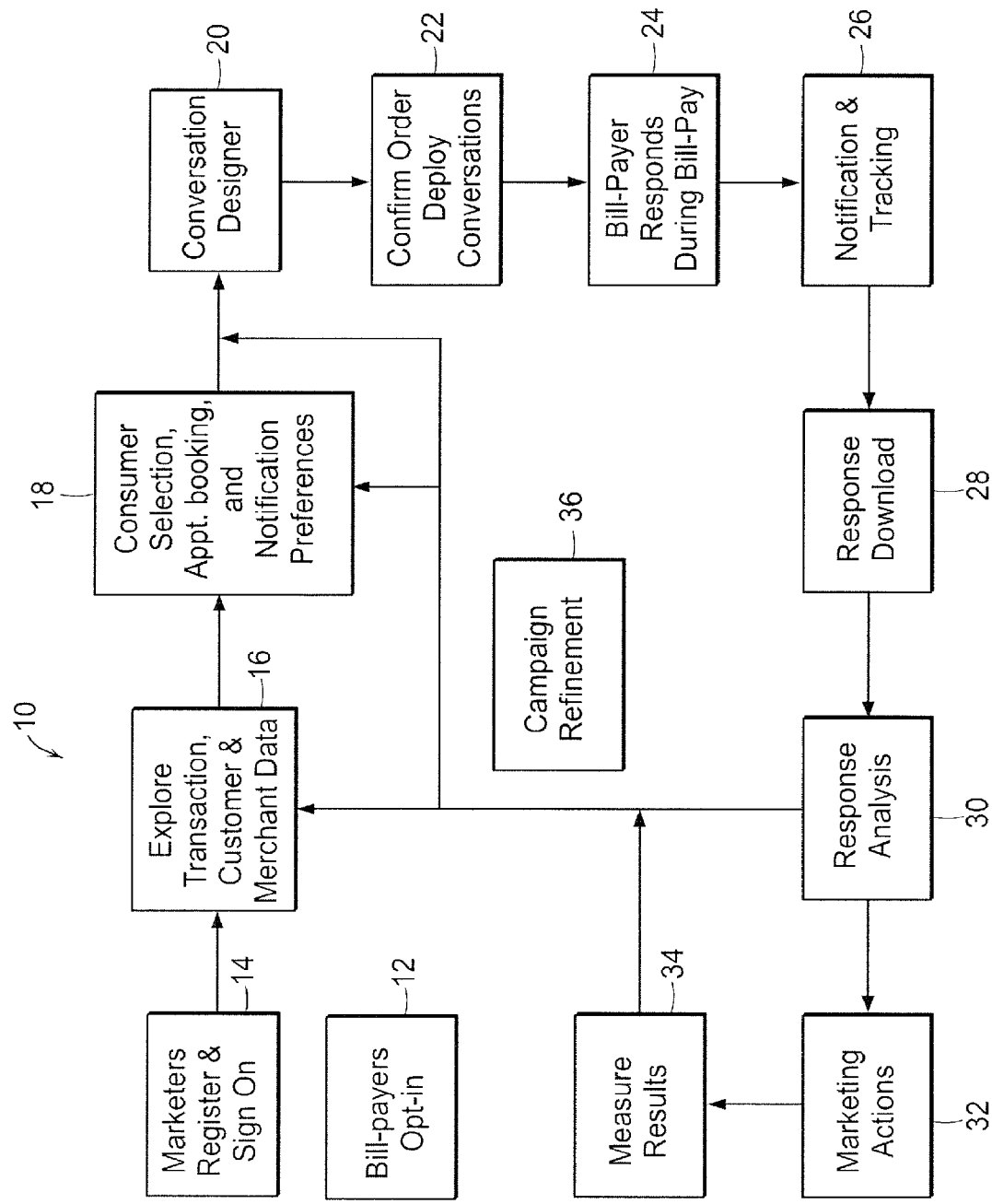
FIG. 1A schematically illustrates a system for direct marketing in accordance with a preferred embodiment of the invention.

FIG. 1A illustrates a preferred process 10 for implementing preferred embodiments of the invention. This process utilizes a public access network in which a first group of users, such as those seeking to pay their bills or debts using electronic transfers from their bank accounts, who elect 12 to utilize the service. A second group of users also elects 14 to participate by registering to participate for the purpose of marketing particular goods or services. The second group, or marketers, gains access 16 to a system database to identify potential users interested in those products and services. The marketer can then identify and make appointments 18 with a particular subgroup of users and design 20 a conversation to initiate the interaction. After conversations are deployed 22 users respond in connection with one or more bill-paying transactions 24. After notification and tracking 26, the response is downloaded 28 and recorded 30; followed by marketing 32 and measurement of response 34.

Figure 1B:
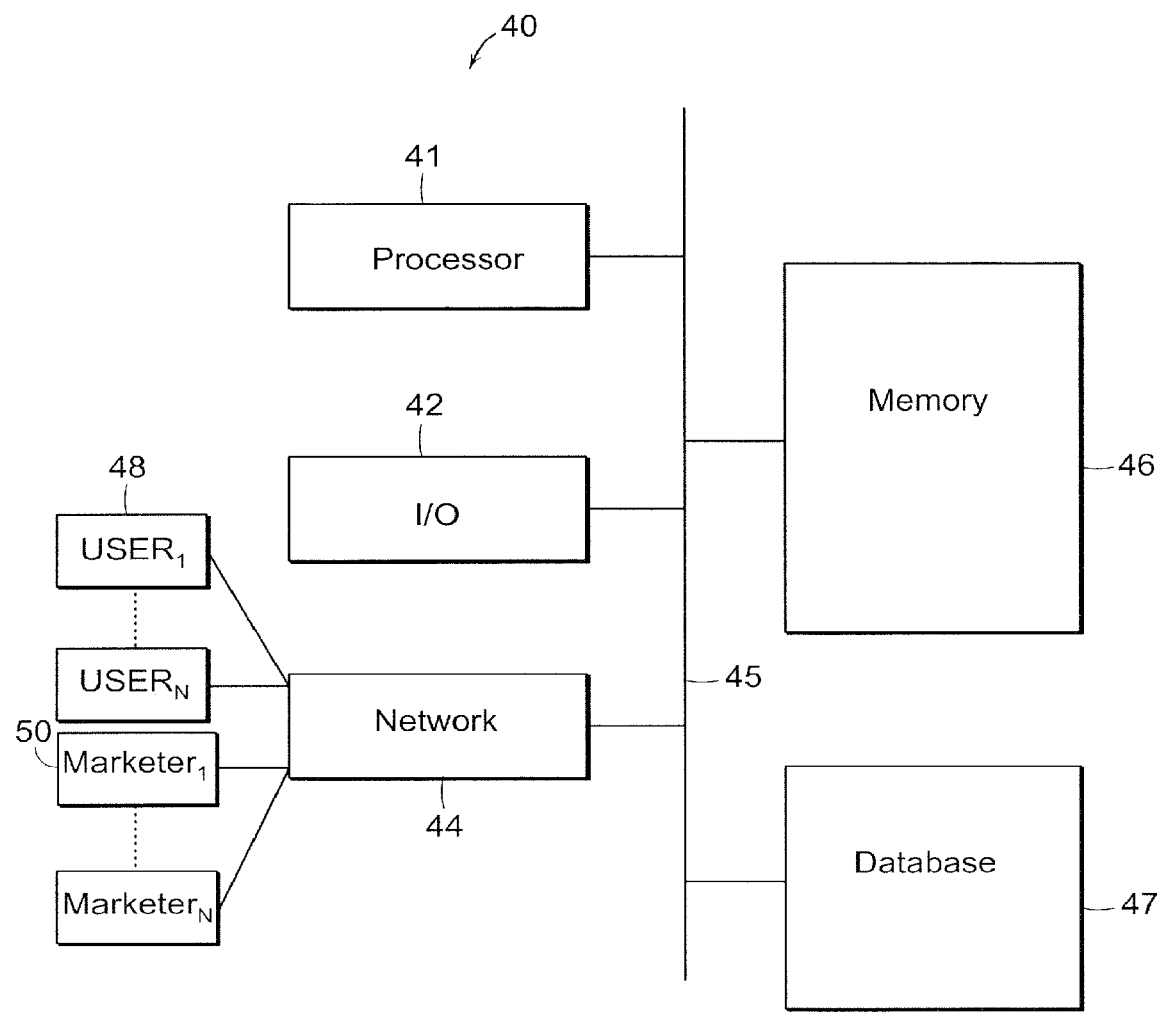
FIG. 1B illustrates a system to access and perform online analytical processing.

Shown in FIG. 1B is a system used to perform online analytical processing (OLAP) in accordance with a preferred embodiment of the invention. A computer system or server 40 has a processor 41, input and output devices 42, a network connection 44, memory 46 and database systems connected by a bus 45. The network enables connection to a multiplicity of users 48 and one or more marketers 50.

The database 47 can be an OLAP cube, for example, in which large quantities of user data or stored and used as described in greater detail herein. The database 47 can be queried using a search engine or routines based on search parameters selected by the marketer. An interface, such as, an application program interface (API) can be configured to enable searching of the database 47 based on selected search parameters. A further program including executable instructions can be stored in memory 46 or in memory associated with the database 47, can be used to generate reports for display, to perform specific queries or analyze data. The first group of users elects to participate by accessing a screen 60 with instructions 62 as shown in FIG. 2A. The user submits a preset required list of demographic data 66 entered on a form 64.

Figure 2B:
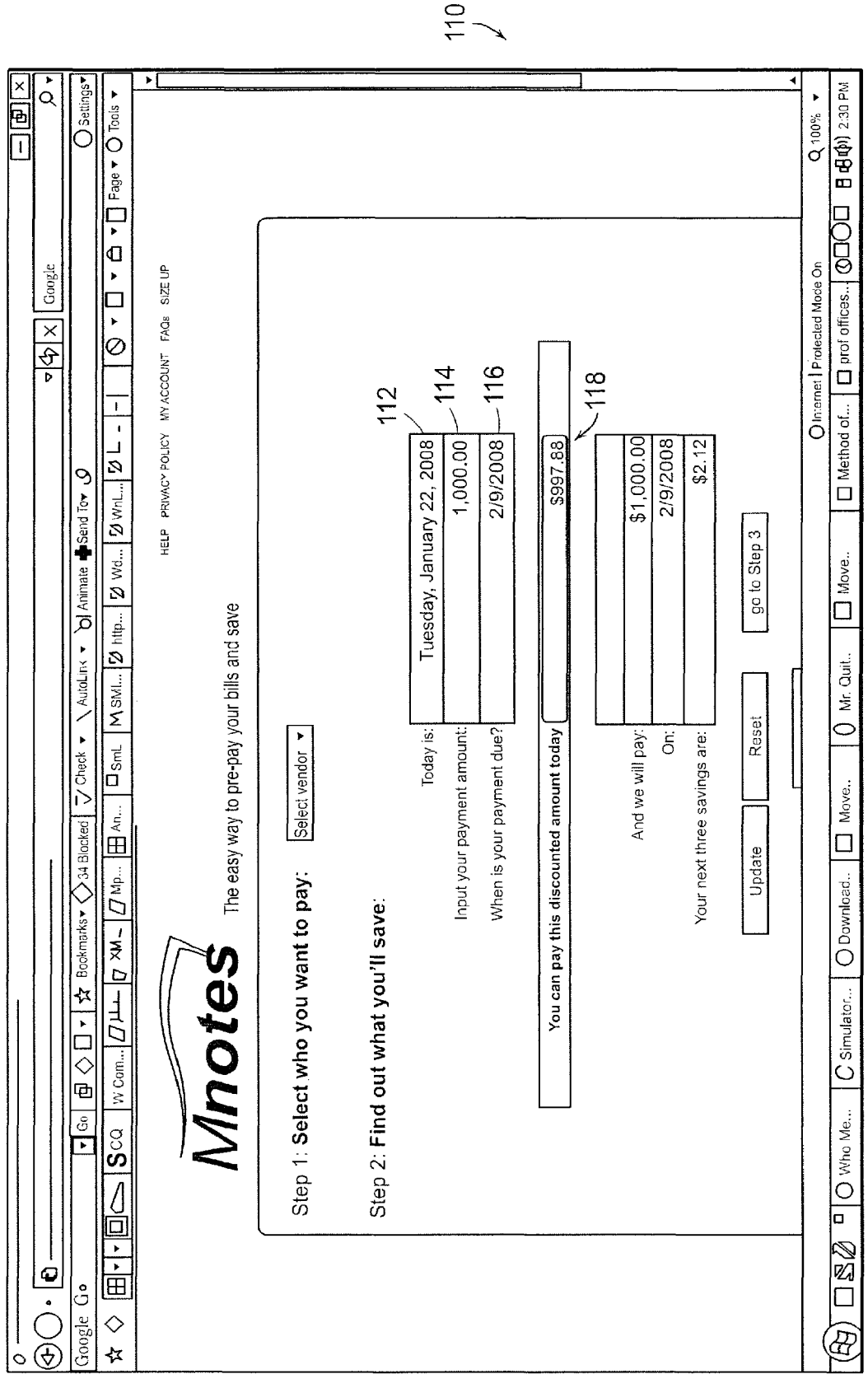
FIG. 2B is an example of a graphical user interface in accordance with a preferred embodiment of the invention.

In a preferred embodiment a customer accesses a debt-discount service via a handset, computer, or telephone. The user enters the amount of their debt 114, such as a credit card bill, and its due date 16 using the graphical user interface 110 (GUI) as shown in FIG. 2B. The system returns a value which the customer can choose to accept or not. With acceptance, the customer completes the payee information, unless it is already stored, and the accepted value amount 18 is transferred from the customer's account to the system, which invests those funds in low-risk, short-duration financial investments, for example, and pays the amount due on the due date from the cash flows resulting from those investments. The system earns a spread on the difference between the discount rate offered and the return on invested funds.

Figure 2C:
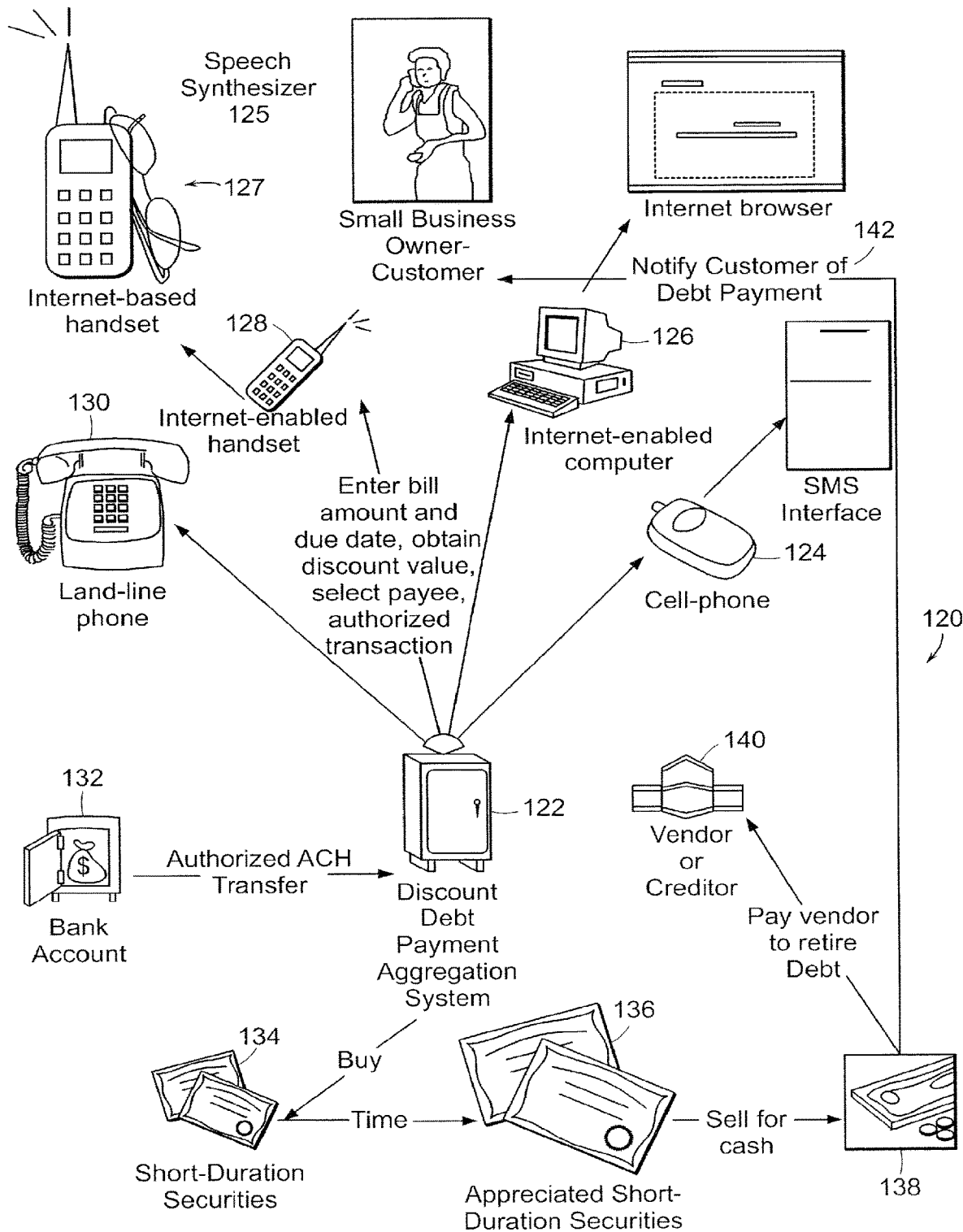
FIG. 2C is a schematic of communication networks in accordance with a preferred embodiment of the invention.

Shown in FIG. 2C is a schematic diagram of a networked communication system 120 for debt payment conducted in combination with marketing communication in accordance with a preferred embodiment of the invention.

The system 120 can include a central processor or server 22 that communicates with users via cellular telephone 124, a computer 126 connected to a public access network, an internet enabled handset 128, or a standard telephone system (POTS) 130. The server 122 also accesses the user's bank account 132, a system for acquiring securities 134 which are stored 136 until transfer 138 for satisfaction of the debt held by vendor or creditor 140. Notice 142 can then be delivered to the user. The system can include a speech synthesizer 125 operated by a control 127 that can incorporate a program for detecting typographical errors in recording instructions and responses to queries by the user.

The present invention involves no annual fees nor does it provide credit and in fact, one purpose of the present invention is to eliminate late fees by incentivizing early payment.

In contrast to other early payment methods, the present invention provides a discount which can vary linearly with the time value of money, not with the value of purchases or other restrictions. Nor does the present invention involve extraction of money from the vendor to return to the debtor or credit card holder and does not accrue the discount but rather, renders it upon the first transaction.

Note that a preferred embodiment of the invention does not function after the due date of the debt. Note additionally that the present invention does not involve paying a debt with another debt. Alternatively, the present invention can be used to make a debt payment after the due date at an increased value, for example. The payments can be made, for example, using this system on specified dates to avoid penalties for late payment.

Figure 3:
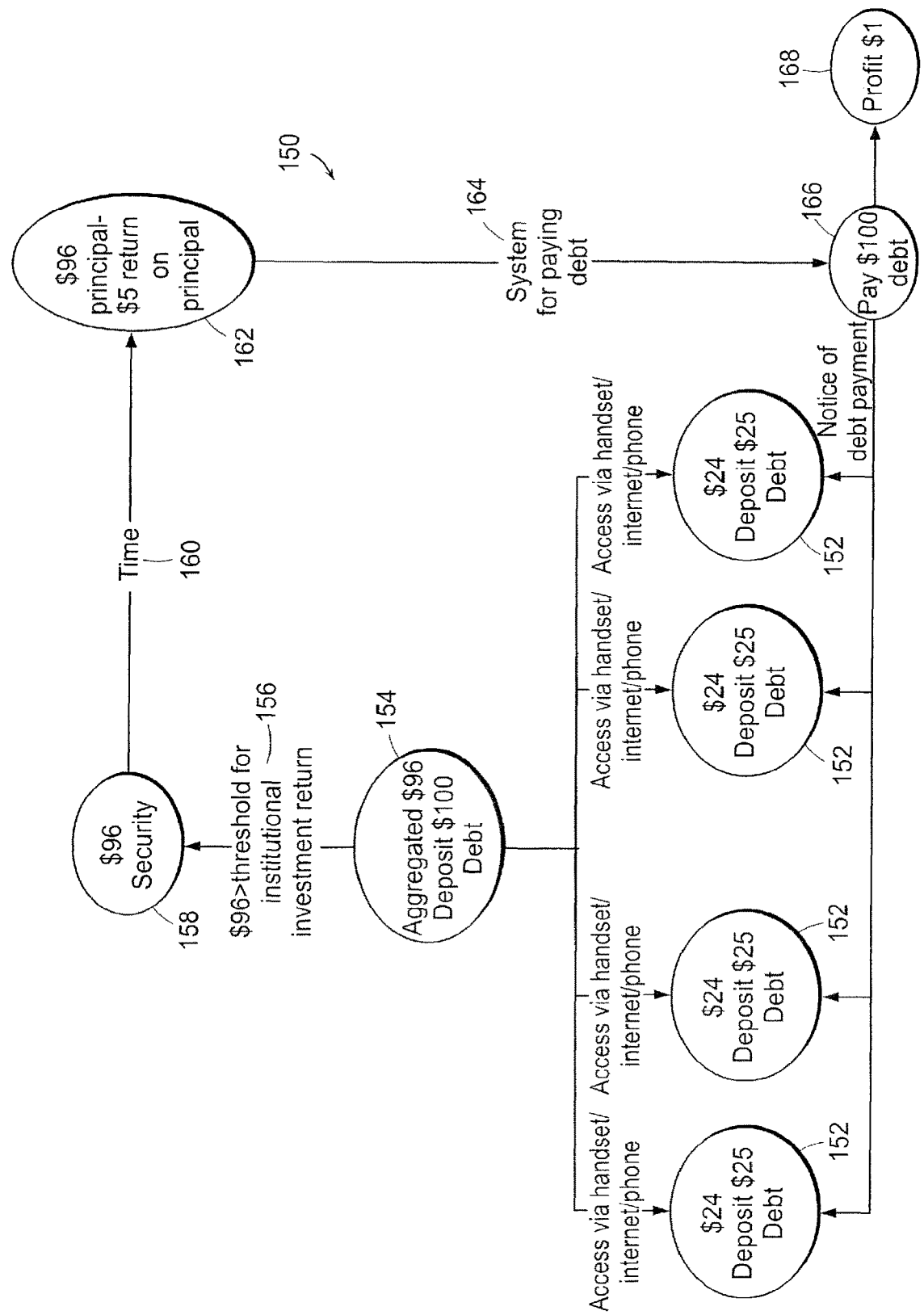
FIG. 3 is a process sequence for paying debts in accordance with a preferred embodiment of the invention.

The system shown in FIG. 3 is a process sequence 150 that can be executed using a software program in which separate payments 52 that need to be made are aggregated 154, compared 156 to a threshold amount needed to make the secured transaction at 158 to acquire an instrument that increases in value over time period 160. The principal with the increased value 162 is then processed by system 164 to pay the debt 166. Any residual value 68 more than the actual debt obligation can be returned to user.

Figure 4:
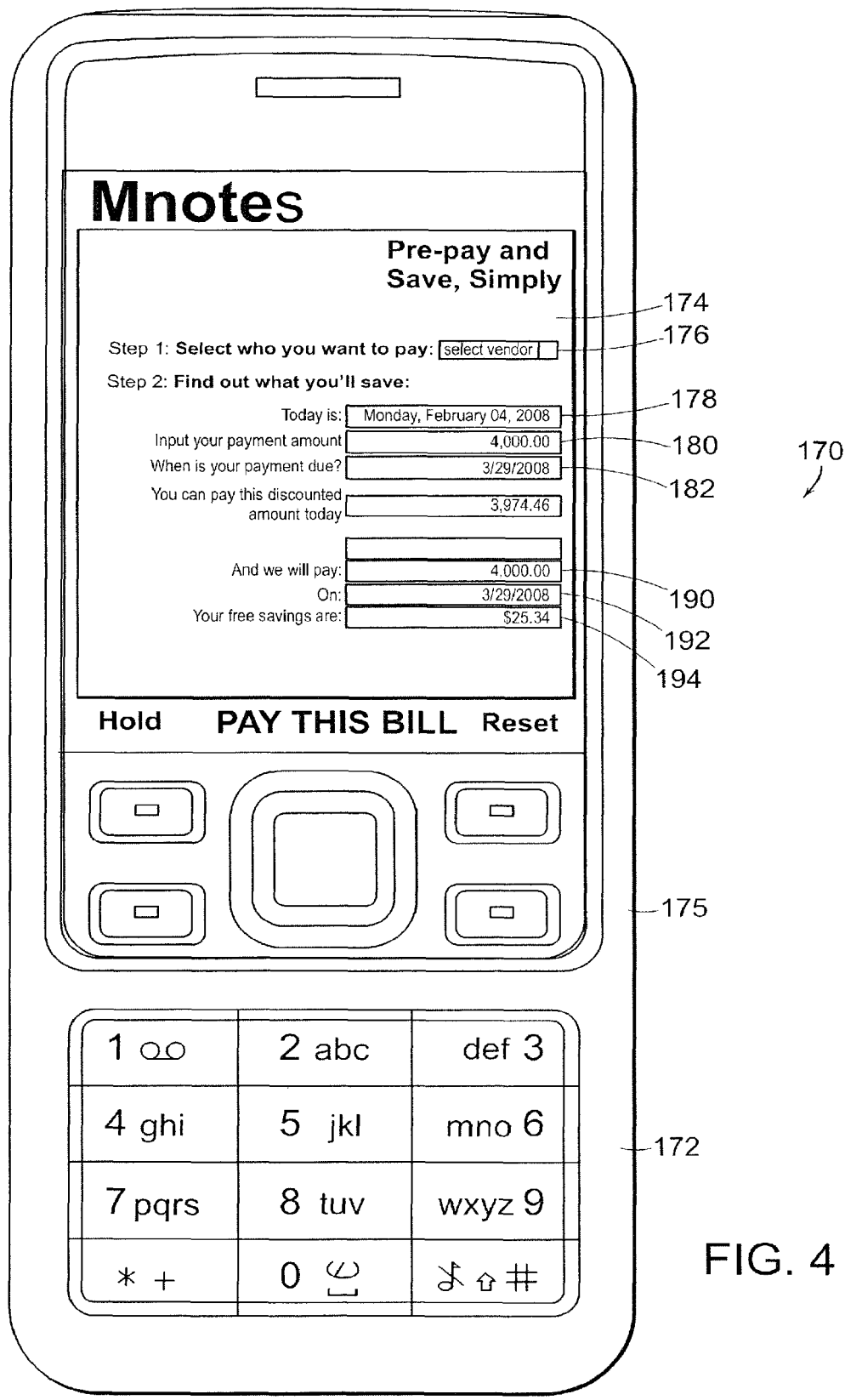
FIG. 4 illustrates the use of a wireless cellular telephone with a screenshot used to prepay in accordance with the invention.

FIG. 4 illustrates an embodiment in which a wireless telephone 170 having an electronic display 174 is used to display a screen in which a vendor can be selected 176 to make the transaction. A keypad 172 is used to enter data onto data entry windows including the present date 178, the payment amount 180, the due date 182, the confirmation of payment 190 to be made on the selected date 192 and a line indicating the amount saved 194. A control panel 175 is used to activate the transaction.

Figure 5:
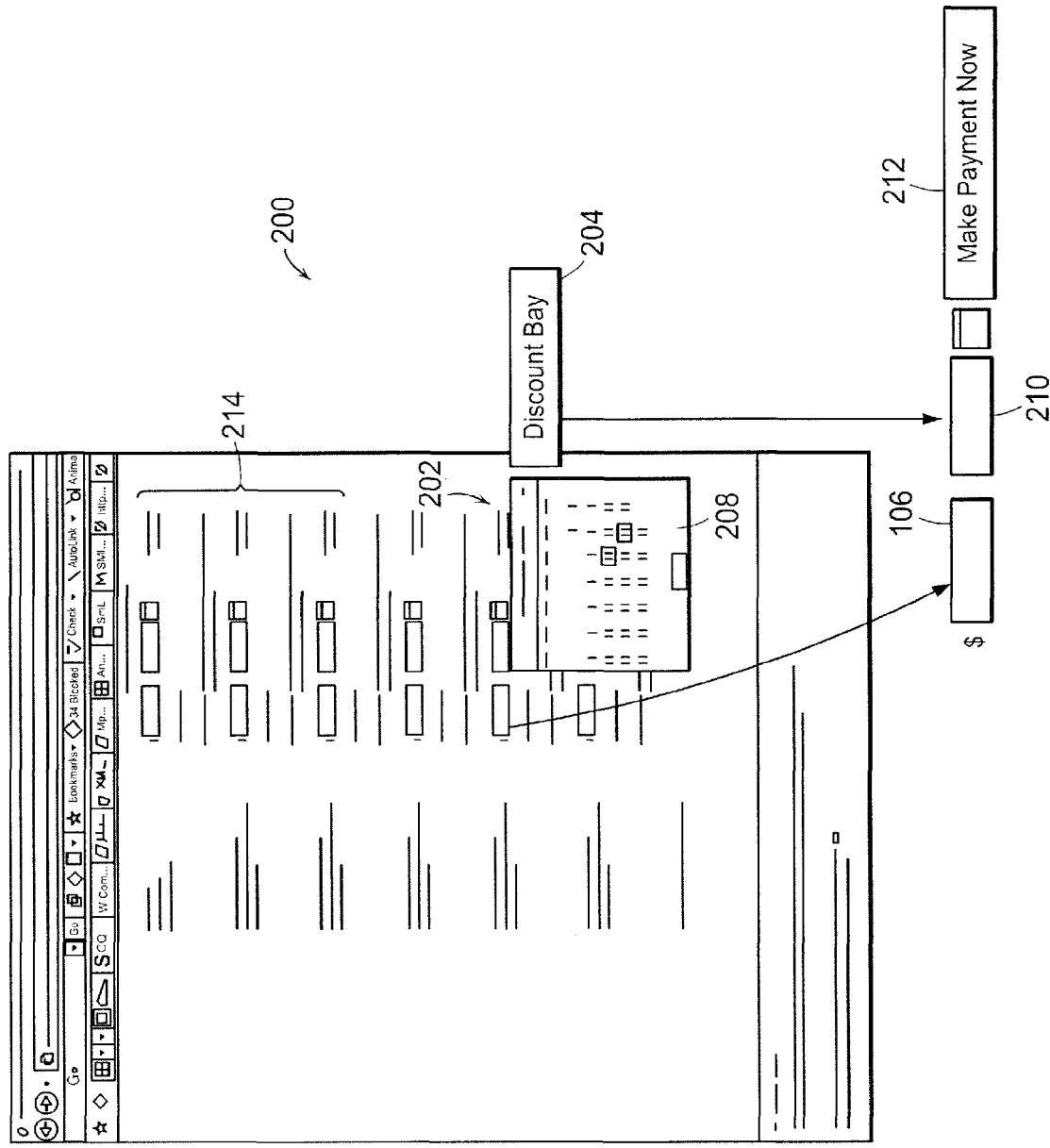
FIG. 5 is a screenshot of a program used by a financial institution or other vendor.

Illustrated in FIG. 5 is a screen 200 used by a bank or other vender for payment of debts that is accessed by the user to insert the required data fields for this operation. The debt payment field 202 is selected from a plurality of fields 214 including the amount of the debt 206, the present date and due date can be selected using a pull down calendar option 108, and the current payment 204 shown in field 210. A virtual button or control panel 212 can be used to execute the transfer.

Figure 6:
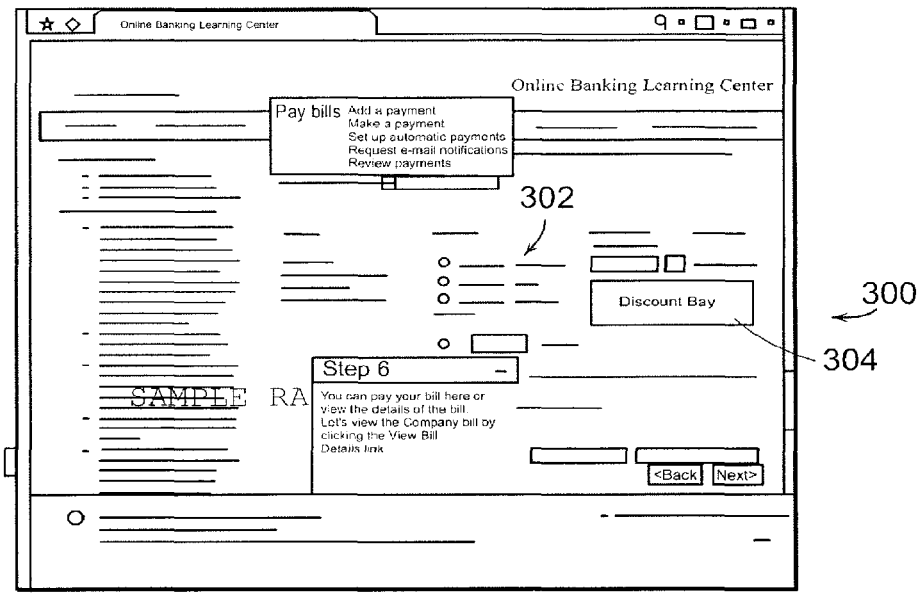
FIG. 6 illustrates a screenshot in which a bank or other vendor utilizes a discounted electronic bill paying process.

Shown in FIG. 6 illustrates a screen 300 of a bank or other vender having data entry fields 302 and control elements 304 to electronically execute discount payments as set forth herein. These payments can include those obligations to the bank or vendor or to other parties, companies, institution or individuals.

Figure 7:
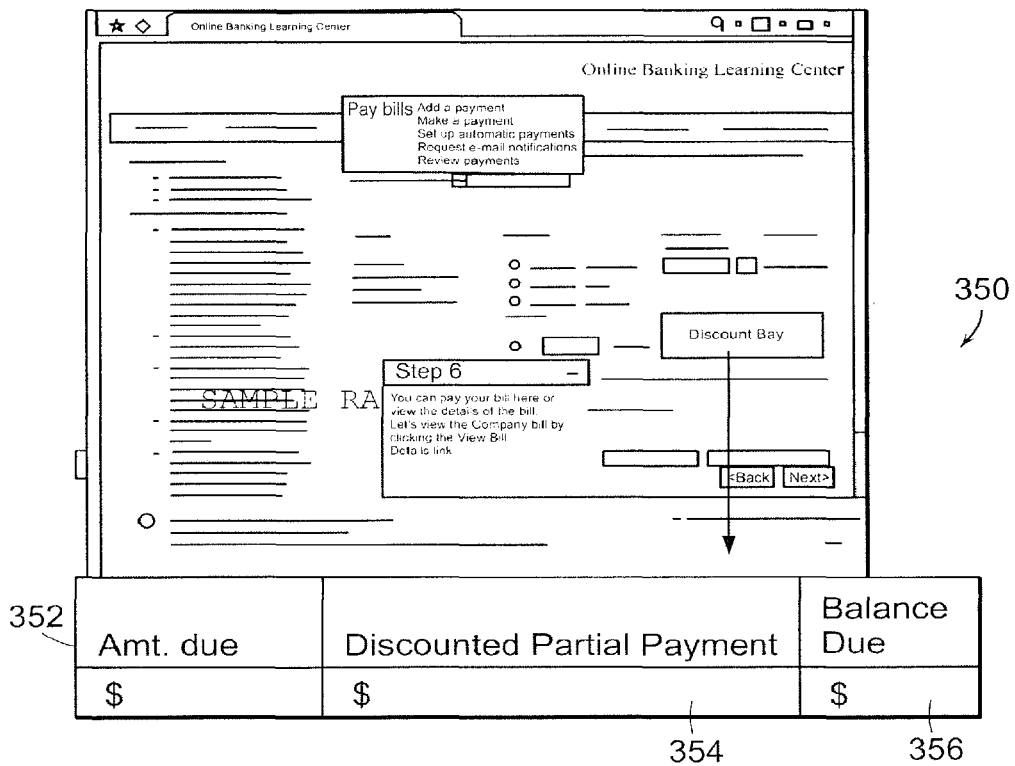
FIG. 7 illustrates an example of a partial payment system.

Shown in FIG. 7 is another preferred embodiment in which the user can enter the amount due 352, select a partial payment amount 354 to make a first payment, with a third field 356 used to confirm the amount still due.

Figure 8:
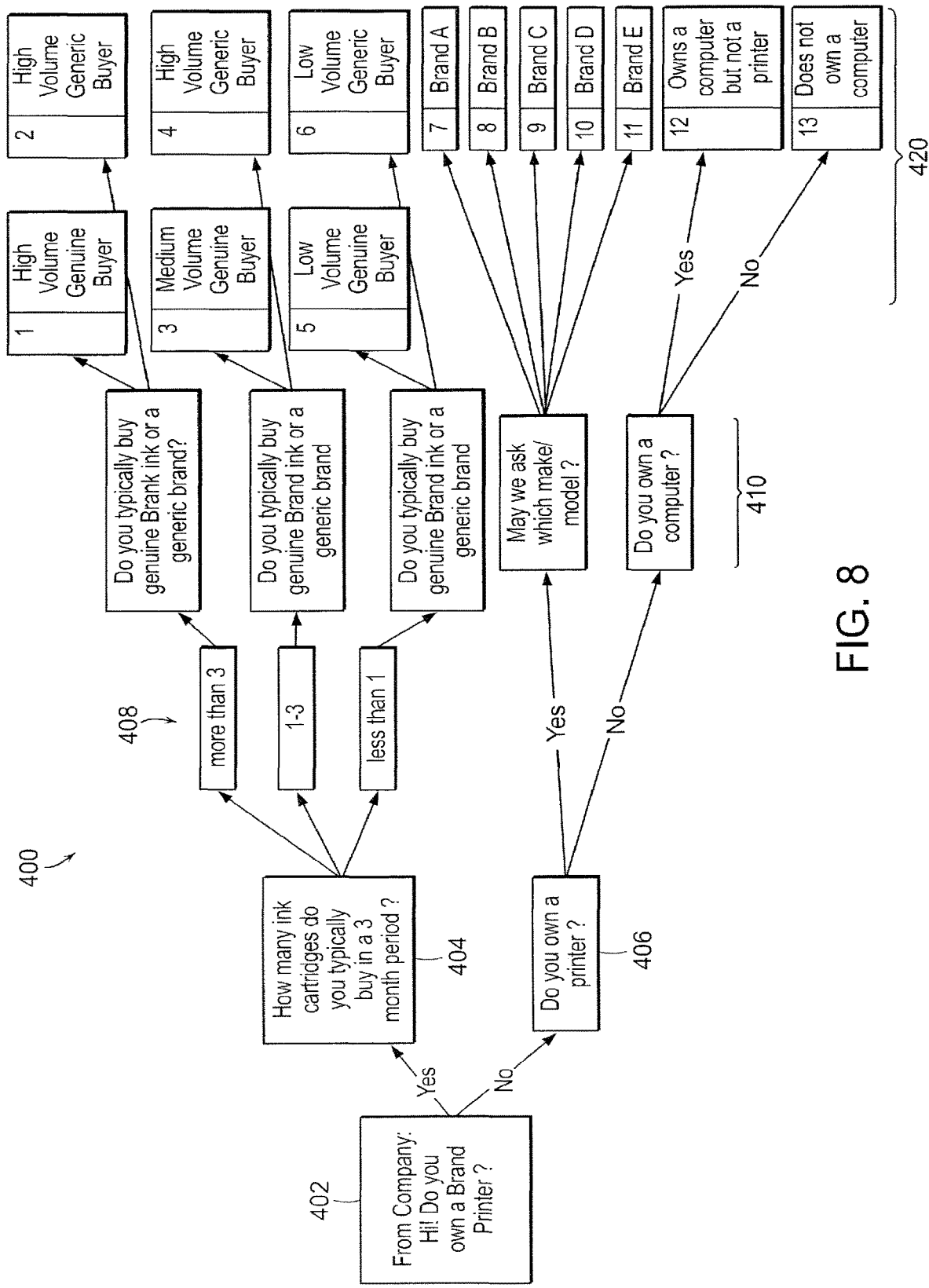
FIG. 8 illustrates a sequence of queries and respondent options.

Based on the periodic communication that occurs, typically on a monthly basis, in connection with many financial transactions, such as the electronic payment of debts, the present invention enables the marketer to start with a list of good quality leads and compensates users of the system to answer a few additional qualifying questions. For example, starting with the knowledge that they all purchased more than $50 in office supplies in the last 3 months at a competitors' office supply store, the marketer, with the single sales objective to sell a particular vendor's printer ink, might first ask 100 people "Do you own that vendor's printer?" From this answer the answer tree begins branching as illustrated below:

A communication sequence 400 having queries and responses in accordance with a preferred embodiment of the invention is illustrated in connection with FIG. 8, which demonstrates the creation of 13 distinctly different segments 420 requiring differentiated follow-up. In this particular example, the marketer seeks information regarding an office supply product, such as, printer ink. The first query 402 initiates the process, with responses resulting in a second queries 404, 406. Second response 408 then triggers third queries 410, producing the 13 different segmented responses 420. For example, it wouldn't make much sense to offer both segment 2 and segment 13 the same coupon for $5 off the genuine ink brand since in the case of segment 2, this high-volume user currently doesn't even buy the genuine ink brand and segment 13 doesn't even own a computer! Rather, each of these 13 segments, each a qualified lead for an ink seller—though not all for the genuine ink brand now requires an individualized second round of questioning. For example, it would be wise to understand the motivations driving the high volume generic users, segment 2, to buy off specification ink and explore if they have any problems with compatibility. Furthermore, there appears to be a computer purchase opportunity with segment 13, that's an entirely different line of questioning but possibly a big sale for the marketer. In aggregate, the system has taken 100 leads and through the marketer's investment, created 13 segments for possible further follow-up, or not, depending upon the attractiveness of the segment.

The important feature of this process is that this individualized follow-up is difficult in today's internet environment; including paid search where 97 of the 100 typically leave the site leaving behind not much more information than where they came from and where they went after leaving the site. The present invention, however, due to the authenticity and 4-8 year stability of the online banking community, as in the preferred embodiment, is able to provide a vehicle through which this sustained and increasingly relevant communication can occur. The culmination of which may be a highly customized and relevant offer (e.g. a $30 coupon for 3 genuine ink cartridges, a $100 off a new computer, $10 off any alternative ink brand) deliverable via an permission-based email coupon.

On the bill-payer's side of the transaction, the system is sustainable because each response—or redemption, instantly and observably reduces the bill-payer's bill therein providing immediate positive feedback for the bill-payer's action. Moreover, the economics of the system enable the bill-payer to earn in excess of $60/hour in the process, making this a sustainable and profitable vocation for most bill-payers. Moreover, each successive brand communication coupon is more relevant than the last making the experience of the bill-payer, who is also a consumer, more meaningful and satisfying; it's good to feel like you are being listened to.

Thus, preferred embodiments of the present invention utilize selected elements in combination.

1. A marketer accessing a database of stable and qualified consumers making financial transactions online, based on either demographic information or financial transactions.
2. A networked communication system to enable communication.
3. A system of delivering said communication in the form of a saving coupon to the consumer carrying out financial transactions online.
4. A system of instantly and observably delivering financial rewards, for example, via redemption of said savings coupon, to the bill-payer in return for responding to the communication.
5. A system of tracking responses and respondents so as to segment respondents by their response.
6. A system of delivering a follow-on communication to select previous respondents which is more relevant than the previous communication because previous responses are contemplated in the new communication.
7. A system of delivering an offer to purchase either within or outside the financial transaction environment.
8. A system of measuring the financial performance of the interactive marketing system.

Bill-payer access to the system comprises the steps of learning about the system through bank marketing using a system where demographics and third party data are accessed to complete the bill-payer profile. Personally identifiable information gets removed when name and street address are replaced with a code to protect the privacy of the bill-payer. Financial transactions for the bill-payer are aggregated and analyzed and merchant attributes are gathered in a fast-paced interaction or game and used later to convert transaction data into utilities, and then into lifestyle choices.

Marketers learn about the service through marketing and sales activities and tutorials and support are immediately available upon sign-up. The marketer accesses the system website and completes a form 500 shown in FIG. 9.

A powerful and flexible data query environment enables marketers to slice/dice and drill down to find targeted groups of bill-payers. For example, "find bill-payers who spent more than $50 on office supplies in the last 3 months AND NOT from a particular seller." This is a compound query in which a plurality of query elements are used.

Pre-Campaign

Figure 12:
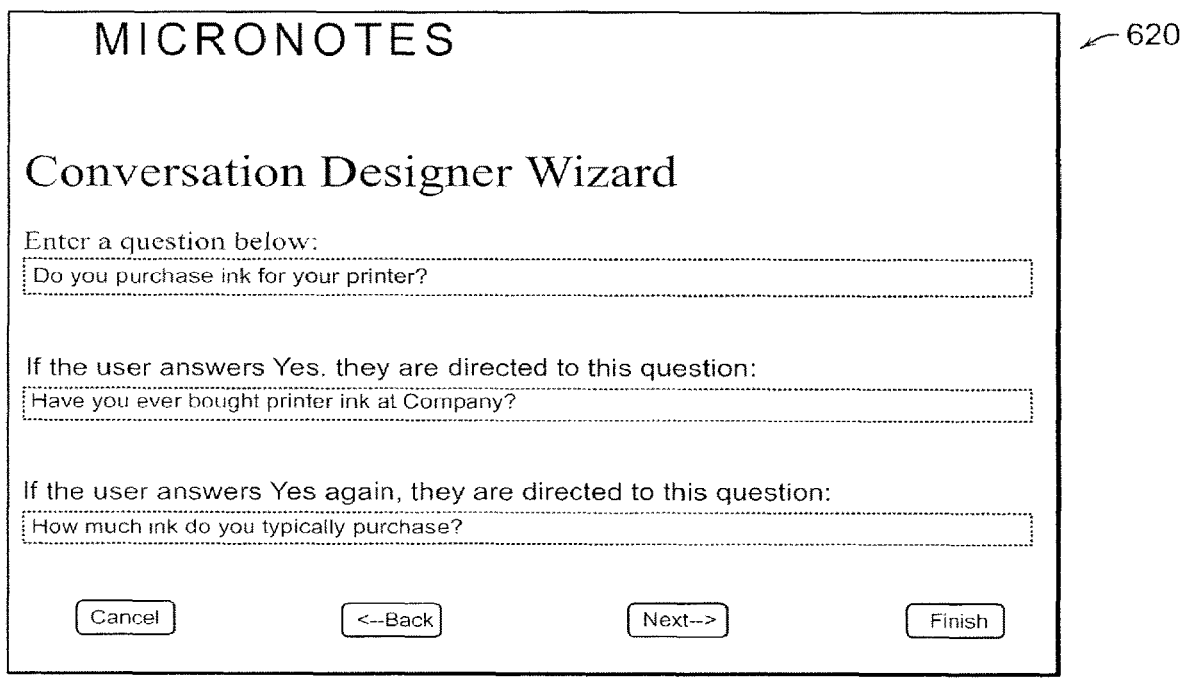
FIG. 12 illustrates a screenshot of a conversation design routine that marketers access to implement a particular conversation.

From data analysis, marketers select consumers with whom they'd like to book an appointment. Marketers then select the number of appointments as a subset of the search results, place/bill, expectations, and notification preferences. Purchase 100 appointments in March for $250. Average Seller purchases (previous 90 days) for group members, for example, can be $25/mo. Marketers use a wizard 620 (FIG. 12) with template options, to design and test an interview. Marketers test by viewing the bill-pay screen the bill-payer will actually see.

Campaign

Figure 13:
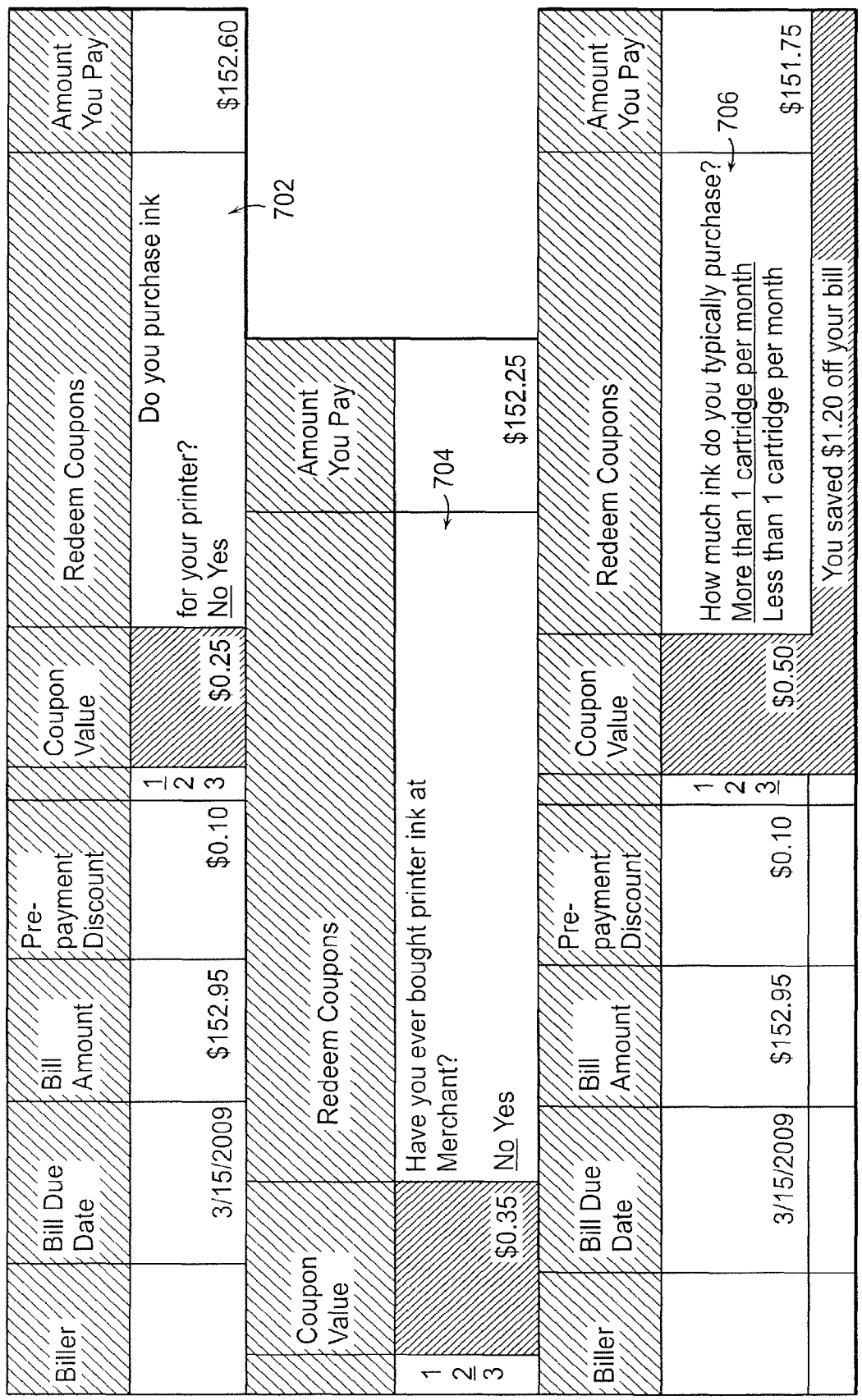
FIG. 13 illustrates a preferred embodiment of a coupon used to reduce a user's particular debt in response to queries.

Bill payers redeem coupons by responding to questions 704, 706, shown in screen 700 of FIG. 13. Each response lowers the bill-payers bill thus compensating the user for responding to the communication, in this example $0.35 for the first answer and $0.50 for the second answer, thus augmenting the user discount for paying this debt before the due date. Responses 702 are tracked and segments are created.

Post-Campaign

In an example, 22 Coupons delivered to 3 segments, with 3 coupon redemptions. Direct measurement of customer acquisition cost can, for example, be calculated as $250/3=$83. If lifetime value of a customer >$83, then further appointments continue.

Figure 10A:
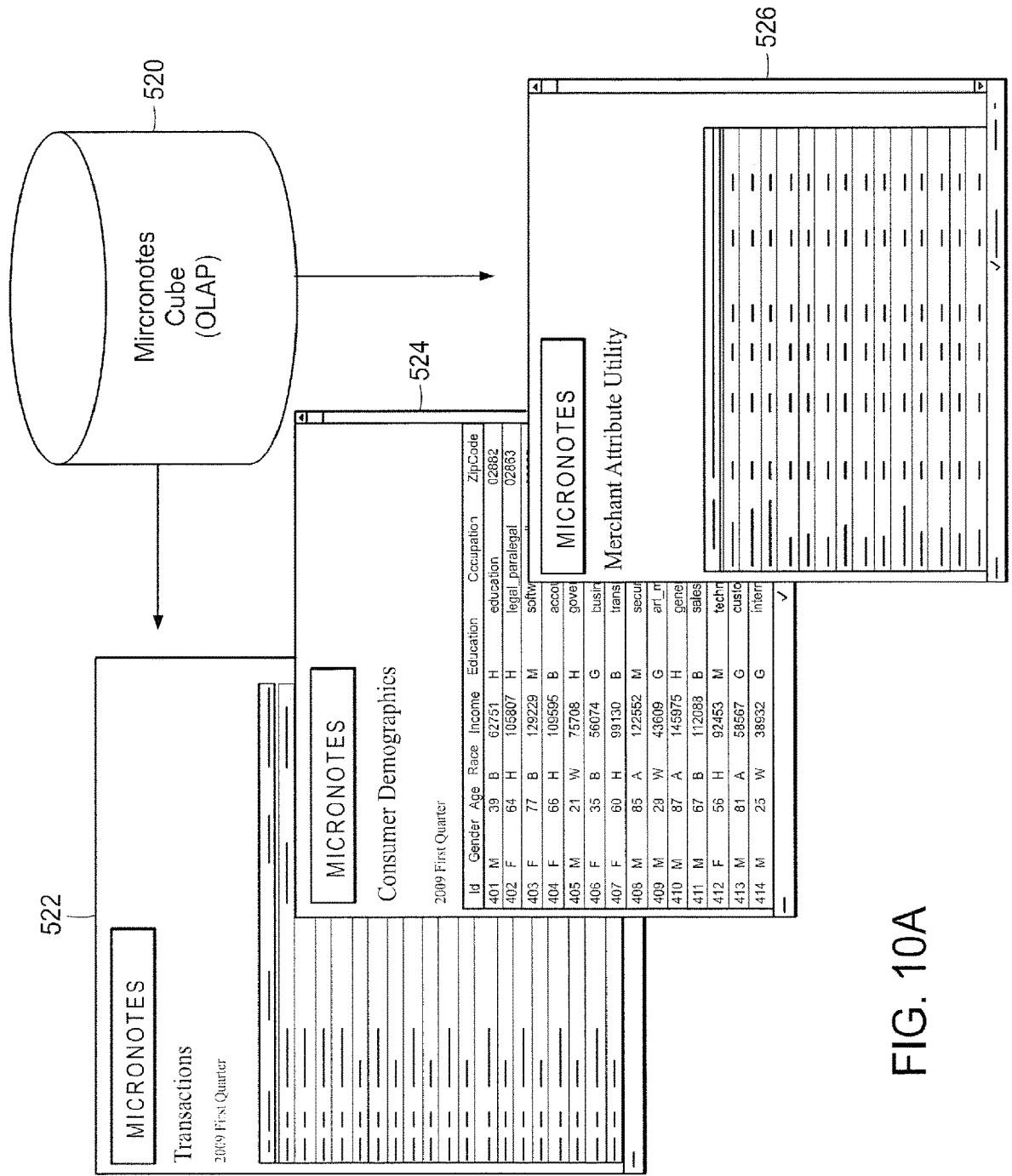
Figure 11:
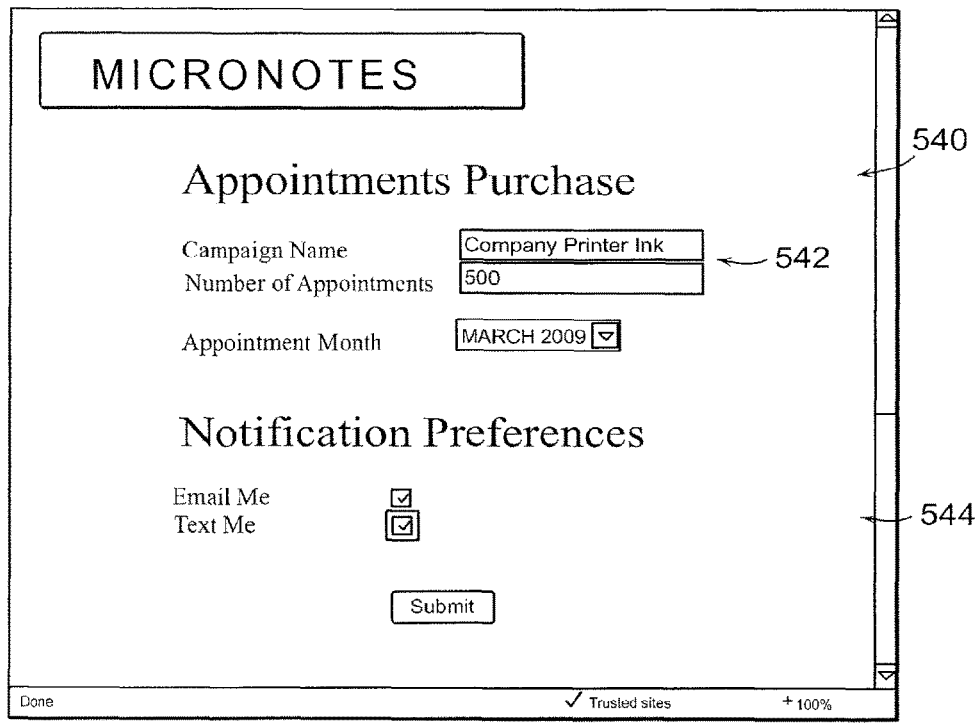
FIG. 11 illustrates a screenshot form for marketer selection of appointments with users based on data analysis.
Figure 14:
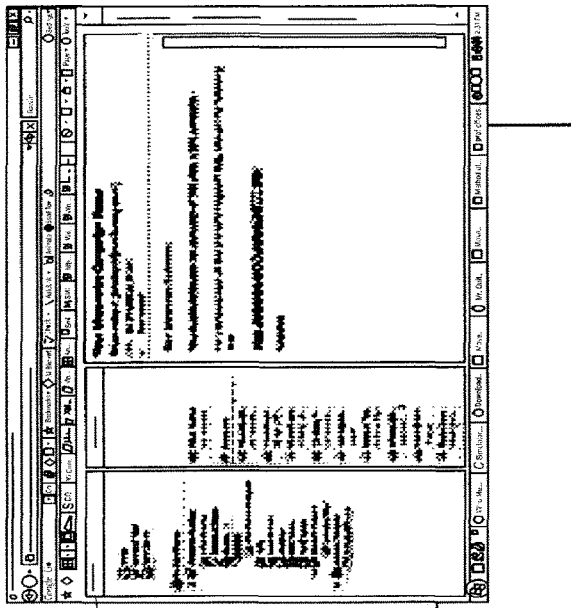
FIG. 14 illustrates data collection recording in memory and display.

Statistically significant changes in group purchases are recorded in the transaction portion of the database 752 (shown in FIG. 14) in which the Seller records responses 754 and provides a status report 756, providing another measure of campaign effectiveness. As shown in FIG. 10A, the database or warehouse 520 has stored therein various datasets including transactions 522, user demographics 524 and merchant attribute utilities 526. The demographics data (FIG. 10B) identify the user by number and include attributes 528, such as, gender age, race, education, occupation and location by zip code. The data 525 contained in this dataset can be accessed to generate a list of users that can be identified by a marketer for appointment notification 540 (FIG. 11). The graphical user interface for notification 540 can include the name of the campaign 542 with the number of appointments, the month and year, or time period in which the sequence is executed and other details, such as, the manner of notification 544.

In a preferred embodiment of the invention, bill-payers are assigned lifestyle dimension utilities, and later segmented, in the manner described below:

For a system in which more than 10 MM customers are included through online bank agreements wherein banks offer the service as an opt-in to their existing online bill pay service;

the system does not provide the name or address of any bill-payers;

the system has the permission by bill-payers to aggregate their transaction data, provided us with their online credentials, and answered these demographic questions on sign-up: Age, education, income, occupation, family size, dwelling zip code, stage in lifecycle, gender;

the system can utilize initial users who are compensated for characterizing the attributes of shoppers at the merchants where they shop; characterization is done in a game-like format;

reliable attributes are derived and assigned to merchants using the Bayesian Truth Serum (BTS) method (see below);

merchant shopper attribute data is collected until the rate of change in the merchant attribute set assigned using the BTS method approaches zero, or the cost of the nth consumer input is greater than the benefit of incrementally improved accuracy in the merchant shopper attributes assigned to a particular merchant; and the database of bill payers is searchable by transaction, demographics, or attributes.

Attributes are assigned using the method that enables firms to engage in sustained interactive communications with qualified prospective and existing customers.

Certain firms have the ability to measure the effectiveness of their campaign because pre and post campaign purchase volume can be obtained.

Communication Method: (3) communications per online bill payment shown below comprising, for example:

One bill in the face amount of $152.95 from a utility company due on Dec. 22, 2008

(3) questions from the utilities company who paid more than 90 cents to ask these 3 question.

| Biller | Bill Due Date | Amount We Pay | Amount You Pay | | Coupon Value | Redeem Coupons |
|---|---|---|---|---|---|---|
| Utility | Dec. 22, 2008 | $152.95 | $152.95 | 1 2 3 | $0.25 | Did you know that Utility offers free home energy analysis to save money? No Yes |
| Utility | Dec. 22, 2008 | $152.95 | $152.70 | 1 2 3 | $0.30 | Do you use energy saving compact fluorescent light bulbs? No Yes |
| Utility | Dec. 22, 2008 | $152.95 | $152.40 | 1 2 3 | $0.35 | How drafty is your home? Very drafty Somewhat drafty Tight, no drafts. |
| Utility | Dec. 22, 2008 | $152.95 | $152.05 | | $0.90 | Total savings this bill. |

Pay Sign out question: Would you like the utilities company to email to you tips on how to cut down on drafts?

Figure 16:
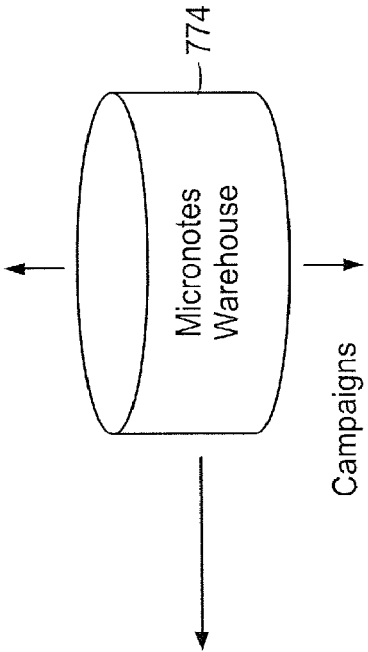
FIG. 16 illustrates data storage and analysis to evaluate and modify marketing program.
Figure 17:
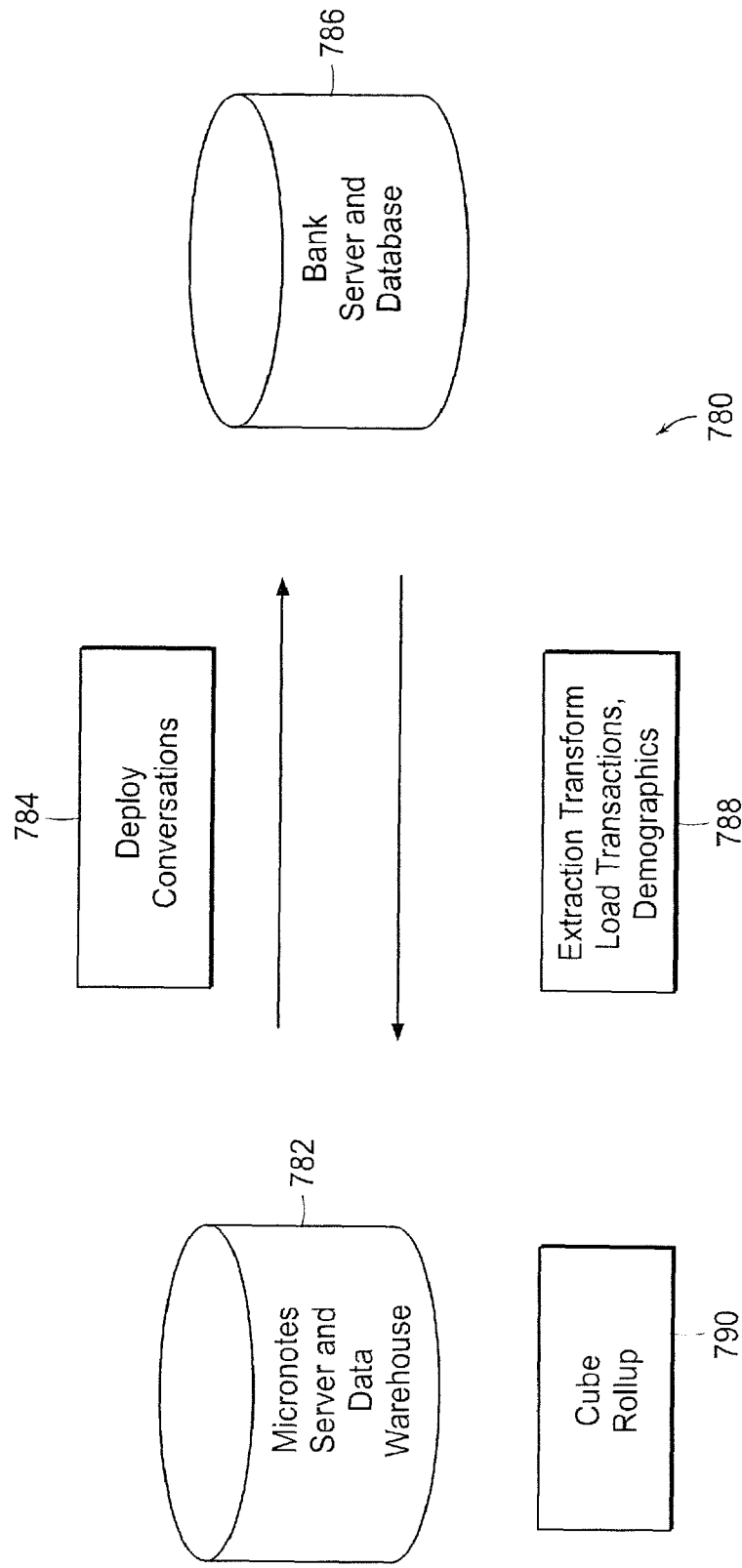
FIG. 17 illustrates the use server that communicates with a server used for financial transactions, such as a bank server conducting bill paying operations from bank accounts of bank customers.

Procedure to create searchable database of participating bill-payers:

Online bill-payers opt-in to savings bill-pay at their local bank and answer 8 demographic questions and supply their user name and password for other financial institutions to aggregate data on the server. As shown in FIG. 16, the system 770 includes a database 774 accessible by merchants or sellers 776 in which demographics 772 and campaign data 778 are stored. The system includes a server 782 through which conversations with users are deployed 784, bank servers and databases 786, including user accounts, can be securely accessed for the purpose of conducting authorized financial transactions, the resulting record is then delivered 788 and stored in the server 782 database or warehouse with cube roll-up 790 providing a summary of the transactions and responses in combination.

Figure 15:
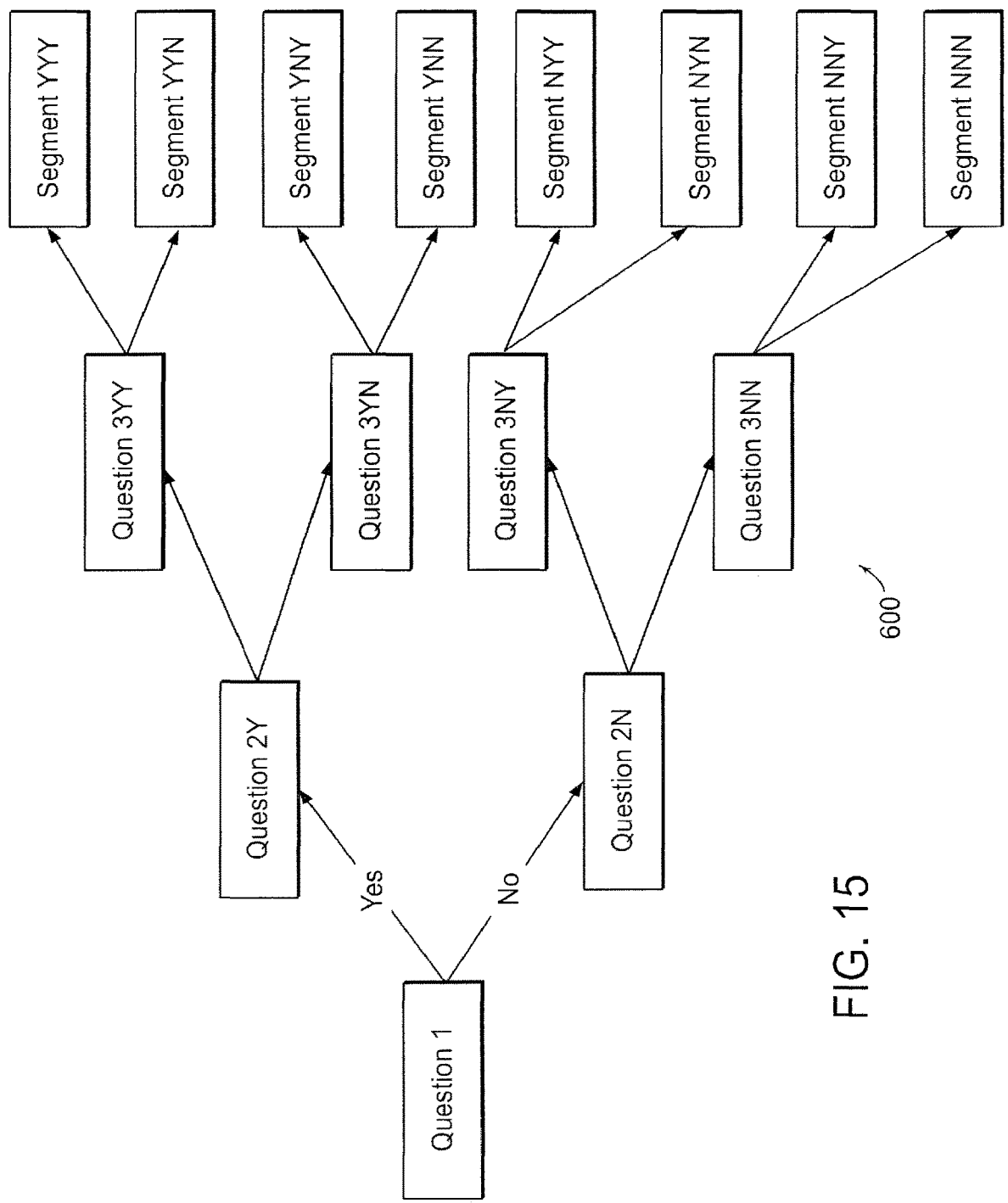
FIG. 15 illustrates the three query response tree that generates eight possible responses which can be used to measure system performance.

The server downloads 90 days of transactions and presents merchant names and category specific questions (in the form of questions and answers 600, shown generally in FIG. 15) about each merchant's method of reaching their shoppers, and shopper motivation, lifestyle, culture and ethnicity as below—the process is presented in a game-like format where points are won for high information value answers.

The attribute assignment process proceeds until the rate of change in the merchant attribute set assigned using the Bayesian Truth Serum (BTS) method approaches zero, or the cost of the nth consumer input is greater than the benefit of improved accuracy in the merchant shopper attributes assigned to a particular merchant. The BTS method shown, for example, in FIGS. 18A and 18B, can be summarized as follows, Subjective judgments are an essential but problematic information source for science and policy, problematic, because there are no public criteria for assessing judgmental truthfulness. See Prelec, D, "A Bayesian Truth Serum for Subjective Data," Science, 15 Oct. 2004, Vol. 306, No. 5695, PP. 462-466, the entire contents of which is incorporated herein by reference. A scoring method is used for eliciting truthful subjective data in situations where objective truth is unknowable. The method assigns high scores, not to the most common answers, but to answers that are more common than collectively predicted, with predictions drawn from the same population. This adjustment in the scoring criterion removes all bias in favor of consensus: Truthful answers maximize expected score even for respondents who believe that their answer represents a minority view. In FIG. 18A, the BTS rules 800 have been applied. For example, since the respondent answered 80 to the Grocers Market question, and that answer was above 75, the average prediction of all people who shopped at the market, then this answer is taken as being a valid tag of "convenience" for the store; Therefore, the financial transaction that shows up from this store will be coded "convenience". Conversely, the answer 50 to the competitors' question was below the average prediction and marked as "unreliable", the competitor would not necessarily be given the tag "convenience."

Once attributes are assigned to particular merchants, the next person who shops at that store will be assigned utilities according to the method 820 shown in FIG. 18B. In this case, 5 food retailers or sellers 822 are identified and user data indicate a combination of parameters 824, such as, convenience, selection and quality are summarized and then tabulated 825 as attributes.

Figure 19B:
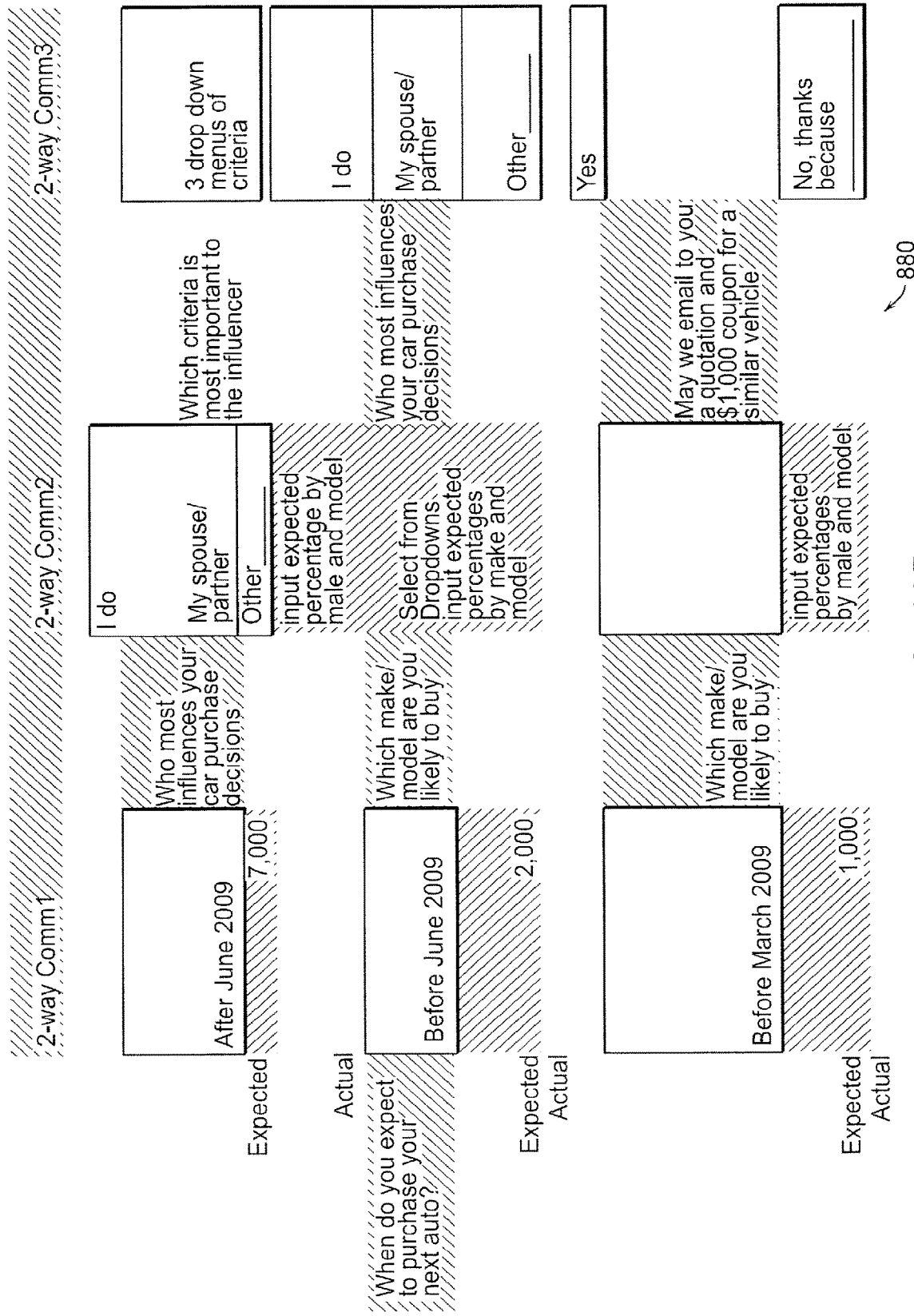
FIG. 19B illustrates a communication tree involved in the purchase of a product such as an automobile.

Once utilities are assigned for various categories (e.g. Grocery categories 860 shown in FIG. 19A) for each person, the database of users can now be searched by transaction, demographic, and/or category specific attribute utility.

For example: Simple Boolean logic can be employed, (e.g. for an office supply seller or vendor, find all users buying office products where the merchant does not equal). Moreover, cluster analysis can be performed using the utilities developed using the above method to find commonalities between users which may be opportunities for firms to expand their communications with specific customers who may exist in the same cluster but are not currently customers of the firm. For example, Query 1: Find all users buying a particular vendor's office products.

Query 2: Find all users in the same cluster as those buying the particular vendor's products.

Build a communication campaign aimed at the adjacent clusters:

The marketer for that vendor then designs a series of communications aimed at understanding purchase intent (e.g. Are you planning to buy? Have you budgeted to buy? Where does the vendor stand competitively (strengths/weaknesses)? What would success look like? Who influences the buying decision? This is illustrated in the example below involving the purchase of a car (FIG. 19B):

Before, for example, a 3-month communication program 880 begins, the total of all customer purchases with the merchant (where data is available) is summed as a starting point. Once the questions are delivered through the online bill-pay system, the actual results of the questions are supplied to the marketer, and the next series of questions is designed based on the answers from the previous questioning. The goal is to build on the answers already supplied to move qualified prospects down the sales funnel and eliminate question repetition. Once the campaign is complete, results can be measured, in the case where the firm's name is shown in financial transaction data, in a variety of ways including:

1. Investment ($) in the campaign/incremental sales increase=cost/$ revenue
2. Incremental profit increase/Investment ($) in the campaign=$ return/$ invested Illustrated in connection with FIG. 20 is a networked groups of participants or users 902 who elect to contribute funds on a periodic basis to a common account 904, the funds being used for purposes or rules agreed upon by the group of participants. In a preferred embodiment, the system can operate as a rotating savings and credit association (ROSCA) in which funds are electronically transferred (electronic funds transfer, ACH) from the bank accounts of individual members using system 40 described herein on a periodic basis into a common account. The aggregated funds are distributed according to the rules of the ROSCA, which can be to one or more members, or directed to some external person or entity 920.

Figure 21:
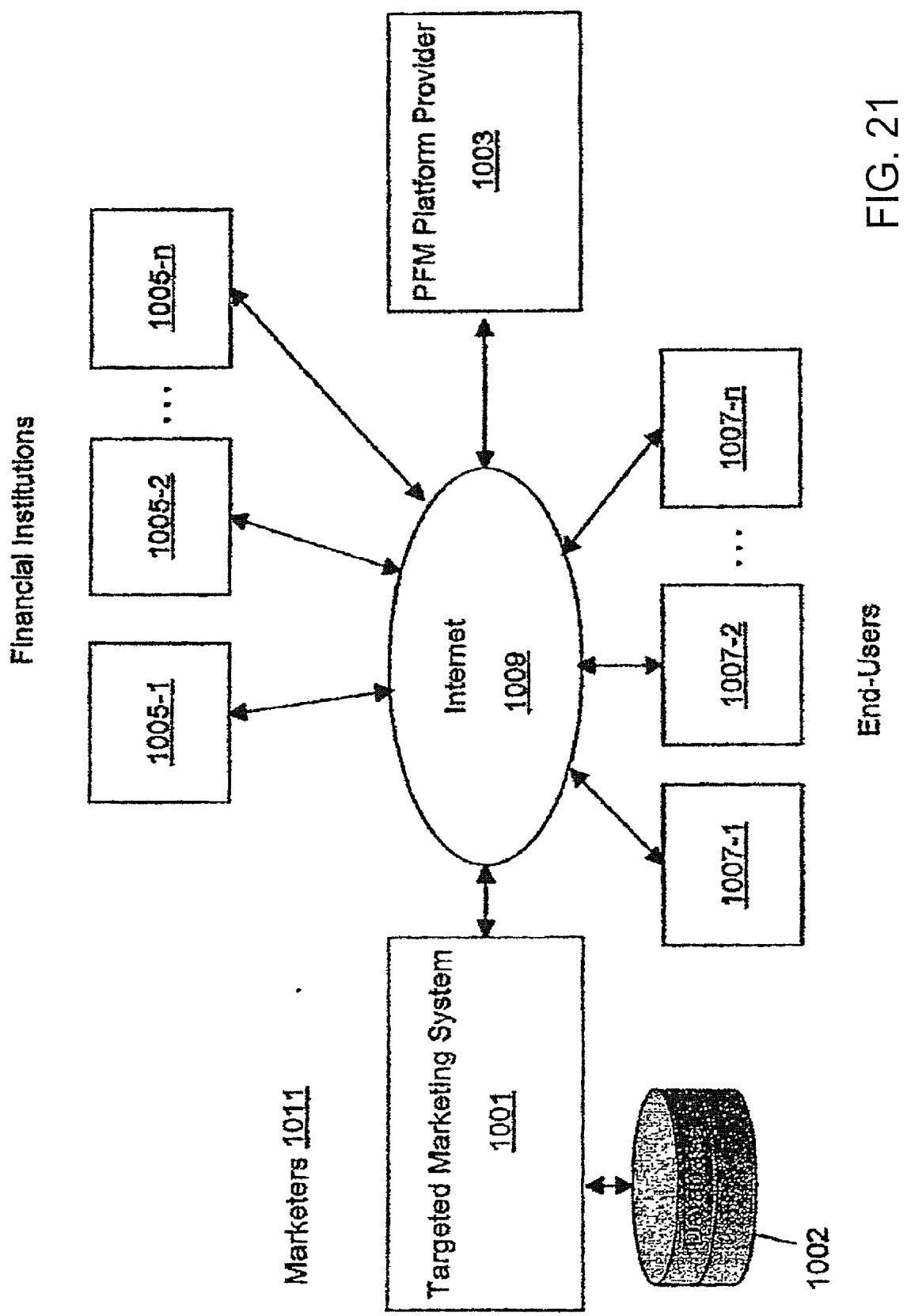
FIG. 21 is a schematic illustration of a preferred embodiment of a targeted marketing system.

FIG. 21 is a schematic illustration of an embodiment of a targeted marketing system that is implemented using a personal financial management (PFM) platform. Computer systems of a targeted marketing system 1001, a PFM platform provider (e.g. Yodlee, Geezeo) 1003, one or more financial institutions (e.g. American Express, CitiBank, Bank of America) 1005-1, 1005-2, . . . 1005-n, and one or more end-users 1007-1, 1007-2, . . . 1007-n, are connected through a public network 1009, such as the internet. Each user has an account with one or more financial institutions 1005-1, 1005-2, . . . 1005-n, and uses a computer or handheld web browser device 1007-1, 1007-2, . . . 1007-n to access and manage each of their accounts over the network. Details regarding such systems and methods are described in U.S. application Ser. No. 12/390,972, filed Feb. 29, 2009, which claims priority to U.S. Provisional Patent Application No. 61/066,573 filed Feb. 21, 2008, the entire contents of the above applications being incorporated herein by reference.

In one embodiment, the user accesses and manages their accounts from multiple financial institutions using a centralized PFM platform 1003, which communicates over the network 1009 with the various financial institutions 1005-1, 1005-2 . . . 1005-n, collects and aggregates financial information of the user, and presents relevant financial information to the user's computer 1007. One exemplary embodiment of a PFM platform 1003 is the Yodlee® MoneyCenter (from Yodlee, Inc., Redwood City, Calif.), which is a web application that enables end-users to view and manage their finances online, and provides features such as bill payment, expense tracking, and investment management. In one embodiment, the PFM system allows users to organize and display financial information and other data, such as credit card, bank, investment, email, travel reward accounts, etc., all on one screen.

In one embodiment, the PFM platform provider 1003 enables end-users to customize their on-line financial management experience by using third-party financial applications, such as the FinApps that run on the Yodlee® 10 financial management platform. End-users select and download to their computer device 1007 the financial applications they want, and the selected applications become integrated into the user's PFM portal or dashboard. When the financial application is executed, user-specific content is generated and displayed on the user's computer 1007. In some embodiments, the content utilizes financial information associated with the end-user's financial accounts, information which is made available by the computer system(s) of the PFM platform provider 1003 and/or the relevant financial institutions 1005-1, 1005-2, . . . , 1005-n.

In the embodiment of FIG. 21, a targeted marketing financial application, which can be created by a third-party developer, is distributed by targeted marketing system 1001 to the PFM platform provider 1003 and ultimately to the end-users 1007-1, 1007-2, . . . , 1007-n who chose to utilize the application.

The targeted marketing system 1001 also generates content in the form of "campaigns," which is the combination of a specific audience and a specific communication that is deployed through the on-line PFM platform via the financial application. The targeted marketing system 1001 utilizes inputs from one or more marketers 1011 to generate each campaign (e.g. An auto-dealer might develop a campaign to sell cars and service but may find a segment of users who don't own or plan to own a vehicle—in which case, the auto-dealer might sell that segment of the campaign to a rental car company, like Zipcar). These inputs can include, for example, audience specifications, interview structure or guidelines, offers for products or services for certain segments of the audience, logos, campaign start and end-dates, maximum budget for the campaign, and campaign approval. In one embodiment, the targeted marketing system 1001 includes a marketer application that 1) defines a target audience of end-users based on the purchase history, demographics and/or previous interview response specifications of an audience the marketer 1011 would like to interview, 2) generates a "communication," which is generally a short (e.g., 3 question) interview using branch and skip logic which contains an offer to buy a product/service of the marketer 1011 at the end of each node created by the interview, and 3) produces a "campaign," which is the combination of a specific audience and a specific communication that is deployed through the PFM platform.

According to another aspect, the targeted marketing system 1001 provides an incentive or reward to end-users that choose to participate in an interview. The marketing system 1001 thus effectively purchases a segment of the end-user's time (e.g., ~30 seconds for a 3-question interview), and at the end of the interview compensates the user with either an offer to buy a product/service, or a monetary sum if the user declines the offer, or both. For example, an insurance company, who is unable to make discount offers, may offer a free quote and compensate the user for her interview time—in which case, the user may take both the compensation and the offer. In other cases, the user may be presented with an offer for $100 off her next service in exchange for the compensation earned during the interview, in which case she takes the offer and not the compensation for interview time. In the case of a monetary reward, the marketing system 1001 can transfer the appropriate sum from its own financial account (or an account associated with a marketer 1011) to an account of the end-user using the PFM platform.

Thus, the marketing application, in certain embodiments, enables marketers to:

Target a select audience of end-users using purchase history, demographics and previous interview responses. An example of purchase history based targeting of UserID's is provided below against the audience specification: "All users with a transaction in June or July 2010 with automobile insurance company (AIC) of greater than $50."

| Good description | TRANSACTION AMT | ASOF | USER ID |
|---|---|---|---|
| AIC | $169 | 7/2/10 12:00 AM | 10181513 |
| AIC | $86 | 6/24/10 12:00 AM | 12125597 |
| AIC | $1,839 | 6/9/10 12:00 AM | 14164971 |
| AIC | $163 | 7/1/10 12:00 AM | 15004830 |
| AIC | $459 | 7/1/10 12:00 AM | 11768355 |
| AIC | $116 | 7/2/10 12:00 AM | 13423127 |
| AIC | $289 | 7/1/10 12:00 AM | 15118387 |
| AIC | $89 | 7/1/10 12:00 AM | 12178301 |
| AIC | $365 | 6/30/10 12:00 AM | 19236688 |
| AIC | $216 | 6/12/10 12:00 AM | 16389603 |
| AIC | $173 | 7/1/10 12:00 AM | 14072803 |
| AIC | $697 | 7/1/10 12:00 AM | 13070932 |
| AIC | $113 | 7/1/10 12:00 AM | 18114447 |

In which case, these 13 UserID's are served the interview, offer, and or communication.

purchase a segment of time (e.g., ~30 seconds) with a prospect end-user to conduct a digital sales interview;
automatically deliver individualized offers based on a prospect end-user's interview response; and
track offer redemptions through end-user purchase history. FIGS. 22A-D are process flow diagrams that illustrate the generation of a targeted marketing campaign for a marketer application according to preferred embodiments of the invention.

FIGS. 24A-24L are screen-shots showing one implementation of the present marketer application.

In a preliminary step, the marketer defines a sales objective in the form of what, specifically, the marketer wants to sell to whom. For example:

XYZ Auto Dealer, aims to sell new and pre-owned vehicles and automotive service to automobile owners in a geographic area with an income over $50K/year-who are not currently XYZ Auto Dealer Customers.

ABC Life Insurance, Co., aims to sell term life insurance to married homeowners, aged 35-54, with children, in selected states or regions who have a household income greater than $75K/year-who are not currently ABC Life Insurance customers.

At this time, the marketer can also provide an electronic copy of the company's logo in a suitable size and format to populate different parts of the financial application displayed to the end-user.

Figure 22A:
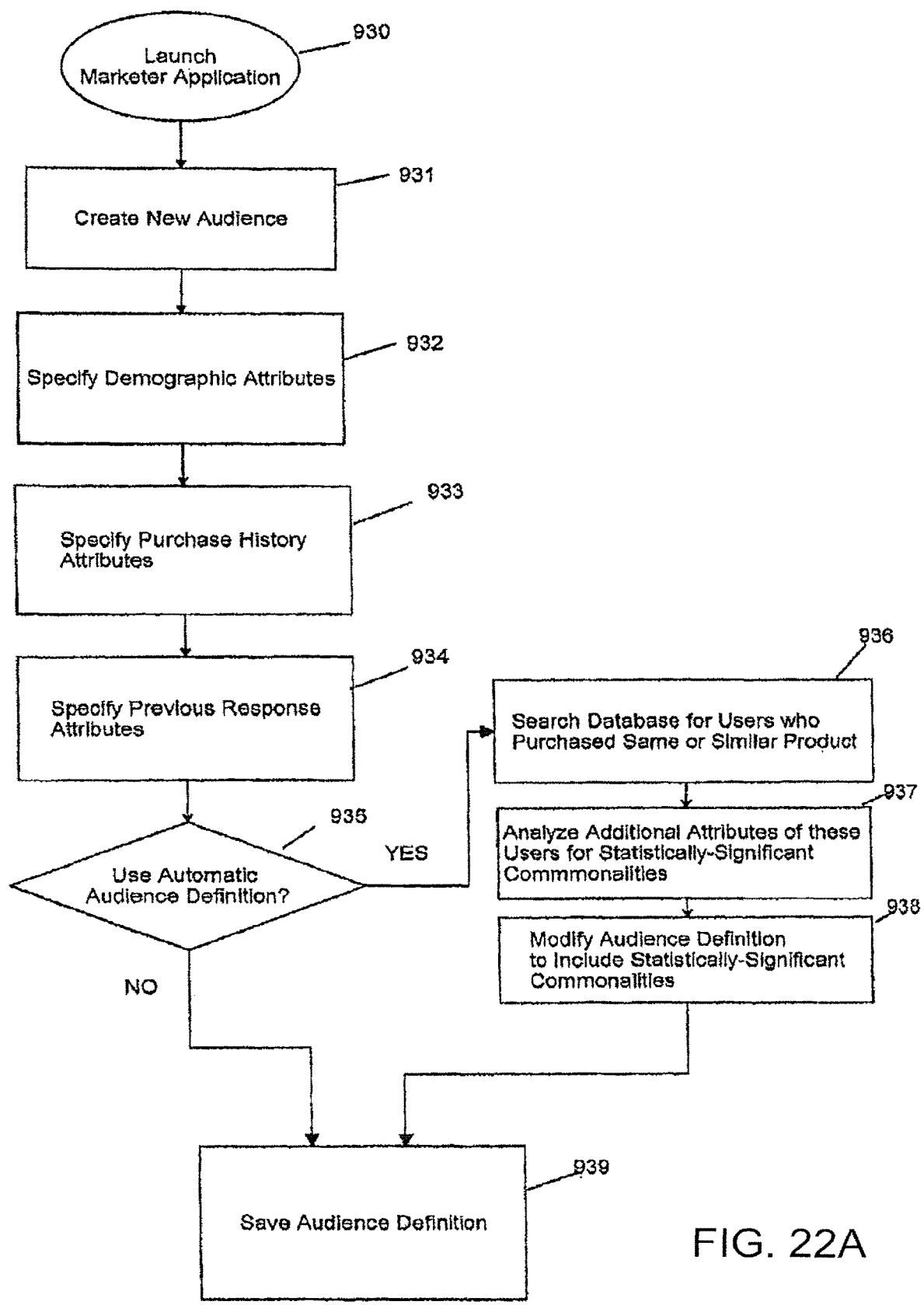
FIGS. 22A-22D illustrate preferred methods for targeted marketing in accordance with the invention.

Once the sales objective is defined, the marketer application is opened 930. From the main menu (FIG. 24A), the user clicks the "Create New Audience" icon 931 to define the audience. As shown in FIG. 22A, and in the screenshot of FIG. 24B, the user defines the audience by specifying one or more demographic attributes 921, purchase history attributes 933 and previous response attributes 934 of the end-users with whom the marketer desires to communicate.

Demographic information can include basic information (e.g., age, gender, language, ethnicity, etc.), location, income, lifestyle, home and household information. In one embodiment, this information is collected from each end-user who downloads the marketing system financial application on the PFM platform, as part of an initial registration process, and demographic information for each end-user is stored in a database 1002 included in, or associated with, the targeted marketing computer system 1001 (see FIG. 21). In some embodiments, certain demographic information of end-users can be maintained by the PFM platform provider 1003 or by another entity operating within the PFM platform (such as financial institutions 1005), and the marketer application can utilize this information in creating an audience definition, assuming use of this data is authorized by the end-user. In another embodiment, demographic data is collected by querying a $3^{rd}$ party demographic data store (e.g. InfoUSA or Acxiom)

In one embodiment, purchase history data is obtained from financial institutions with which the user has an account. Since the targeted marketing system operates within a PFM platform that aggregates multiple financial accounts of end-users (e.g., bank accounts, credit card accounts, etc.) across different financial institutions, the present system is able to utilize a comprehensive record of the end-users' past purchases in forming the audience for a targeted campaign. In some embodiments, the purchase history data of all end-users utilizing the targeted marketing financial application is automatically downloaded into the marketing system's database 1002, which can then be queried to define the audience for a targeted campaign.

In other embodiments, the marketing system 1001 issues a query to the financial institutions 1005 (either directly, or indirectly through the PFM platform provider 1003) for all end-users having particular attributes in their purchase histories (e.g., "All users who have spent more than $50 on gasoline in the past 2 months"), and receives a response indicating the end-users who meet the purchase history criteria.

Defining purchase history attributes can provide a valuable proxy for other attributes of the end-user (for example, recent gasoline purchases generally indicates car-ownership), and can be used to focus the campaign on new customers versus existing customers. For instance, an audience definition for XYZ Auto Dealer can include an AND NOT clause in the purchase history attributes (e.g., "no purchases from XYZ Auto Dealer in last 90 days") in order to specifically target new customers.

The previous response attributes include responses to previous interview questions by the end-user in a prior interactive marketing campaign. Each response to an interview question by an end-user is received at the targeting marketing system 1001 and stored in a database 1002 so that it can be used to help define the audience for a subsequent campaign. For example, if a recently-run campaign included an interview question asking end-users if they are interested in purchasing a new or used vehicle, the audience for a new campaign can be limited to only those end-users who answered "yes" to that question, and the interview questions for the new campaign can be tailored accordingly.

Browser history can also be used to target prospective customers. For example, a marketer can elect to target all prospective customers who: have spent more than $500 in automotive expenses in the last 90 days (purchase history); live in Boston (Demographic); and have visited a particular retailers website in the past 7 days (browser history). In the case of browser history, the system application can query the user's browser for a cookie from a browser-history data supplier (e.g. DoubleClick). If such a cookie is present, a query is made to the browser history data supplier's server regarding the particular website visits. If the browser history data supplier's server responds that the user has visited the website, that user qualifies for the campaign.

According to one embodiment, the marketer application includes a further level of audience definition by using data mining algorithms that search databases to predict an end-user's likelihood of accepting an offer and/or purchasing a product or service by comparing the user's attributes (demographic, purchase history, previous responses, etc.) with the attributes of users who have accepted the same offer in the past or have purchased a similar product from the same merchant or a merchant in a similar category.

In one embodiment, an automatic audience definition routine can be utilized to refine the audience definition by finding characteristics common to purchasers of a particular product/service or category of product/service. For example, analysis may reveal important insights about existing customers of XYZ Auto Dealer, such as that they tend to share certain other attributes at a statistically-significant level. Certain criteria can be established, either automatically or manually in the design of a campaign in which certain combination of attributes or activity thresholds are used to define a class of participants.

As illustrated in the embodiment of FIG. 22A, after the user has input the demographic, purchase history and previous response attributes of the target audience, at step 935 the user either saves the audience definition 939 and moves on to the next step in creating the campaign, or the user can run the automatic audience definition routine to find further attributes to include in the audience definition. At step 936, the marketer application performs a database search for other end-users of the system who have purchased similar product(s) as the product(s) to which the targeted marketing campaign is directed. For example, if marketer ABC Insurance Co. wants to sell insurance policies to a certain audience, the automatic audience definition routine searches the purchase histories of all end-users in the system who have had a transaction with ABC Insurance Co. within a given time period (e.g., the prior 180 days). Having identified a group of end-users meeting this criteria, the other attributes (e.g., demographic, purchase history and/or prior response data) associated with these end-users is then analyzed (step 937) to determine whether there are additional statistically-significant commonalities amongst these end-users. This can be accomplished using a number of well-known analysis techniques, including, for example, regression analysis. In the above example, for instance, spending with ABC Insurance is the dependent variable, and spending at all other merchants (e.g., Vendor A, Vendor B, Vendor C, etc.) are the independent variables. In one embodiment, a least squares fit method is used to find correlations and causality. Thus, an analytical representation of those combinations of attributes can be used to select the audience for a particular campaign. For example, Spending at $ABC$ Insurance=$(a)$ (Spending at Vendor $A$)+$(b)$(Spending at Vendor $B$)+$(c)$(Spending at Vendor $C$)

Where a, b and c are regression coefficients (slopes).

The marketer application can then modify the audience definition 938 to include statistically-significant common attributes, if any, produced by the above data analysis. In some embodiments, this can be done automatically for common attributes that meet a threshold of statistical significance. An automated learning system can be used to modify or further construct and the campaign.

Generally, data mining is the process of analyzing data using different methods and summarizing it to provide useful information. In some forms of data mining, a variety of input variables are supplied to an algorithm that sifts through these variables to determine a value for a certain variable. The algorithm makes decisions about which of these variables are useful in making the determination and also about how these variables are related.

Applications like WEKA and MS SQL Server provide a variety of data mining algorithms. Using these data mining algorithms, several input variables can be used and instruct the algorithm to then use these input variables to determine one or more output variables. The data mining algorithm uses training data to build a model or representation. This data mining representation takes a variety of input variables and uses them to make a probabilistic estimate that a certain (predicted) variable will have a certain value. For instance, demographic attributes (gender=M, age=35, shopped at a first retailer in the last week—Y or N, shopped at a second retailer in the last month—Y or N, spent over $100 at the first retailer in the last week—Y or N) can all be input variables that are used to assess a certain user's probability of responding to a campaign by a third party or of redeeming a clothing retailer discount offer. Once this representation is constructed, a particular user's demographic attributes and purchase history attributes can be fed into the model to assess the probability (0-100%) of a user performing said action.

The system has access to the demographic attributes and the purchase history data (in the form of credit card and bank account transactions) of its users in a non-personally identifiable form. Other items mentioned in the user profile below are also often available through the PFM platform.

The term "user profile" indicates the collection of one or more of the following items:
  user's demographic data,
  purchase history data (as defined by user's credit card and bank account/ATM card transactions),
  online bill pay data,
  credit card balance amounts,
  interest rate on cards,
  amounts in various retirement accounts, investment accounts, and other savings accounts (such as 529 accounts),
  changes to amounts in various accounts in a chosen period of time
  changes to frequency of shopping or amount spent at certain merchants over an interval of time.

Here are some uses of data mining operation.
  1. Using user profile data to predict a user's probability of responding to a campaign.
  2. Using user profile data to predict a user's probability of accepting a certain offer inside a chosen campaign (in other words, which branch of the MicroInterview tree will the user walk?)
  3. Using non-demographic data in the user profile to predict demographic attributes.
  4. Using user profile data to build a data mining model of people who shop at a particular merchant or a data mining model of people who shop at a particular merchant and spend over a certain amount of money there over a certain period of time.

5. Doing cluster analysis on purchase history data to see whether there are predictable groups of merchants that people shop at, so that if a certain user is found to have shopped at a number of merchants in the cluster, the system can assess the probability of the user shopping at another merchant in said cluster during a fixed time period and/or spending a certain amount at said merchant.

6. Predicting purchase history sequences—for example, if a person has visited Macy's during the holiday season and has spent over $100 at Starbucks the previous month, (s)he has a high probability of visiting Godiva.

Preferred embodiments of the invention can use data mining tools such as:

Association algorithms
Clustering algorithms
Time Sequence algorithms
Decision Trees algorithm
Naïve Bayes algorithm
Linear Regression algorithm
Logistic Regression algorithm
Neural Network algorithm
Sequence Clustering algorithm Which are available from (Microsoft, JMP) which can be used to process target audience data to identify those individuals having the appropriate attributes and meeting specified criteria (e.g. combinations of attributes or thresholds) to construct a campaign for a particular product or service. Further descriptions of data mining for audience definition in this application are provided in the appendix of this document.

Figure 22B:
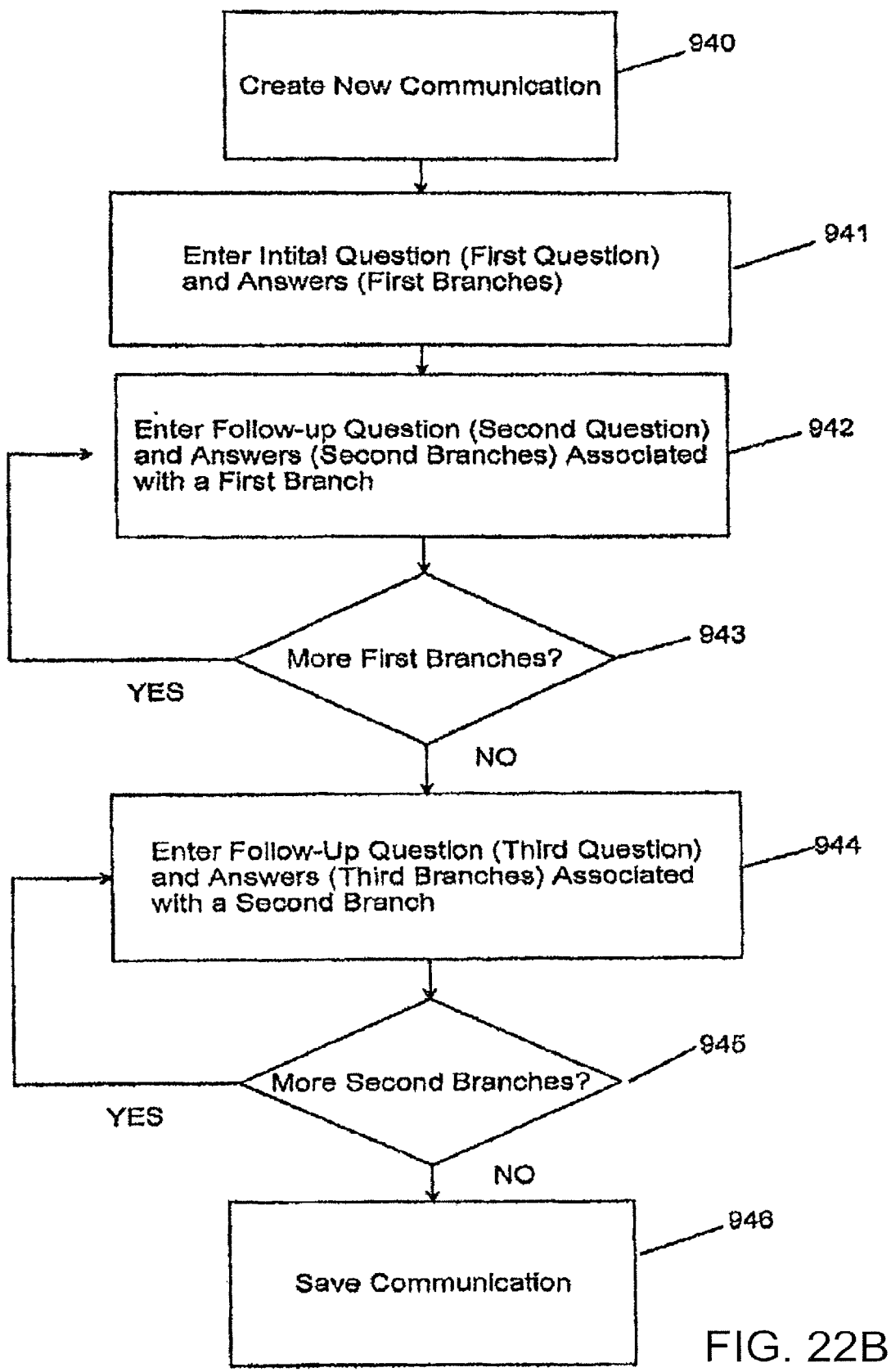

After the audience has been defined and saved 939, the user then returns to the menu screen (FIG. 24A) and clicks on the "Create New Communication" icon 940, as shown in FIG. 22B. Here, the marketer constructs the interview that will be deployed to the target audience. The goal of the interview is to provide a brief, 30-second/three-question interaction, for example, with prospective customers, so the interview is crafted to efficiently collect the most important information needed to make an offer that the customer is willing to accept or pay for. The marketer can start by summarizing what he or she knows about the audience from the audience definition. For example: lives in a certain graphic area, has an income over a given threshold (e.g. $50K/year), probably owns an automobile ("probably" because the audience includes users who have recently made gasoline purchases), and has no transactions with the marketer (XYZ Auto Dealer) in the past 90 days. It is also known that each end-user who participates in the interview does so voluntarily with knowledge that they are communicating with XYZ Auto Dealer. The interview can then be constructed to provide the information that the marketer needs to know in order to make an offer for a new or used car or auto service that a prospective customer will be willing to pay for.

There are various ways in which the interview can be constructed. For instance, in the auto dealer example above, the interview can start by asking if the end-user is planning on buying a car within the next couple of months. Alternatively, the interview can start by asking the prospect if the user is most interested in talking about new cars, used cars or auto service offerings.

The end goal of the interview is to produce a plurality of "segments" of the target audience, and to make a particularized offer to each segment. For example, here is how one interview produces a segment called "auto (Brand X) buyer."

Q: Good day! Do you plan to buy a vehicle in the next 60 days?
A: Yes
Q: Great! Are you looking for a new or pre-owned vehicle?
A: New
Q: Great! What make of vehicle do you have in mind?
A: Brand X Now, the marketer needs to come up with an offer that this brand that the prospective buyer is willing to pay for, since the end-user has already earned his or her monetary reward (e.g., $1) for having completed the interview. The implicit social contract is that, for 30 seconds of the end-user's time and attention, the marketer is prepared to pay either the $1 reward or the value of an offer, or both. In the case of paid offers, when the user must forfeit her cash (e.g. $1 in this example) reward for the offer, it is up to the marketer to craft a deal that is worth more to the user than the $1 reward the user receives if she do not accept the offer. In the above example, for instance, the offer can be: "May we e-mail you an offer to match your best price, less $500, for any new Brand X automobile at XYZ Auto Dealer?"

Similarly, if the prospective customer answers "Brand Y," the unique offer can be "May we e-mail you an offer to match your best price, minus $500, for any new Brand Y at XZY Auto Dealer?"

Alternatively, if the marketer starts the interview with the question, "Would you prefer to discuss: 1 New vehicles; 2 Pre-owned cars; 3 Auto Service & Parts," the service branch can be followed up with two service-related questions, such as:

"Can you tell us the make of the car you service?"
"Is your vehicle in or out of warranty?"
"Which single factor matters the most to you in auto-service?
 Convenience
 Service Quality
 Price
 Other _____"
"When do you expect to next service your vehicle?
 Need service now!
 In the next 3 months
 In the next 6 months"

From these types of questions, it is easy to see how a number of different segments emerge.

The communication, in the form of an interview, is built using the marketing application as shown in FIG. 22B. At step 941, the initial interview question is entered, along with the possible answers to this question. It will be noted that each possible answer produces a new branch along which the interview can proceed. A follow-up question and its possible answers is entered for at least one of the branches at step 942. If it is determined (step 943) that there are more branches requiring follow-up questions, then additional follow-up questions and answers are entered. Note that the possible answers to this second set of questions produce yet another group of branches, subsidiary to the first branches. At steps 944 and 945, additional follow-up questions and their possible answers are entered for these subsidiary branches. Once all questions and answers have been entered, the communication is saved at step 946.

Figure 22C:
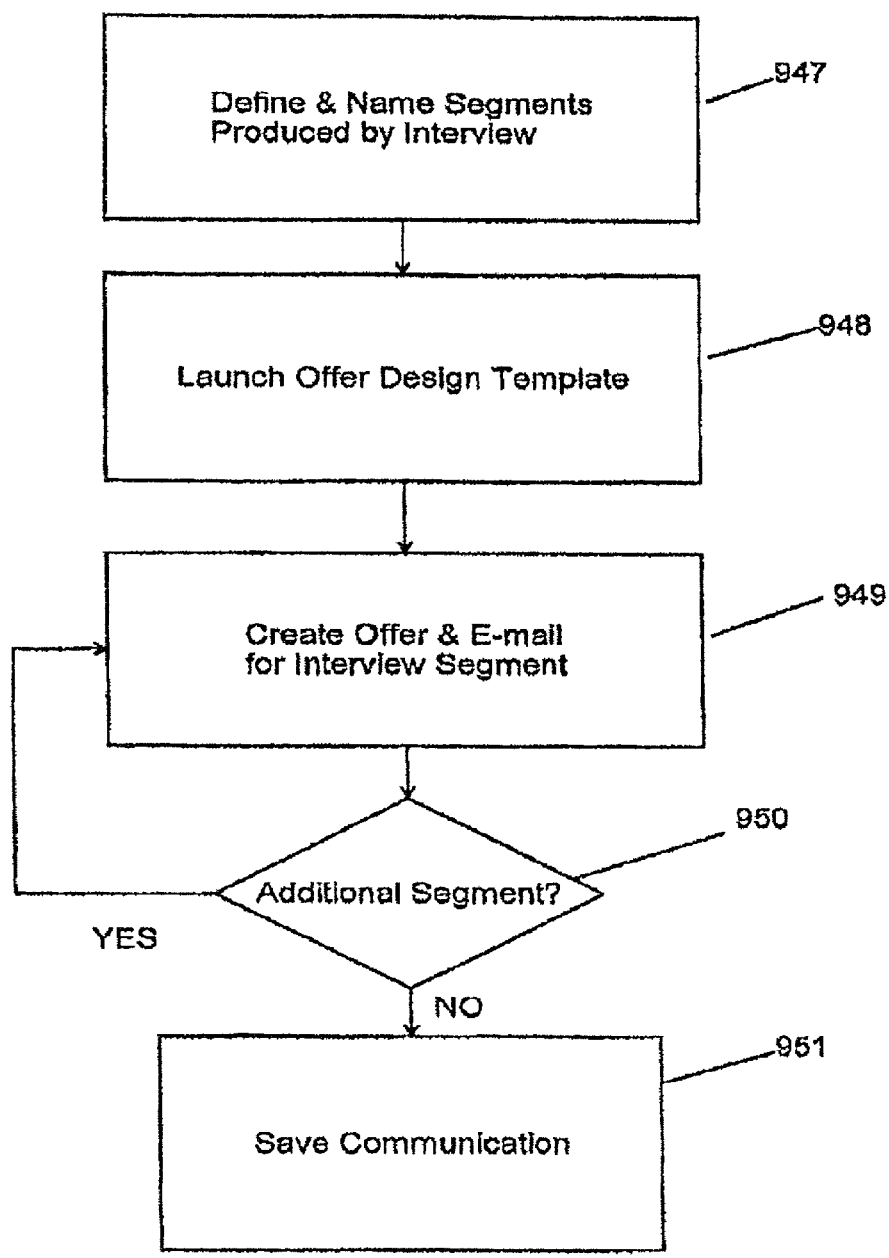
Figure 22D:
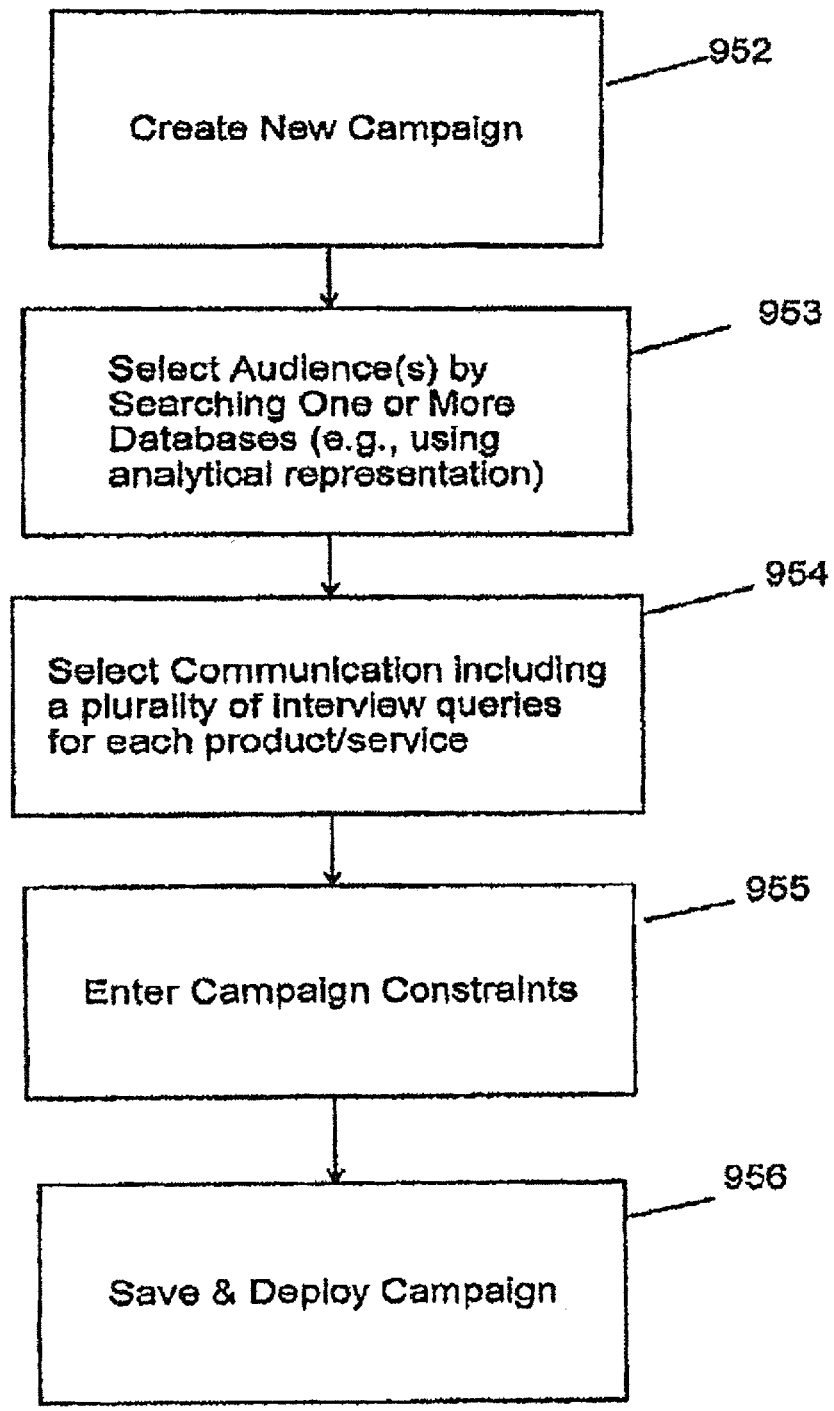
Figure 24B:
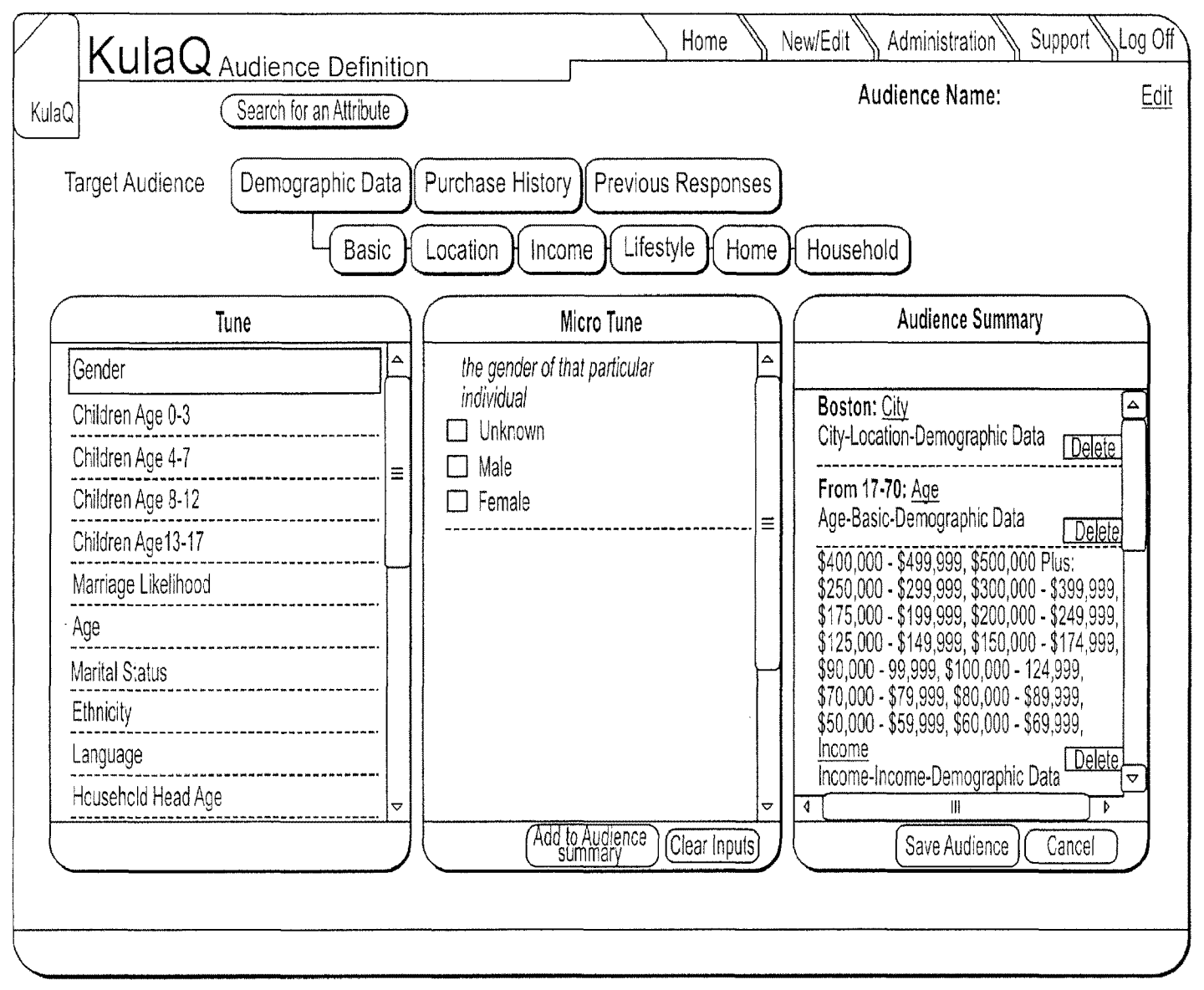
Figure 24C:
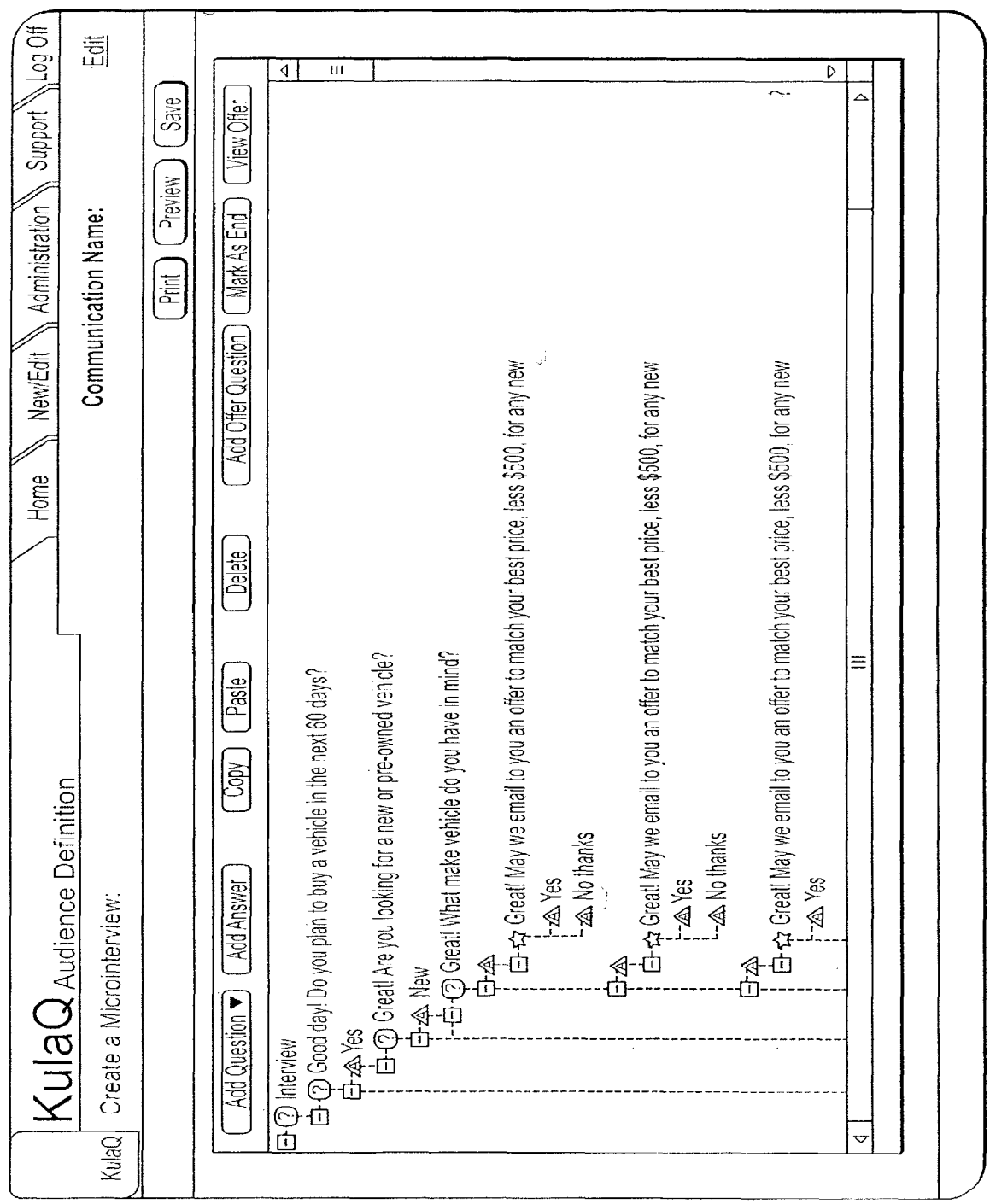
Figure 24D:
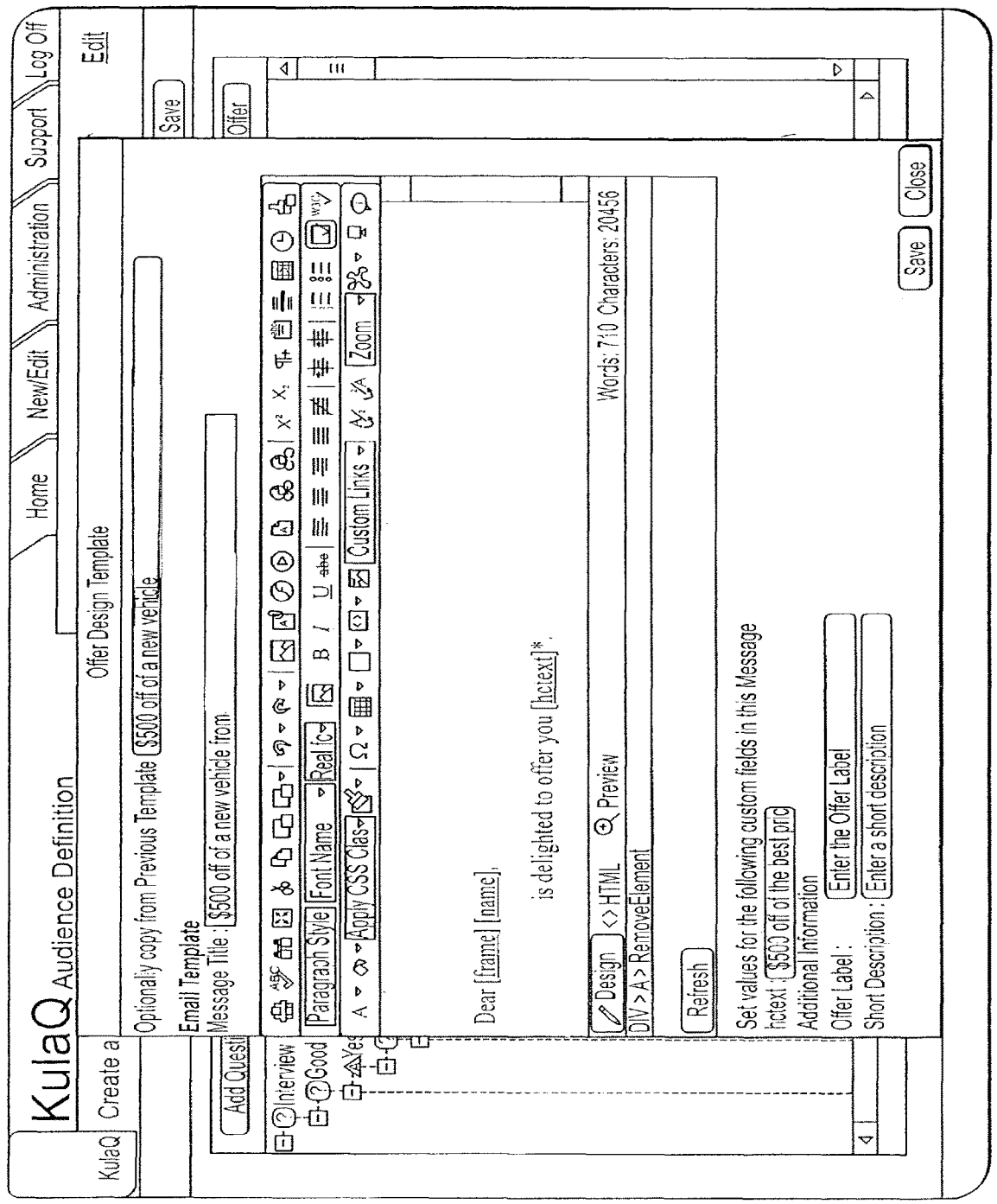
Figure 24E:
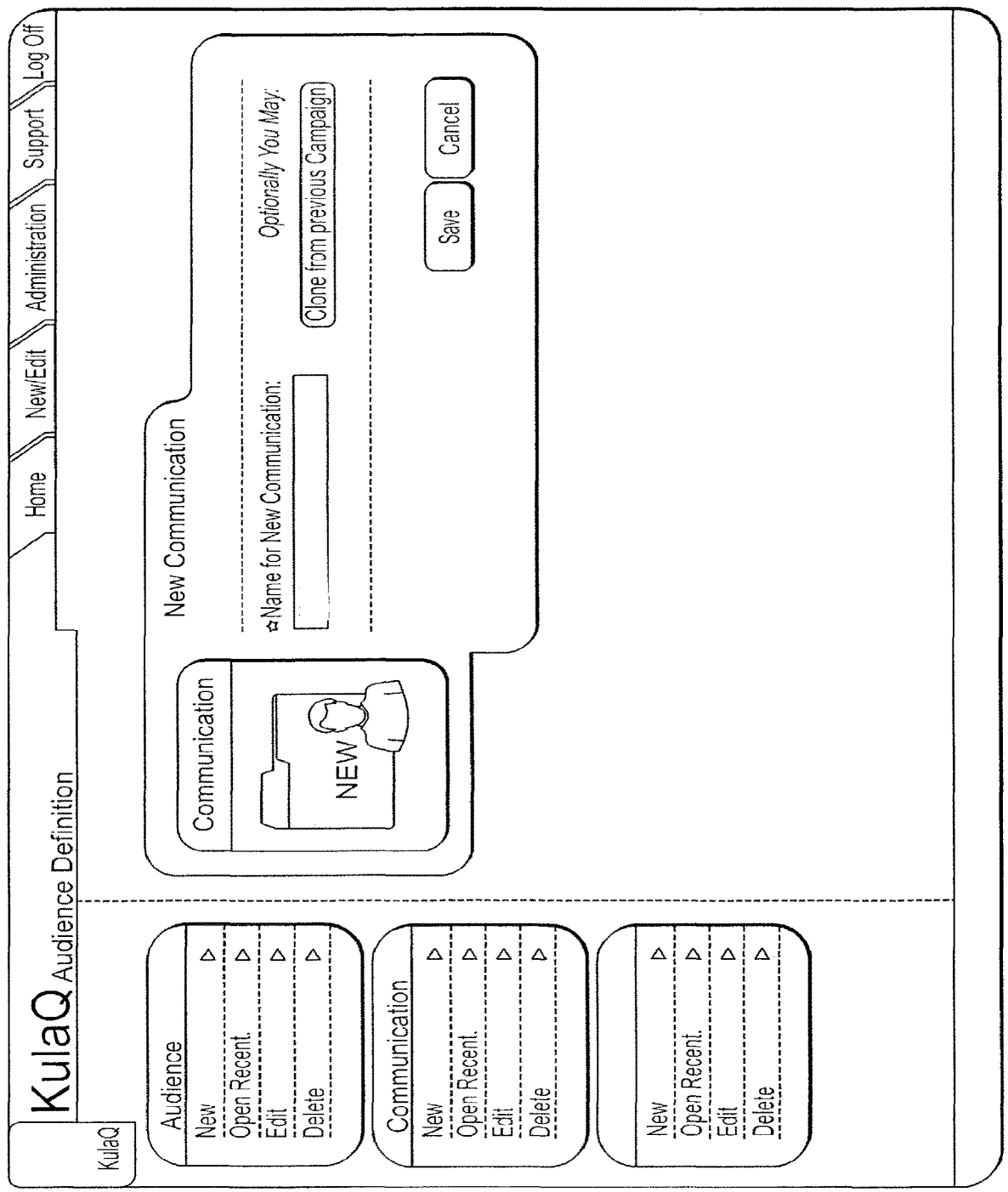
Figure 24F:
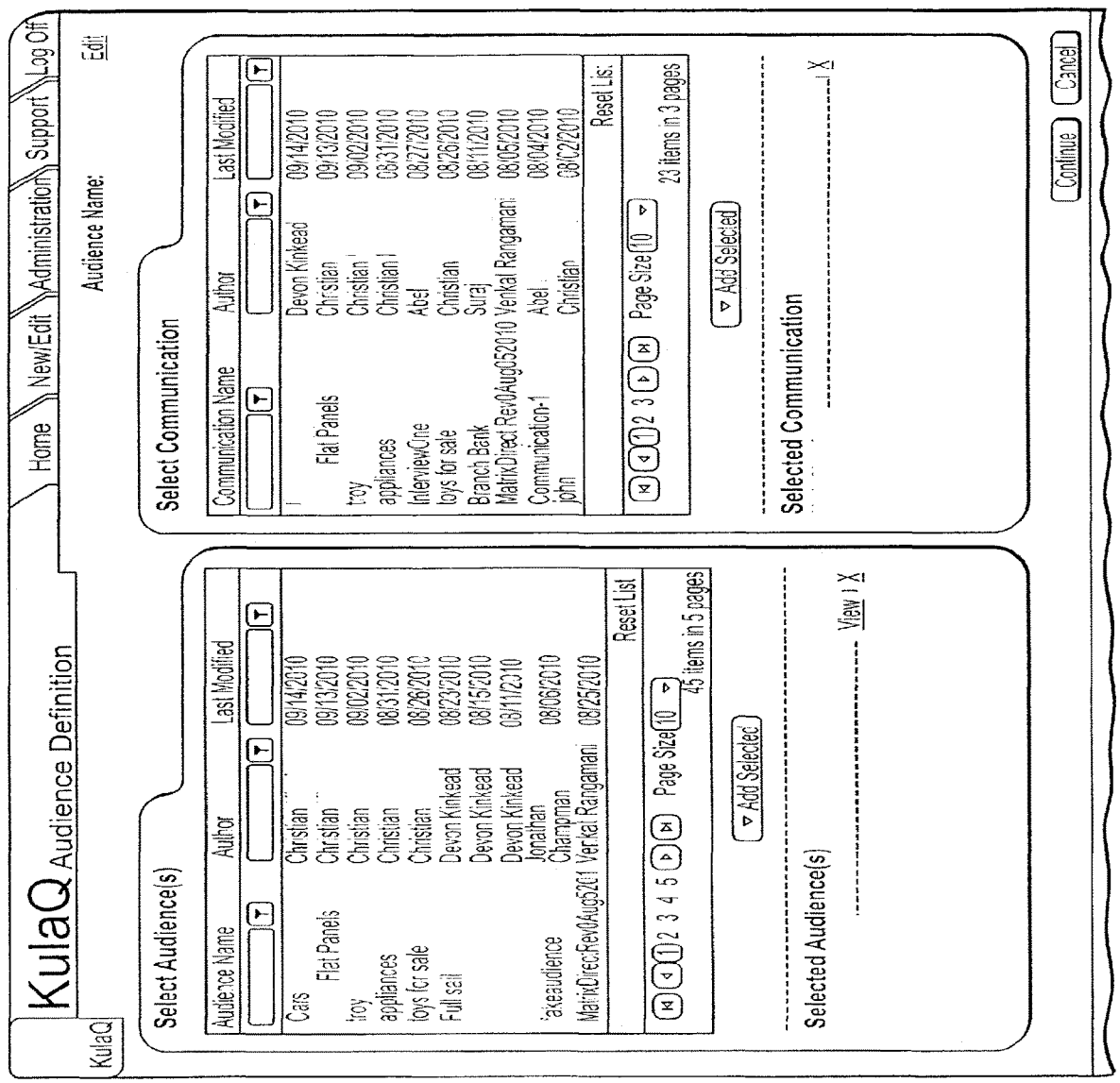

A screenshot of a user-interface screen for entering the interview questions and answers according to one embodiment is shown in FIG. 24C. The interface provides a graphic illustration of the branch structure of the interview, including the terminal or "leaf nodes" of the interview. Each of the leaf nodes corresponds to a "segment" of the audience that completes the interview via a particular path. FIG. 22C is a process flow diagram illustrating the naming of segments produced by the interview and the generation of offers associated with each segment. At step 947, each of the segments are defined and given a unique name. For example, "New car buyers interested in Brand W," "New Car buyers interested in Brand Z," "Pre-owned buyers interested in Brand Y," etc. At step 948, the user launches an offer design template (such as shown in the screenshot of FIG. 24D) and, at step 949, enters an offer tailored to a particular audience segment.

In one embodiment, the offer is initially presented to the end-user upon the completion of the interview, in the form of an offer question. For example, after the end-user has answered the three interview questions, indicating that the end-user is in the segment of "New Car buyers interested in "Brand W automobile," the interview can conclude with an offer question, such as "May we e-mail you an offer to match your best price, minus $500, for any new Brand W at XYZ Auto Dealer?" If the end-user answers yes, then an e-mail message is automatically sent to the end-user that can follow-up with additional details about the offer and instructions on how the offer can be redeemed. In one embodiment, the e-mail is created by entering information including the message title, marketer logo, offer text, offer label, description, disclaimer language and a hyperlink that directs the end-user to a web page of the marketer.

After completing the offer for a particular segment, the user then determines whether there are additional segments that require offers at step 950, and if so, enters the additional offers. If there are no remaining segments that require offers, the user saves the communication at 951.

FIG. 21D is a flow diagram illustrating the process of creating a new campaign using the marketing application according to one embodiment of the invention. At step 952, the user clicks the "Create New Campaign" icon from the menu screen (see FIG. 24A), and names the campaign (see FIG. 24E). Then, at steps 953 and 954 respectively, the user selects the audience definition and the communication for the campaign. An exemplary embodiment of a menu screen for selecting the audience and communication is shown in the screen-shot of FIG. 24F.

Figure 24G:
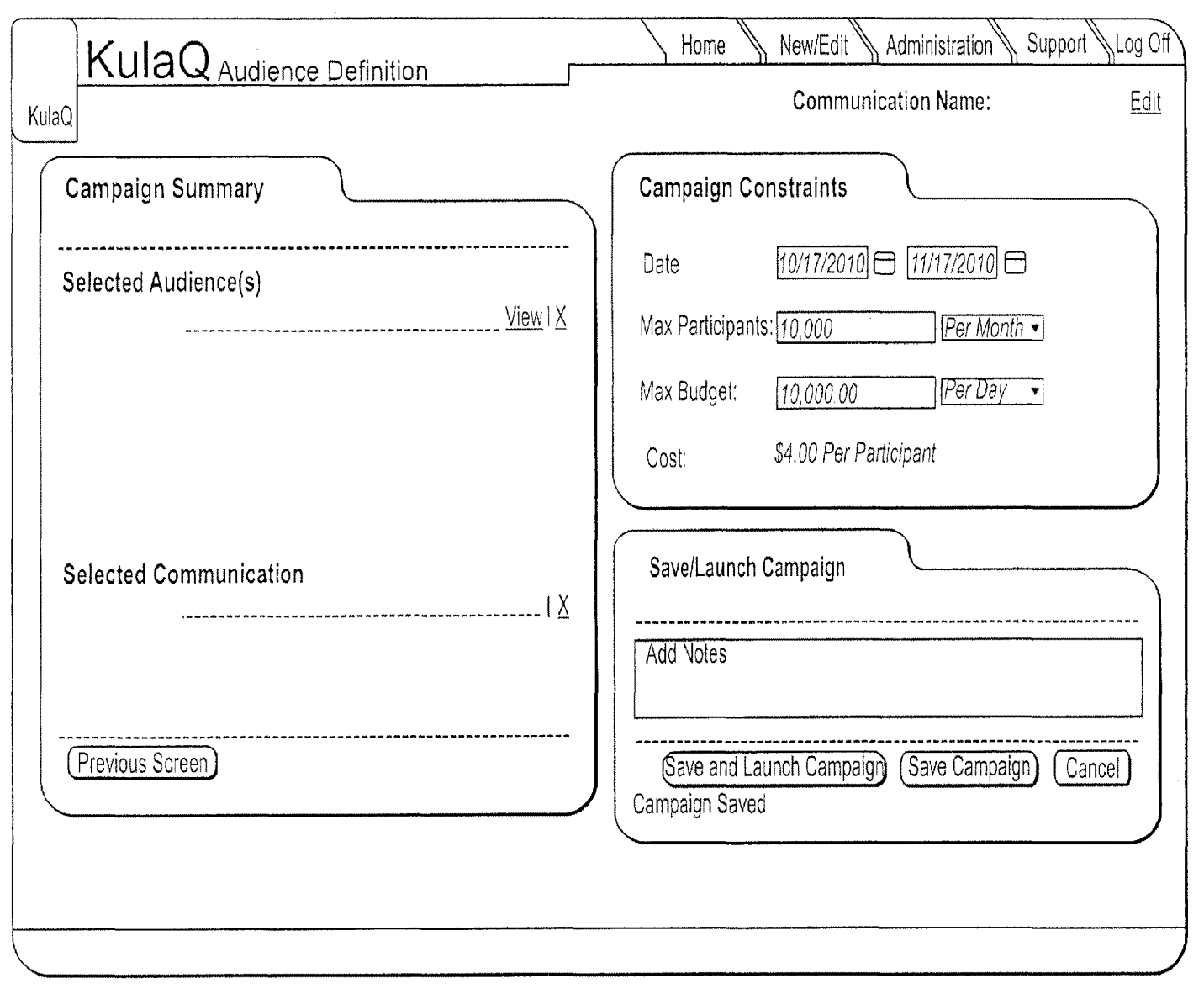

At step 955, the user enters campaign constraints, such as start and end dates, maximum number of participants and maximum budget for the campaign (see FIG. 24G).

At step 956, the campaign is saved and/or deployed in the PFM platform.

Figure 23A:
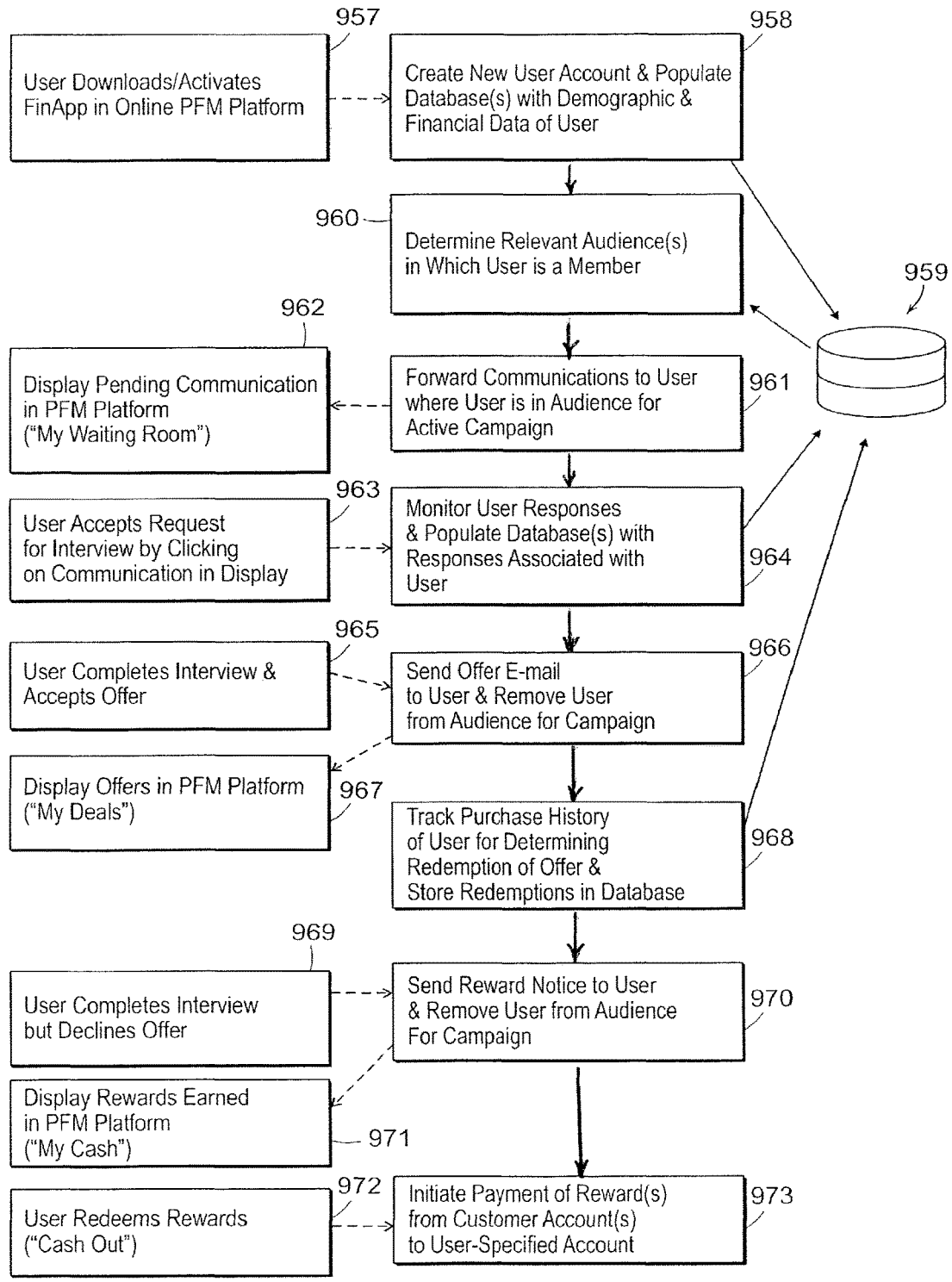
FIGS. 23A-23C illustrate a process flow diagram of the operation of preferred embodiments of a targeted marketing system in accordance with the invention.

FIG. 23A is a process flow diagram illustrating the operation of the present targeted marketing system according to one embodiment. At 957, an end-user downloads and activates the targeted marketing financial application to a computer device, which can be, for example, a computer, a mobile phone, or any web-enabled device, and operates the financial application in an on-line PFM platform. In response, at 958, the targeted marketing system (see 1001 in FIG. 21) creates a new user account for the end-user and populates one or more database(s) 959 with demographic and financial data (e.g., purchase history) of the end-user. As discussed above, at least some of this data can be provided by the end-user as part of an initial registration process. Additionally, at least some of the data can be obtained from other sources, such as financial institutions and/or a PFM platform provider.

Figure 23B:
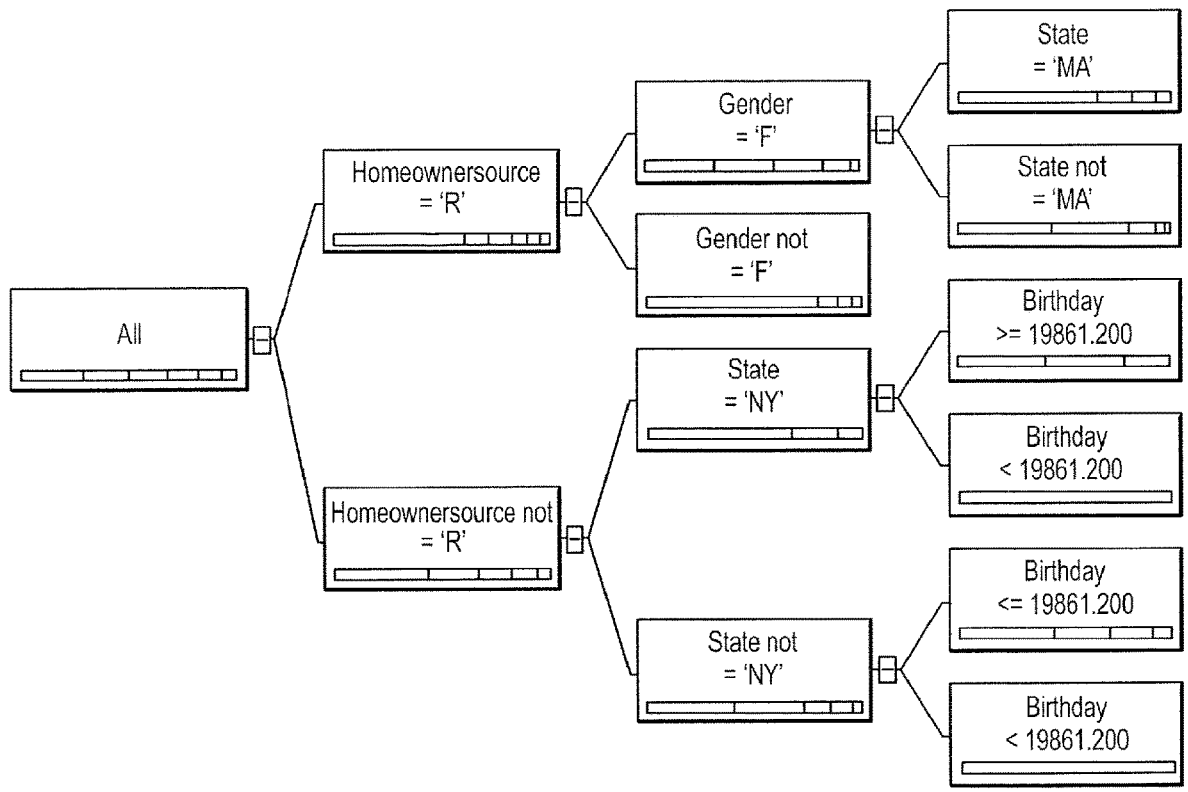
Figure 23C:
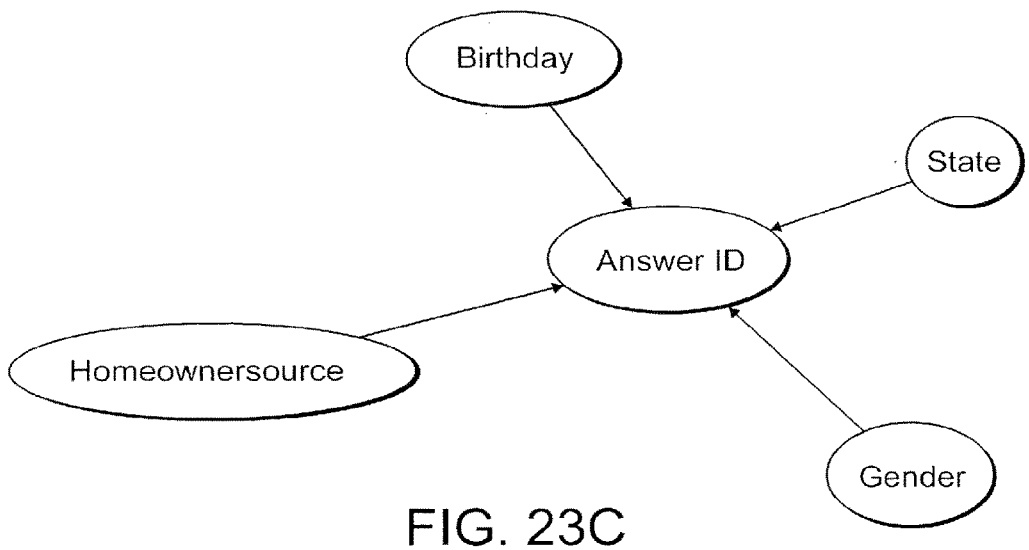

Shown in FIG. 23B is an embodiment of ideas presented in the Possible Data mining applications section above. In particular this is an implementation where a user's probability of accepting a certain offer is being predicted using the Microsoft implementation of the Decision Tree data mining algorithm. In this case, the data mining model is predicting the offer (denoted by answer ID=12) that the user is most likely to take, given that he has responded to a certain campaign. Notice how the decision tree algorithm segments people by homeowner status, followed by gender and so on. This tree shows the first 4 levels of the decision tree; there may be other attributes that influence the offer choice but the demographic attributes homeownersource, gender, state and birthdate are the top level predictor attributes. This is shown by the dependency of FIG. 23C.

The lift chart of FIG. 28 shows the efficacy of various data mining models to predict a user's acceptance of offer #12 of FIG. 23B. The random guess model demonstrates the least effective approach where 100% of the audience has to be interviewed to find out 100% of the target population that will accept the offer. The preferred model demonstrates the scenario where only less than 30% of the population has to be interviewed but every interviewed person will accept the offer. All models that are less effective than the random guess model (such as Naïve Bayes above), can be discarded. Among the models above that lie between the random guess model and the ideal model, the decision tree (DT) appears to be the most effective, nearing 100% coverage of the target population with less than 50% (approx 45%) of the population being interviewed.

In this manner, various data models can be developed to predict an outcome (such as acceptance of an offer or interviewing with a certain brand) and the best performing model can be chosen by scrutinizing the lift charts. For a detailed description of lift charts, please look at http://technet.microsoft.com/en-us/library/ms175428.aspx the contents of which is incorporated herein by reference.

As previously discussed, the marketing application of the targeted marketing system operates to define audiences of end-users based on selected attributes of the end-users. At 960, the targeted marketing system compares audience definition(s) to attributes of the end-user, and assigns the end-user to any relevant audiences for a marketing campaign. This process can be repeated whenever there is a new or modified audience definition. Conversely, since the attributes for end-users can change over time, the marketing system can periodically check to ensure that the assignment of an end-user to a particular audience is still valid, and whether the end-user can be assigned to any new audiences.

At 961, communications are sent to the end-user's computer device. These communications are sent as part of marketing campaigns that are deployed through the PFM platform. In a preferred embodiment, the end-user only receives a communication when she is a member of the audience for the relevant marketing campaign.

Figure 24H:
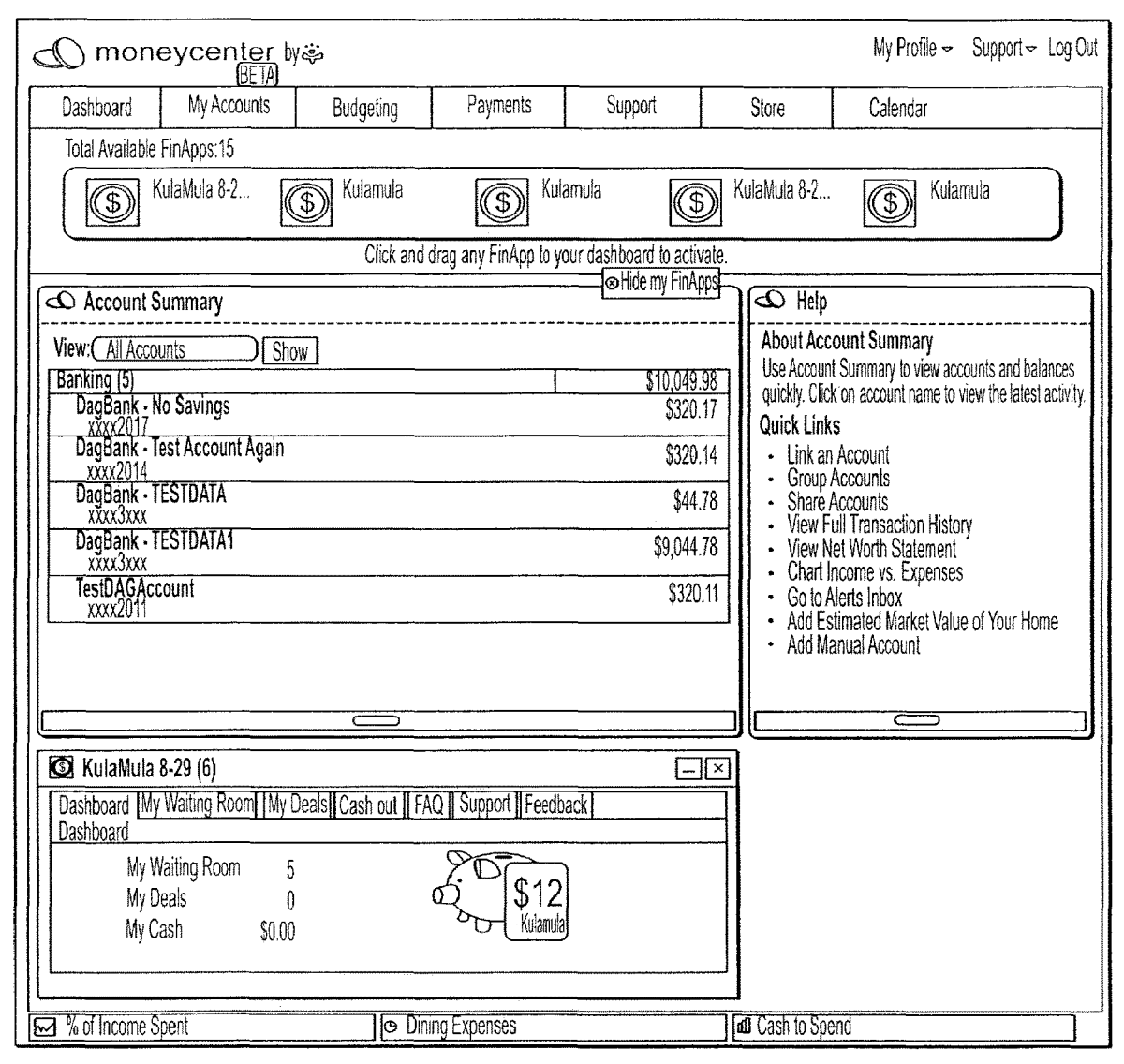
Figure 24I:
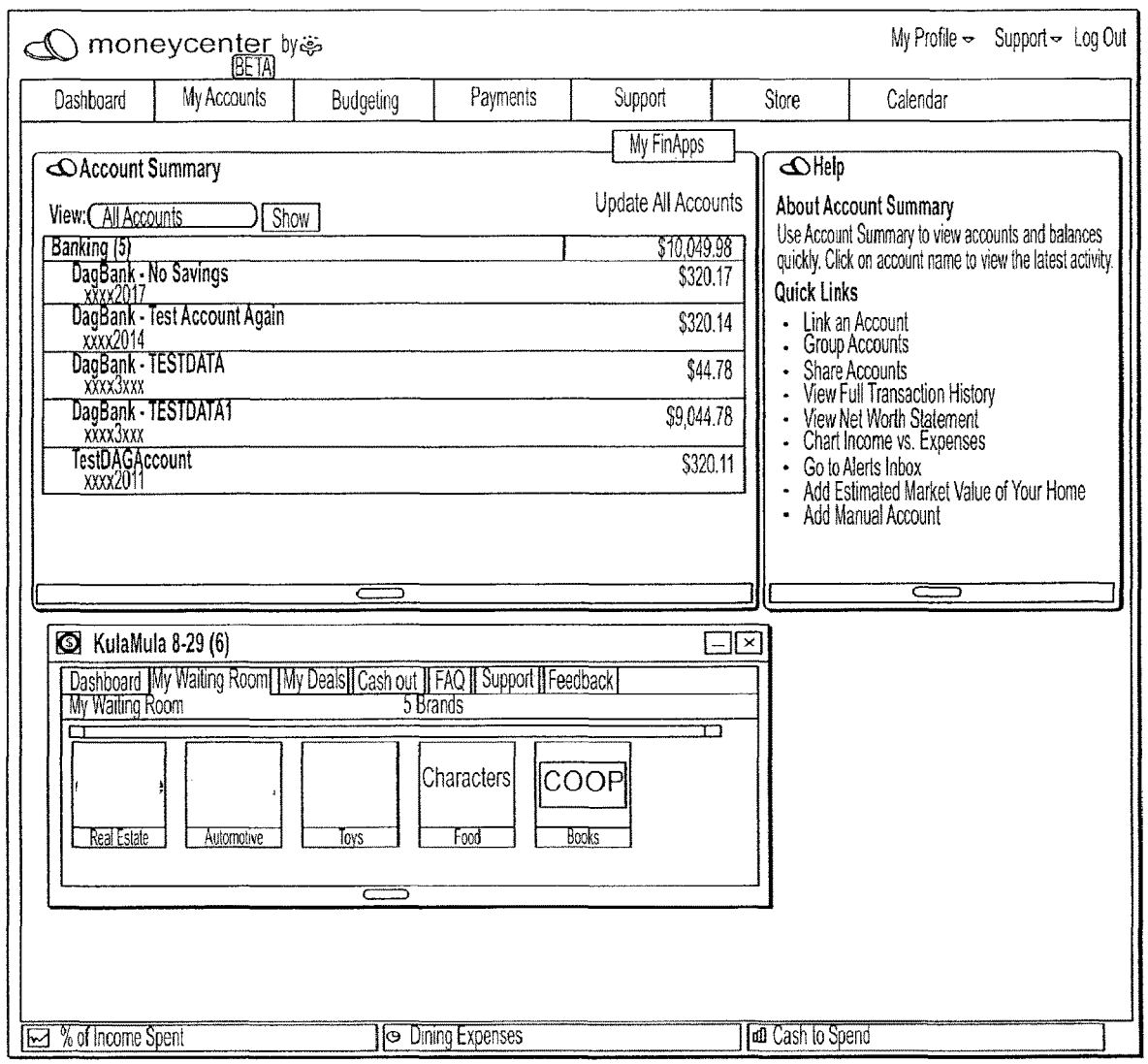

At the end-user's device, the pending communications are displayed within the user's PFM portal or dashboard or mobile phone application. FIGS. 24H-J illustrate screen shots of a PFM portal according to one embodiment. In addition to financial account information, the PFM portal includes a display of the targeted marketing financial application in the lower left-hand portion of the screen. In FIG. 24H, the display includes a variety of interactive menu options, including Dashboard, My Waiting Room or New Deals, My Deals, Cash Out, etc. The display indicates that the end-user has five pending interview requests from marketers ("My Waiting Room" or "New Deals"). By clicking on the "My Waiting Room" or "New Deals" tab, the end-user is presented with a display of five logo icons indicating the marketers that wish to interview her (see FIG. 24I).

At 963, the end-user accepts an interview request by clicking on the marketer's logo. The end-user is then presented with the three-question interview created by the marketer, as discussed above. In general, it takes about 30 seconds for the end-user to progress through the interview questions. As the end-user answers each question, the responses are forwarded to the targeted marketing system, which monitors the responses and populates the database(s) 959 with responses associated with the end-user, as shown at 964. These prior responses then become attributes of the user, and can be used for audience definition in future marketing campaigns, as described above in connection with FIG. 22A.

Figure 24K:
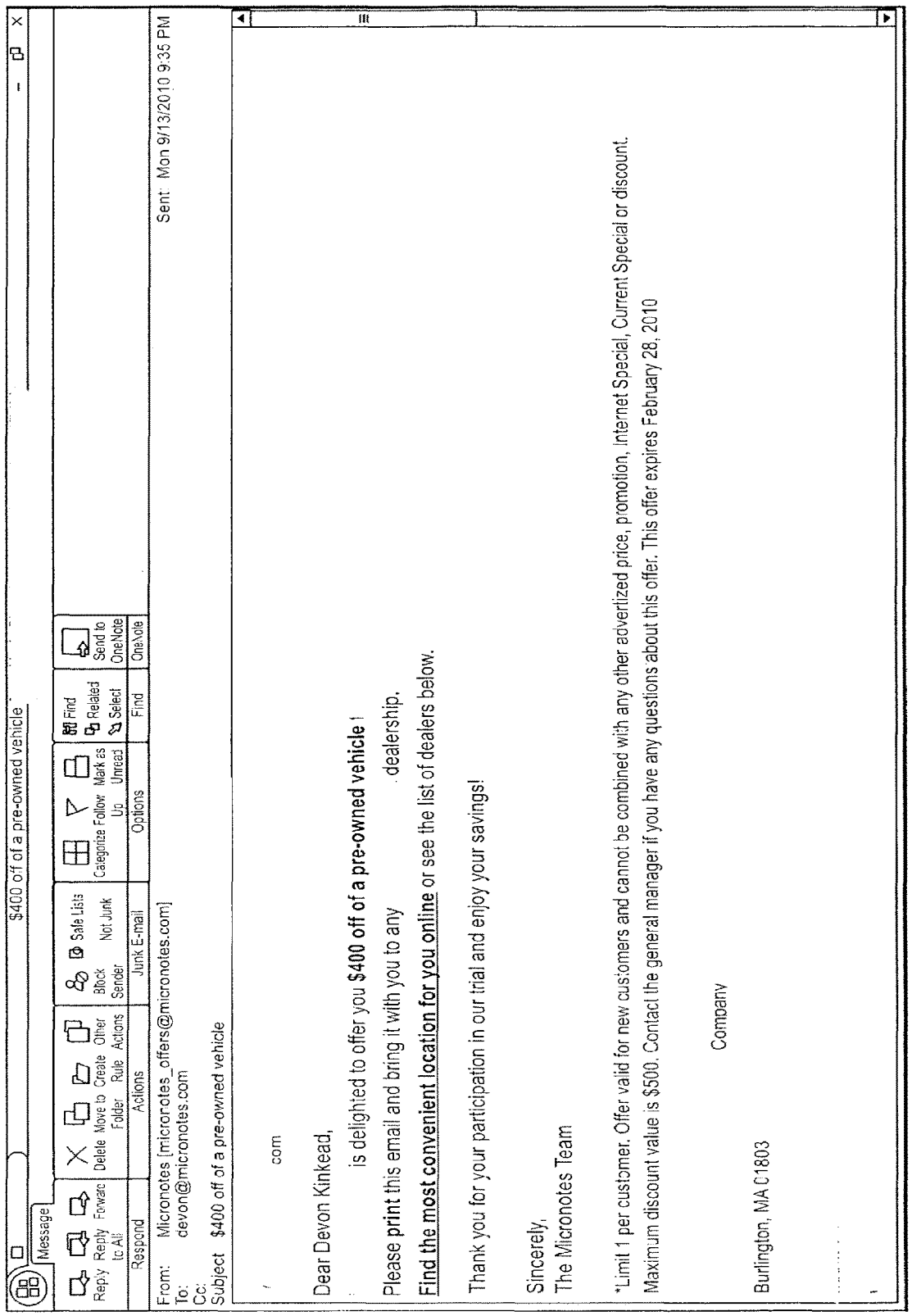
Figure 24L:
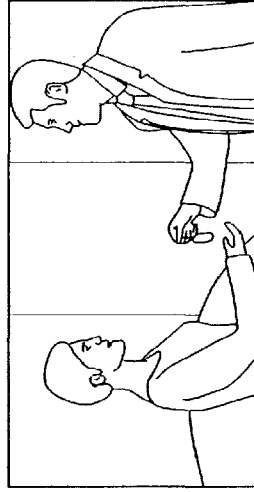

At the conclusion of the interview, the end-user is presented with an offer, and given an opportunity to accept or decline the offer. At 965 (FIG. 23), the end-user completes the interview and accepts the offer. The end-user is then sent an offer e-mail at 966. The offer e-mail can be sent via the PFM platform, and catalogued in the end-users inbox in the PFM portal. As seen in FIG. 24J, for example, the end-user can click on the "My Deals" tab and see the offers she has accepted. It will be understood that the offer e-mail can be sent to additional accounts, such as the end-user's personal e-mail account. The end-user can open the offer e-mail as shown in FIG. 24K. In some embodiments, the offer e-mail can incorporate a hyperlink that takes the end-user to a web page that is be specifically configured by the marketer, such as shown in FIG. 24L. In one embodiment, the hyperlink may point to a page that collects contact information from the end-user for a follow-up conversation and further selling.

In one embodiment, the targeted marketing system keeps a record of all offers made and accepted by each end-user, and can de-select an end-user from the audience for a campaign she had already interacted with. As shown at 968, after an end-user accepts an offer, the marketing system monitors the purchase history of the user to determine whether she has redeemed the offer. For example, if the end-user has accepted an offer for $500 off the purchase of a new car at XYZ Auto Dealer, the marketing system monitors the purchase history of the end-user to determine if there are any transactions that meet a pre-determined criteria as indicating the user has redeemed the offer (e.g., a large purchase at XYZ Auto Dealer within 60 days of receiving offer). Redemption data can be stored in the database for analytics.

FIG. 23 also illustrates the process when an end-user declines an offer from a marketer. As shown at 969, the end-user has completed the three-question interview, but declines the offer presented. At 970, the marketing system sends a notification that the end-user has earned a pre-determined reward (e.g., $1) for her time and attention in responding to the interactive communication from a marketer. The financial application can maintain a running total of the rewards the end-user has earned (e.g., "My Cash" in FIG. 24H), and displays the earned rewards at 971.

At 972, the end-user redeems her rewards (such as by clicking on the "Cash out" option in FIG. 24H), and the marketing system initiates the transfer of the amount of the reward into a financial account associated with the end-user. The end-user can specify the account into which the earned rewards are deposited upon registration with the marketing system. In one embodiment, the reward (e.g. cash, reward points) is transferred directly from account(s) associated with the relevant marketer(s) into the end-user's account. In other embodiments, the reward is paid by the marketing system, who can then invoice the relevant marketers for the amount paid-out.

Figure 25:
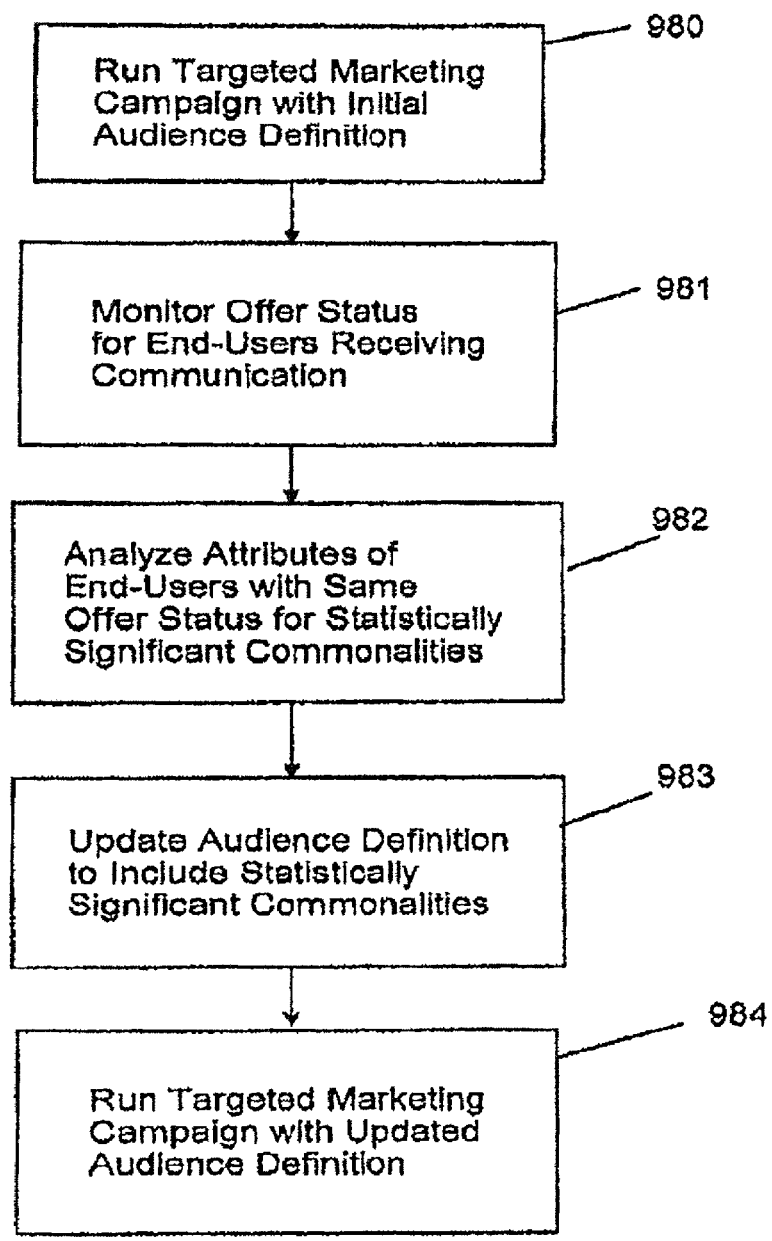
FIG. 25 illustrates a process sequence for conducting a monitored targeted marketing system.

FIG. 25 (and the description in the appendix) is a flow diagram illustrating an embodiment of the invention in which the marketing system uses data mining algorithms to dynamically update the audience definition during or after the marketing campaign is run in order to more particularly define the target audience for the campaign. At step 980, a targeted marketing campaign is initiated as described above. The campaign comprises a communication that is distributed to a defined audience of end-users, based on attributes of the end-users. Each communication includes an offer to purchase a good or service, which can be accepted or rejected by the end-user. At 981, the marketing system monitors the status of communications presented to end-users, i.e. whether the end-user accepted/declined a request for interview, whether the end-user accepted/declined the offer, whether the end-user redeemed the offer (based on his/her purchase history), etc. This "offer status" data then becomes an attribute associated with these users. At 982, the marketing system uses data mining analysis to analyze the similarities of end-users who have a particular "offer status" (e.g., users who have accepted a particular offer from a marketer) to find statistically significant commonalities that can be used for improved audience definition. For example, the marketing system can use cluster analysis to find attribute commonalities between people who accepted an offer from ABC Insurance company to provide an improved audience definition. For example, if it is found that 88% of the people who accepted an ABC Insurance offer during a campaign also had a transaction in the "medical" category in the previous 90 days, the audience definition can be updated to include those with a "medical" category transaction in the previous 90 days. Accordingly, the audience definition is updated at 983 to account for any statistically significant commonalities, and if there are any such updates, the campaign is continued with the updated audience definition at 984.

A further preferred embodiment of the invention employs data retrieved from a medical records database. Such databases store information regarding the medical history of individuals that can include the prescription medication history of the individual, as well as the diagnostic history of the individual that can indicate whether the individual would be interested in particular products or services. Thus, a marketer of insulin, for example, would search a database for diabetic patients to design a campaign targeted for insulin users. Health insurance providers is another example of a marketer class that can utilize medical record data in designing campaigns for acquiring new customers.

Figure 26:
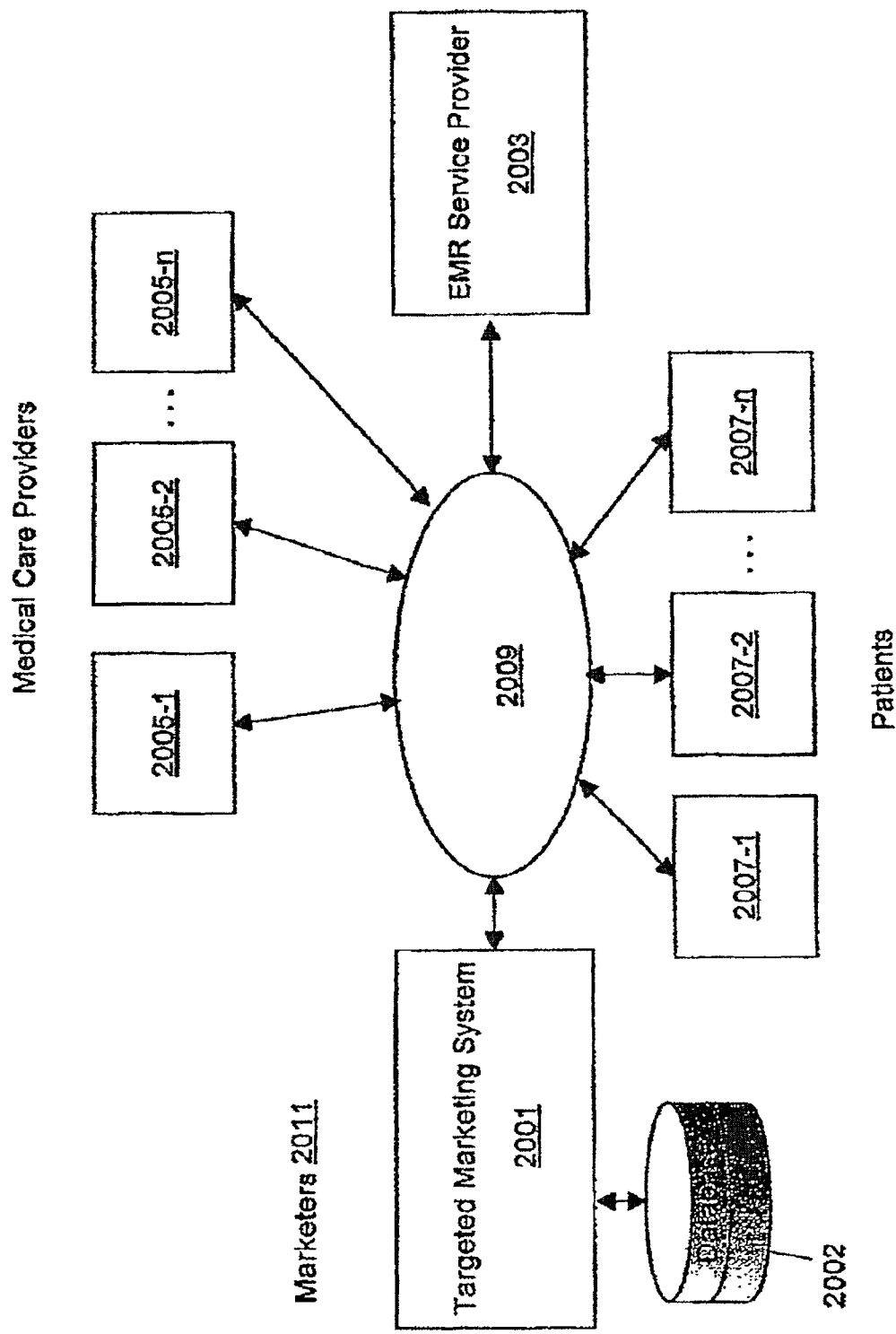
FIG. 26 illustrates a targeted marketing system using an electronic medical records (EMR) database.

FIG. 26 is a schematic illustration of an embodiment of a targeted marketing system that is implemented using an Electronic Medical Records (EMR) management system. EMR systems are growing in adoption thanks to the governmental emphasis and funding of these systems as a way of reducing medical costs and medical errors and improving the efficiency of medical practices. In general, EMR systems have two user interface-based applications targeted at the two communities they serve, one for medical care providers and the other for patients. In one embodiment, the present targeted marketing system enables targeted advertising at both of these communities of users, while maintaining the confidentiality of sensitive medical information. This data can also be used in combination with the financial management systems previously described herein.

FIG. 26 illustrates a first group of computer systems used by medical care providers 2005-1, 2005-2, . . . 2005-n, and a second group of computer systems used by patients 2007-1, 2007-2, . . . 2007-n. A first EMR user interface-based application operates on the medical care provider computer systems 2005-1, 2005-2, . . . 2005-n, and enables the medical care providers to view and input data to the medical records of patients seeking care from the providers. A second EMR user interface-based application operates on the patient computer systems 2007-1, 2007-2, . . . 2007-n, and enables the patients to view their own medical records. In this embodiment, the electronic medical records are maintained by an EMR service provider 2003 behind a secure firewall, which makes the relevant medical records available to the medical care provider application and to the patient application, using appropriate validation and access protocols. The medical care providers and patients communicate with the EMR service provider 2003 over a network 2009, which can be a public network such as the internet, a private network such as a hospital or institutional network, or combinations of the these.

In certain embodiments, the EMR service provider 2003 is associated with a particular medical care provider or organization, such as a hospital, HMO, medical practice, etc., and access to the EMR service is limited to medical care professionals and patients of that organization. In other embodiments, the EMR service provider 2003 services a variety of different organizations and practices.

The targeted marketing system 2001 generates and provides content, in the form of targeted interactive marketing and/or advertising, that are distributed over the network 2009 to both medical care providers 2005-1, 2005-2, . . . 2005-n and patients 2007-1, 2007-2, . . . 2007-n using the EMR system. In one embodiment, the targeted marketing system 2001 generates targeted interactive marketing and/or advertising campaigns, as in the embodiment of FIGS. 21-25. In this embodiment, the targeted marketing system 2001 enables a marketer to define an audience of users of the EMR system, which can include the medical care provider users, the patient users, or both, and distribute specific communications (e.g., advertisements) to the members of the audience. The communications can be, for example, text, image or video based advertisements, or requests for a short interview (such as described above). The communications are displayed on the computer devices of the users, and can be incorporated into the user interface based EMR application.

In one embodiment, the targeted marketing system 2001 maintains or has access to one or more databases 2002 that contain demographic data and other attributes of the users of the EMR system. In some embodiments, the data is stripped of information that would allow specific patients or users to be identified.

In one exemplary embodiment, the targeted marketing system 2001 defines an audience for a targeted marketing campaign based on one or more of the following categories of user attributes:

demographic information about users of the EMR system gathered from third party providers based on identifying information gathered from the patient or medical provider's EMR system (e.g. name and address are supplied to the targeted marketing system by the EMR record provider or patient, then a call is made to a 3$^{rd}$ party data provider (e.g. InfoUSA or Acxiom) to retrieve a demographic profile.

previous responses to interview questions, in the case where the user has previously received a targeted communication in the form of an interview;

the medical information of patients, such as specific medical conditions, drug prescriptions, compliance with drug regimens, etc., which can be obtained from the EMR system in a manner that preserves patient confidentiality;

the attributes of medical care providers, such as the characteristics of a medical practice or the patient base of a certain doctor. This data can be obtained from the EMR system. Examples of attributes include, for example, medical specialty, number of patients, demographic attributes of patient base (e.g., age, income, etc.), appointment wait times, medical conditions in the patient base, drug compliance regimens or lack thereof, the role of the medical care provider logged into the EMR system (e.g., doctor, nurse, system administrator, etc.), and so forth.

Patients and medical care providers receive either text or image based advertisements or requests for a short interview on their computers or mobile devices based on the audience specification provided by the marketer using one or more of the four categories of attributes described above. Patients will typically receive advertisements and interviews for products and services such as prescription and non-prescription drugs, medical appliances (e.g., glucose monitor, blood pressure cuffs, etc.) and other convenience and safety-based consumer products (e.g., non-slip bath mats, walkers, prevention products and services, etc.). Medical care providers will typically receive advertisements or requests for short interviews from brands that produce medical appliances (e.g., x-ray machines, scanners, etc.), medical supplies (e.g., gauze, medications, etc.) and from medical professional service providers (e.g. accounting service providers, insurance providers, etc.).

In one embodiment, the present invention allows patients and medical care providers to receive targeted advertising using the medical histories of the users and the general characteristics of the medical practice. It also allows medical care providers to offset costs incurred in setting up and maintaining EMR systems by earning revenues through advertising. It also allows EMR service providers to possible offer the EMR system to doctors and patients for free while relying solely on advertising revenues.

Figure 27A:
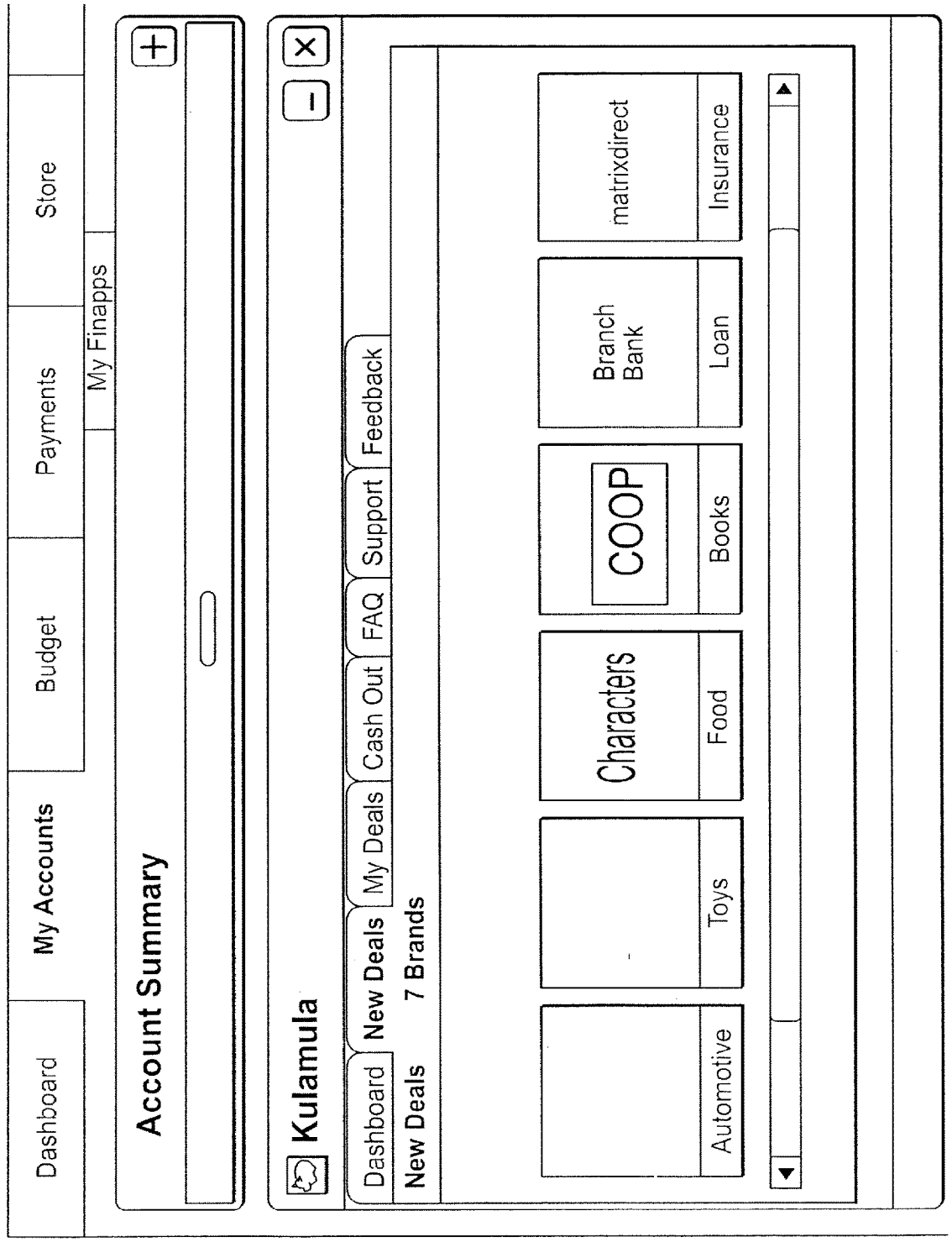
FIGS. 27A-27D illustrate additional features in screens displayed for the user in accordance with the invention.

In another embodiment, the user interviews with a celebrity or high-ranking company official representing the firm. For example, an interview might be conducted with a celebrity or spokesman for the company with a picture in place or in conjunction with the company logo. The company's CEO can also be featured as an interviewer as shown in FIG. 27A.

Figure 27B:

In another embodiment, the names and or faces of social media friends who have taken a particular interview or accepted an offer are displayed in conjunction with an interview or offer, as illustrated in FIG. 27B.

Figure 27C:
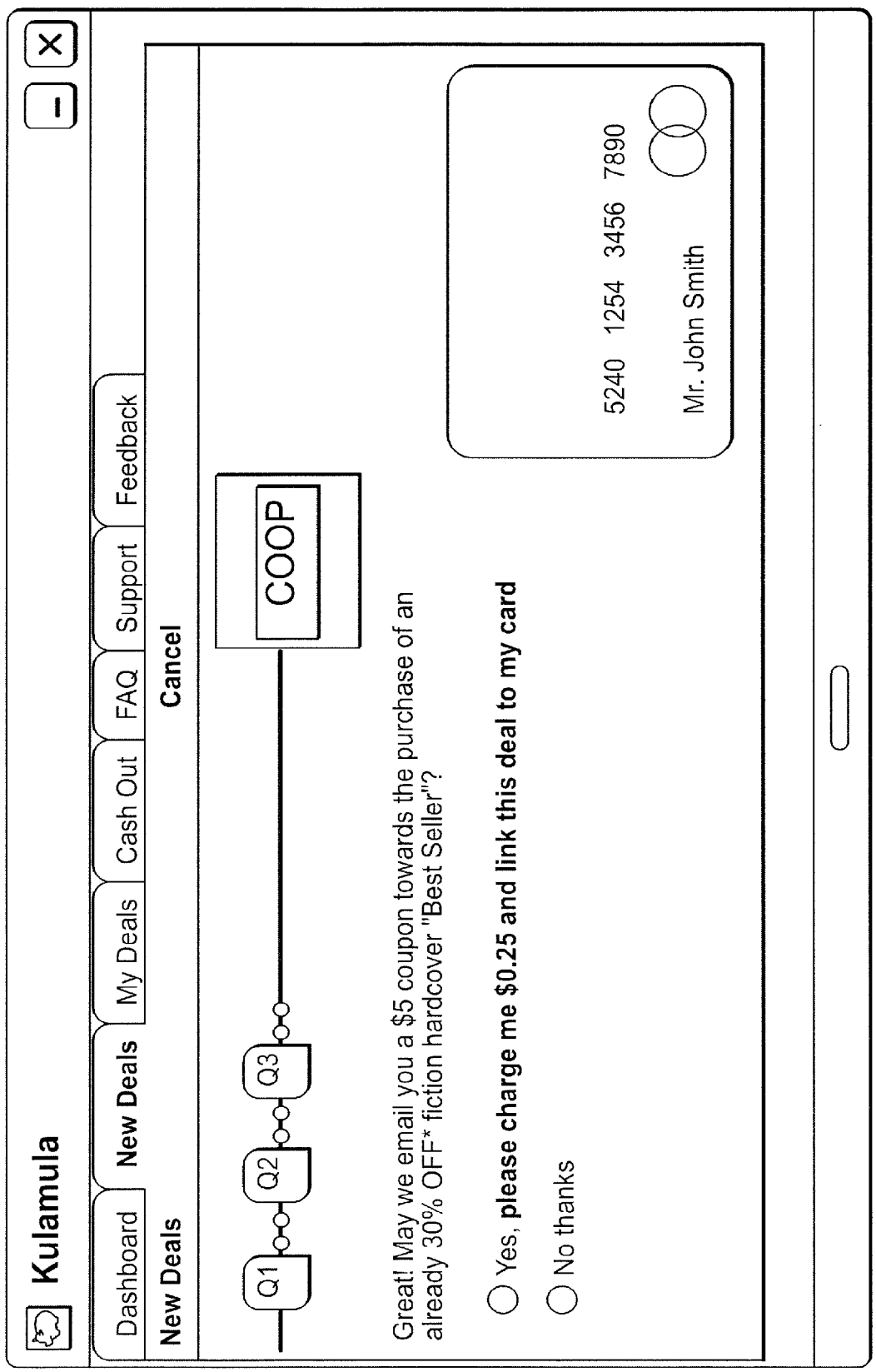

In another embodiment, offers are linked to the user's credit card on a mobile device or social networking system so that the user can interact with brands and the user's bank without having to log into her bank or financial institution's website as shown in FIG. 27C. By linking offers to cards, coupons are eliminated for the user and the card issuing bank benefits from the interchange fees associated with purchases made on the credit/debit card.

Offers can be verified valid and redemptions tracked at the point of sale by entering an offer code and card identify into a merchant enabled website. For example, when the end-user arrives, in the above example, at the MIT Coop to redeem her $5 offer, she presents her coupon code (e.g. 12345) and her credit card. The coupon instructs the cashier to go to: www.MITCOOP.com/KulaMulaoffers where the cashier inputs two pieces of information: 1) the coupon code 2) the credit card issuer. The system verifies that the coupon code is valid and has not already been redeemed, and verifies the correct card issuer linked to the offer. The system returns an "Approved" result once these criteria are met and the cashier can give the end-user the stated discount offer.

Figure 27D:
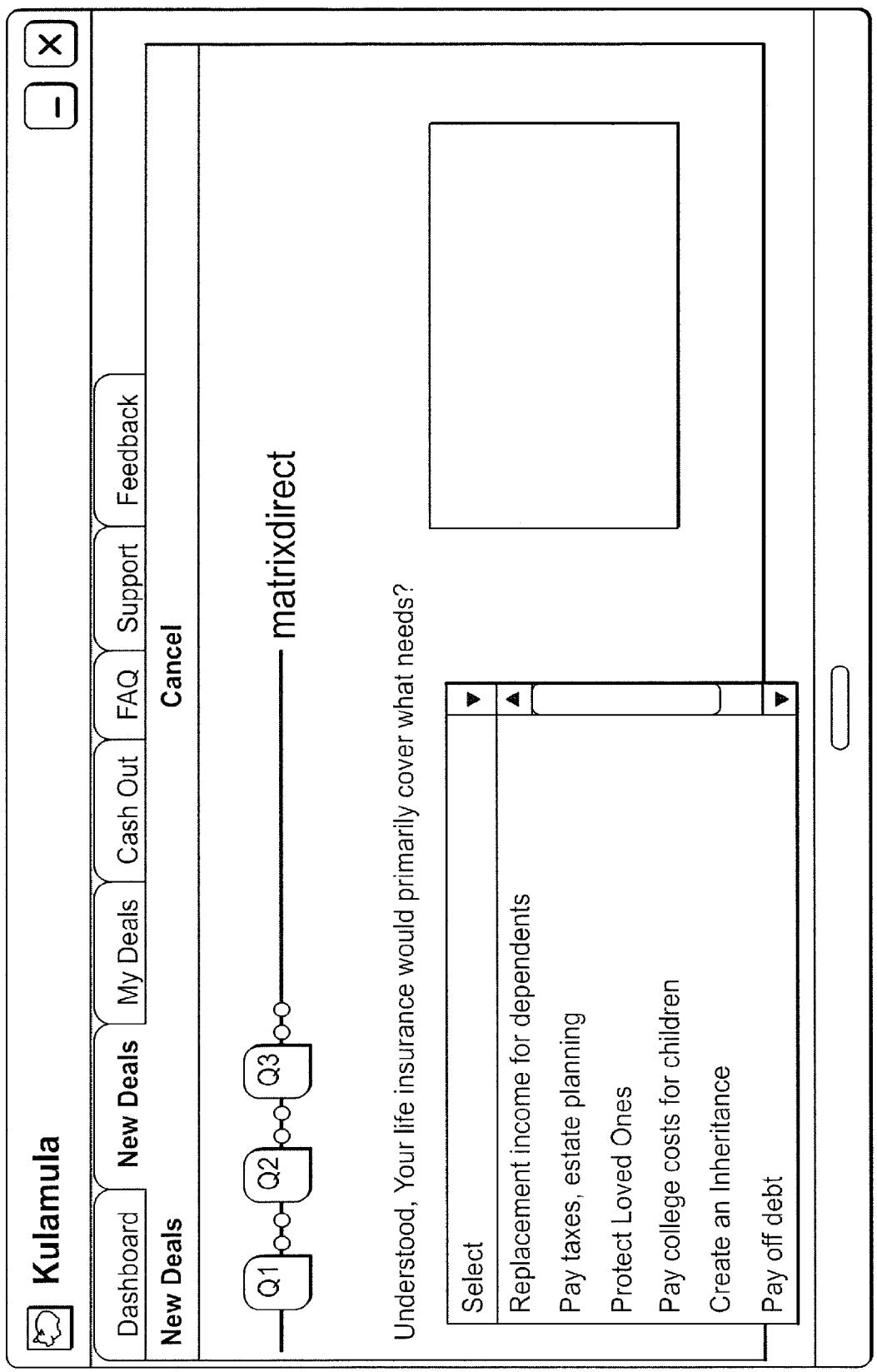

In another embodiment, the artwork (e.g. image, graphic or video) associated with each question changes to reflect the tone, message, or direction of the interview. For example, if a user is considering life insurance to take care of dependents, a picture of a child might appear during the interview as shown in FIG. 27D.

In another embodiment, the entire interview is conducted using video clips of a human or an Avatar with, and/or without sound.

In another embodiment, the marketing system is used to create a platform for consumers to purchase relevant purchase option upgrades which are attached to their credit or debit card. Presently, highly discounted offers are sold directly to consumers by companies. These deeply discounted deals are attractive to some consumers but typically lack relevance for the individual consumer and present a difficult business proposition to retailers with a non-zero marginal cost; that is, discount your product by 75% to collect 25% of the sales in advance. At the same time, card-linked offers from card issuers and marketing companies are convenient to users because they eliminate the steps associated with couponing (e.g. search, download or clip, catalog, remember to bring to store, redeem) and provide a system of tracking in-store coupon redemptions for brands. Card-linked offers also provide a system for collecting purchase history to drive purchase history based targeting of campaigns.

The problem with directly discounted offers by companies offering the products of other retailers, using through web-based stores, is that they are rarely relevant to the user and therefore must overcome the relevance problem with steep discounting. This process is unsustainable to the original retailer and may render existing, profitable customers, into existing unprofitable customers for the retailer. The advantage of Groupon-like offers is that because the offers are purchased in advance by the consumer, they achieve the objective of marketing which is to change consumer behavior because the consumer is invested in the offer.

The problem with card-linked offers is that since the offers are numerous and free, they stand less chance of modifying consumer behavior so, as a marketing tool, they are minimally effective because the consumer isn't invested in the offer and unlikely to change behavior.

A solution to the aforementioned problems embodies the following characteristics:
  Provides offers for sale which are highly relevant because they are based on transaction history and may involve asking the consumer for additional information to render the correct offer.
  Provides a means of making steep discount offers only to acquisition customers based on purchase history.
  Offers are card-linked to eliminate the steps associated with couponing and to provide purchase history.

The problem with all such financial account exchange systems is solving the chicken and egg problem, which is—a company needs to have offers in order to attract an audience and also must have an audience to interest brands in creating offers.

This problem is solved in the present embodiment because an audience of consumers is incentivized to register their credit card with the system to receive discounts on purchases they already make. The system collects their purchase history through an aggregation engine, like Yodlee, and locates offers from coupon aggregators and associates those deals with the consumer's card. When a qualifying redemption event occurs, the system bills the brand's promotion reserve account for the discount and credits the consumer's account with the discount. The consumer now benefits from their existing purchase activity, the brand benefits from receiving redemption information on their electronic coupons, and the credit card company benefits by having the deals associated with their credit card which drives interchange revenue. However, no change in consumer behavior has been realized—which is the purpose of marketing.

The present embodiment engenders the system above with an important feature, the ability to purchase an upgraded offer. For example, where the user has signed up for the system above either because their card issuer has promoted the system or one of brands has promoted the system—or both. The application now prompts the consumer to consider an upgraded offer. For example, the system may have already linked an offer for 10% off any purchase from a first major retailer to the consumer's credit/debit card. The system now prompts the user to consider purchasing an upgraded offer from the retailer. For example, the user who the first retailer knows is a customer of a competing retailer may be prompted to consider an offer for 40% off any purchase of $200 or more at the first retailer for a price of $5—valid for 30 days; the offer may also be linked to a specific product (e.g. 40% off any Plasma TV at the first retailer) as long as product level information can be tracked through the credit card transaction. If the consumer purchases the offer, her cash account or card will be debited $5 and the 40% off deal will be associated with her credit card. When she visits the retailer to redeem her offer, the transaction prompts a notification (text or email) advising her that the transaction has been registered and 40% of the purchase price has been placed in her cash account or credited to her card. The consumer may also choose to recommend others to the system or the upgraded offer via email or social media.

Figure 28A:
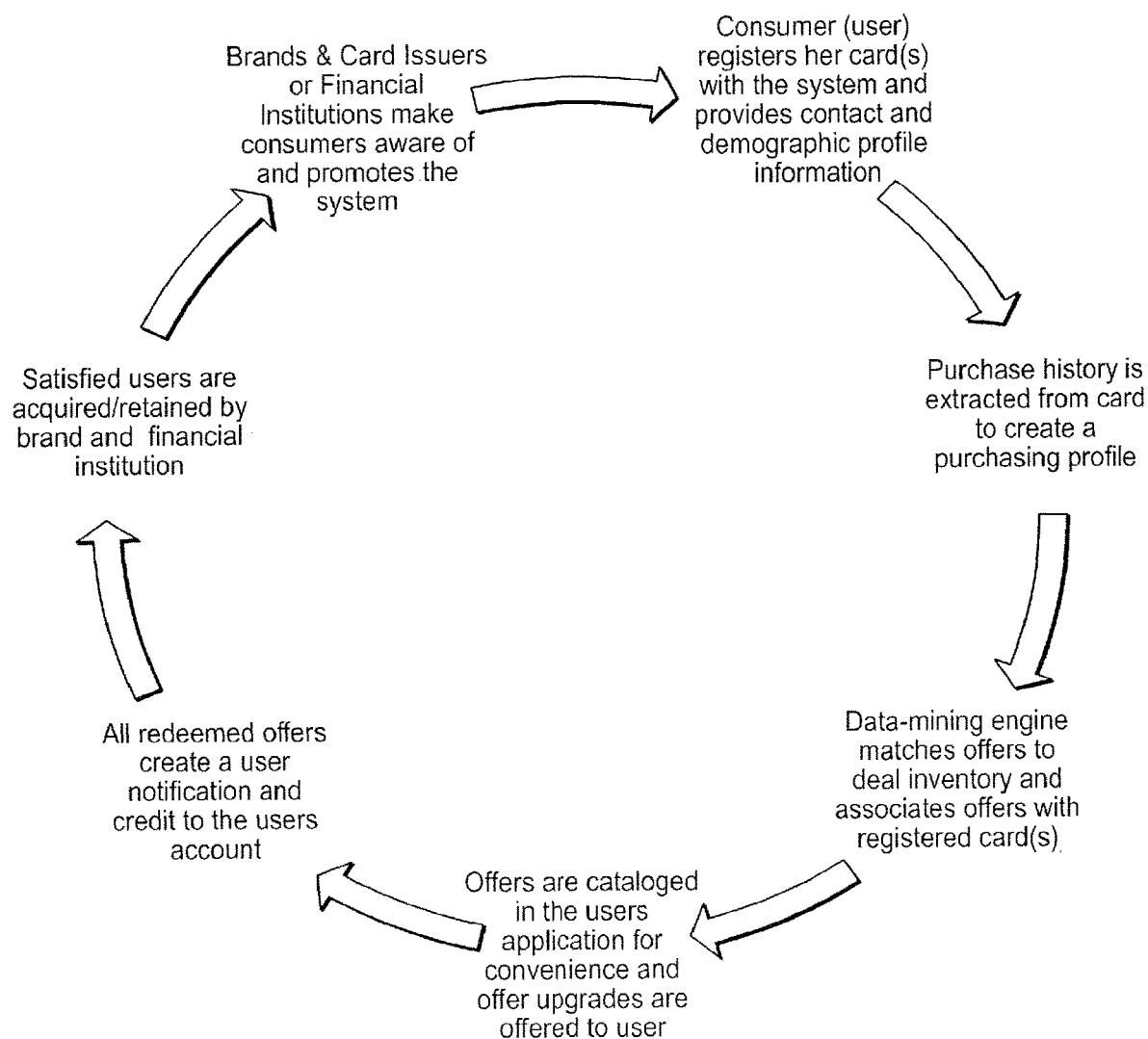
FIG. 28A graphically illustrates in example of the efficacy of data mining operation to match offers to inventory and users.
Figure 28B:
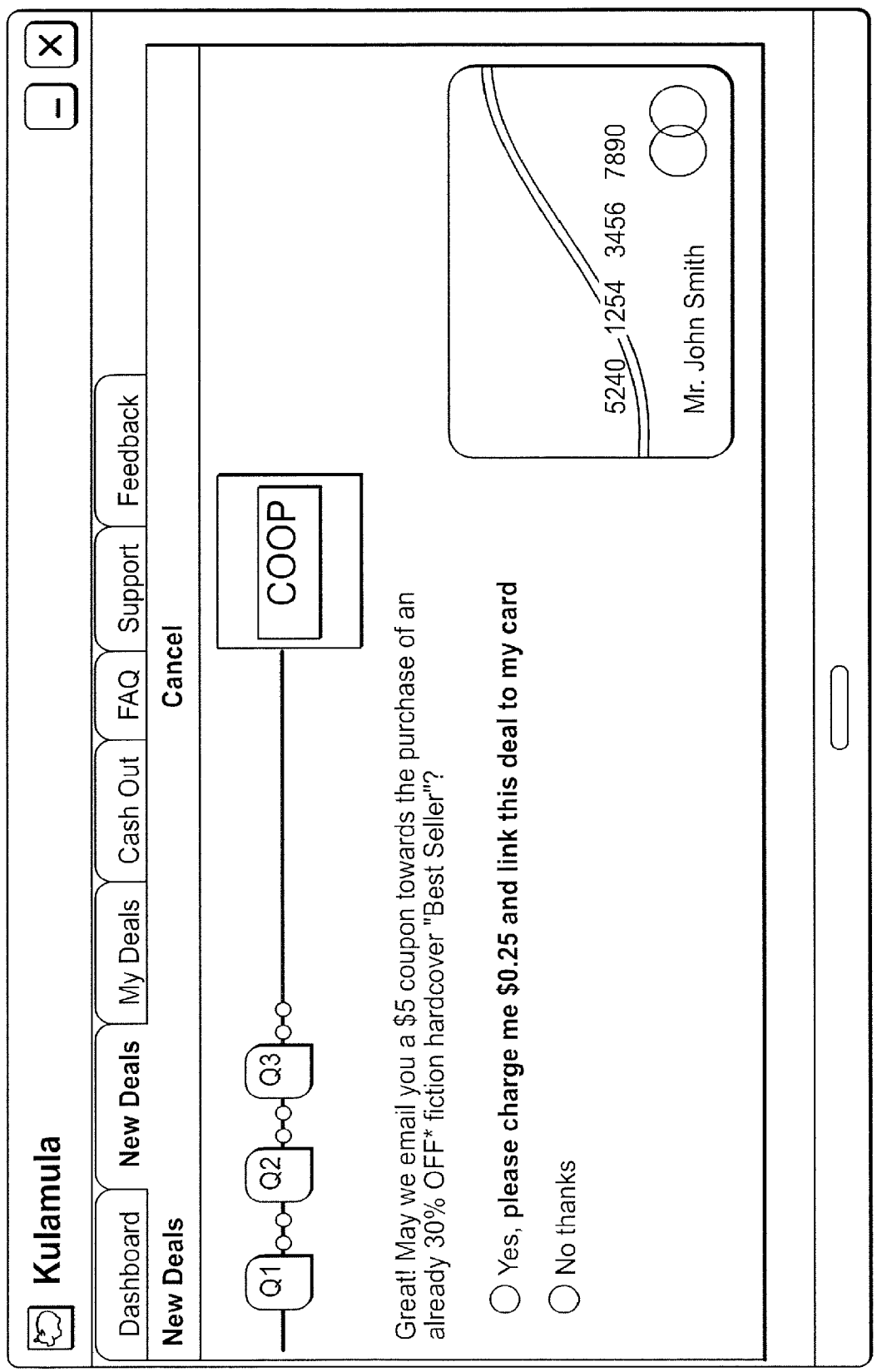
FIG. 28B illustrates a screen used to execute a sale to a user with a registered card.
Figure 28C:
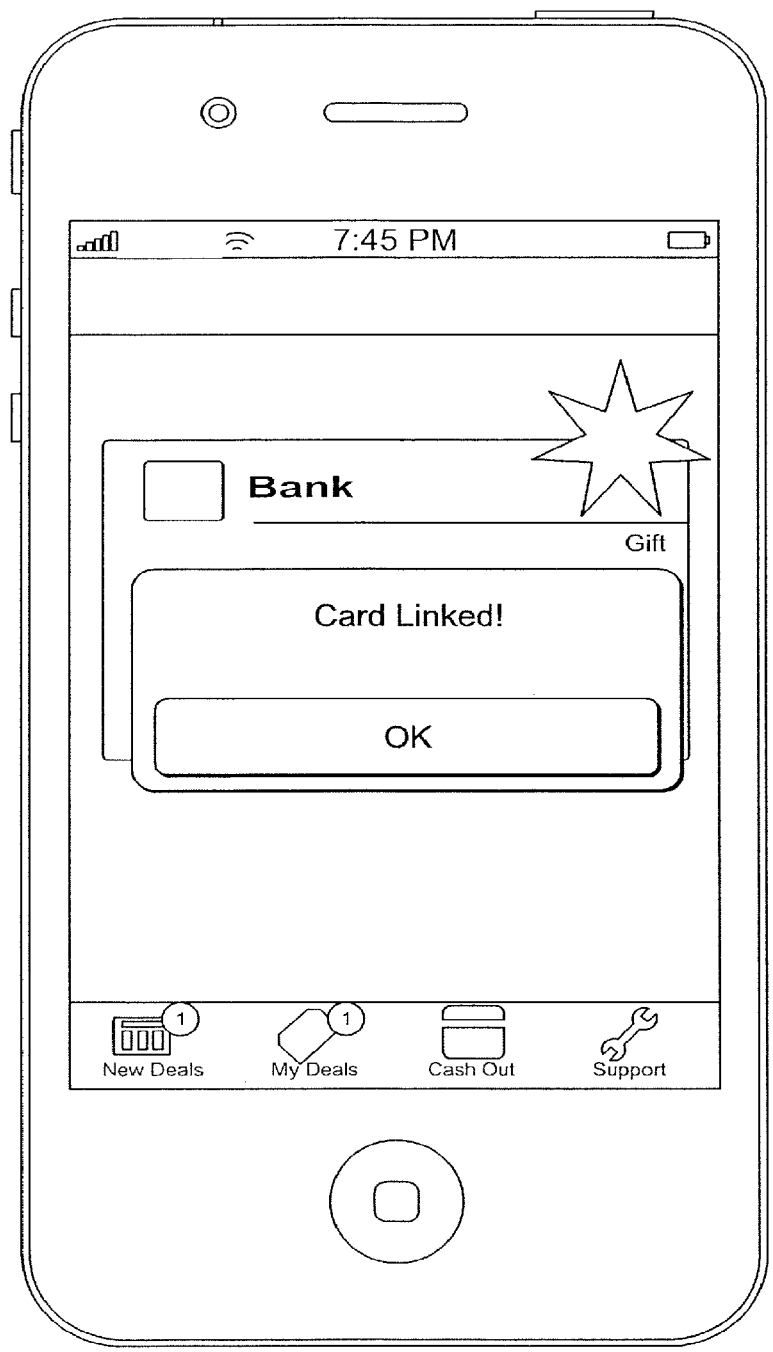
FIG. 28C illustrates the use of a mobile wireless device of a user to use a credit or debit card account.

FIG. 28A illustrates a process sequence in which an electronic card such as a credit card or debit card of a user is registered and used in a data mining operation to deliver an offer to a user. FIG. 28B illustrates a screen in which a registered card is used to execute a transaction in accordance with the invention. FIG. 28C illustrates a screen on a personal wireless device to link the use of a registered electronic card to perform a transaction in accordance with the invention.

Figure 28D:
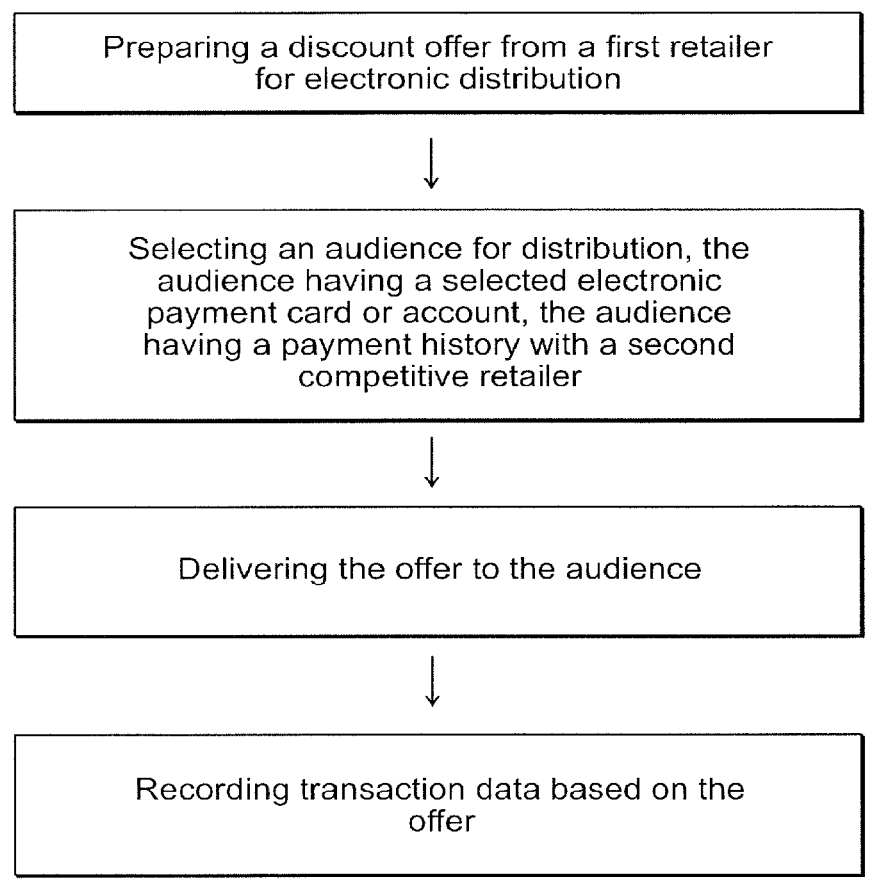
FIG. 28D illustrates a process sequence of a preferred embodiment of the invention.

Another preferred embodiment of the invention utilizes the database of consumer information to facilitate transactions using a particular electronic payment card, such as a credit or debit card. Financial institutions, such as banks or other electronic payment card issuers, can employ discounted offers to promote the use of their electronic payment cards. These offers can be associated with specific retailers or coupon distributors. Shown in FIG. 28D is an example where existing customers of a first retailer receive a discounted offer selected to promote the purchase of goods or services from a second retailer using a specific electronic payment card or electronic payment system. The system identifies specific consumers by a unique identifier customer ID, such as an alphanumeric identifier. The offers can be made directly by electronic communication by the bank, financial institution or card issuer to the particular audience of users identified by the system search engine based on prior payment history with competitive retailers of the first retailer. The discount can be high, for example at least 50 percent of the retail price, in order to motivate a change in buyer behavior. This type of campaign need not directly utilize the interactive marketing system requiring further answers, but audience selection can be based on existing data stored in the system. The financial institution can utilize Yodlee, for example, to enroll users into the system. The system can then use the co-branding method to make offers.

While the present invention has been described herein in conjunction with a preferred embodiment, a person with ordinary skill in the art, after reading the foregoing specification, can effect changes, substitutions of equivalents and other types of alterations to the systems and methods that are set forth herein. Each embodiment described above can also have included or incorporated therewith such variations as disclosed in regard to any or all of the other embodiments. Thus, it is intended that protection granted by Letters Patent herein be limited in breath only by the appended claims and any equivalents thereof.

What is claimed is:

1. A computer-implemented method of performing a targeted communication service for distribution to a plurality of end-users of a public communication network accessible electronic account service, comprising:

selecting a target audience of end-users using a networked computer connected to a database having electronically stored attributes including demographic attributes, prior transaction attributes and prior response attributes of each of the plurality of end-users using the electronic account service wherein the end-users each have an electronic account, the prior response attributes resulting from answers to electronically stored query sequences obtained from automated communications with the end-users of the electronic account service, the electronic account service including an automated electronic communication system that electronically performs transactions using a banking server connected to the database wherein the automated electronic communication system stores transaction data of each of the plurality of end-users in the database;

scoring the target audience of end-users;

storing an automated communication query sequence in a memory device, the automated communication query sequence being displayable to the scored end-users of the public network accessible account service using a display connected to a computing device that is connectable to the public communication network using a web browser or wireless mobile computing device banking application, the automated communication query sequence comprising an ordered sequence of interview questions stored in the memory device that are presented to the end-user with the computing device and the display, the stored sequence of interview questions including at least a first stored question and at least one stored second question that is automatically communicated to an end-user on the display in response to an answer of the first stored question such that a further automated communication based on one or more answers to the sequence of interview questions can be selected from the memory device; and automatically determining a subset of the end-users using a database query to generate a statistical attribute of the subset of end-users based at least partially on the recorded answers, the database query including a plurality of coefficients that correspond to the electronically stored attributes;

sending a further automated communication with the public communication network to the subset of end-users of the account service using the web browser or the wireless mobile computing device account application and generating response data; and electronically storing response data of the one or more end-users in the database.

2. The method of claim 1 wherein the selecting step further comprises a data mining operation using an analytical representation including the plurality of coefficients for the electronically stored attributes.

3. The method of claim 2 wherein the analytical representation comprises a least squares representation or a neural network.

4. The method of claim 1 further comprising revising the target audience wherein the coefficients are associated with corresponding adjustable variables and determining a predicted value.

5. The method of claim 1 further comprising selecting a further communication regarding a product or service based on an answer to an interview question.

6. The method of claim 5 further comprising defining a user profile for each end-user, each user profile including profile data;

determining a probability of a user's response to the automated communication query sequence; and modifying the communication based on an answer to an interview question and sending the modified communication to one or more of the end-users.

7. The method of claim 5 further comprising recording data in a second database regarding the further communication.

8. The method of claim 7 further comprising recording answer data to interview questions in the second database.

9. The method of claim 1 further comprising a graphical user interface (GUI) operable on the display to conduct the automated communication.

10. The method of claim 9 wherein the GUI displays at least one of a plurality of products or services selectable by a user.

11. The method of claim 1 wherein the computing device comprises a mobile wireless communication device.

12. The method of claim 1 wherein the automated sequence of interview questions comprises a first question and a plurality of second questions wherein one of the plurality of second questions is presented based on an answer to the first question, the query being based on an answer to at least one of the second questions.

13. The method of claim 1 wherein the selecting step further comprises using an analytical representation to search a database of users, the representation including a plurality of weighted attributes.

14. The method of claim 2 wherein the analytical representation comprises a regression analysis.

15. The method of claim 1 further comprising revising the selected users using commonalities among the electronically stored attributes.

16. The method of claim 1 further comprising selecting a further automated communication regarding a product or service based on answers recorded with the website browser of the electronic banking service, the database receiving prior transaction data via a server associated with the electronic banking service that is connected to a data warehouse.

17. The method of claim 1 further comprising modifying the automated communication query sequence based on an interview question answer and sending the modified automated communication query sequence to one or more of the end-users.

18. The method of claim 1 wherein the public communication network comprises the internet.

19. The method of claim 1 wherein the automated communication system further comprises a computer program operable to transmit the automated communication query sequence to at least one of the users.

20. The method of claim 1 further comprising communicating the further automated communication query sequence to at least one of the end-users during a banking transaction process or an insurance transaction process.

* * * * *